United States Patent
Nishi et al.

(10) Patent No.: US 7,122,264 B2
(45) Date of Patent: Oct. 17, 2006

(54) SOLID ELECTROLYTE TYPE FUEL BATTERY

(75) Inventors: Toshiro Nishi, Nagasaki (JP); Nobuaki Murakami, Nagasaki (JP); Hirokazu Yamamoto, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 348 days.

(21) Appl. No.: 09/118,833

(22) Filed: Jul. 20, 1998

(65) Prior Publication Data

US 2001/0038936 A1    Nov. 8, 2001

(30) Foreign Application Priority Data

Aug. 8, 1997    (JP)    ................................. 9-214358

(51) Int. Cl.
*H01M 8/12*    (2006.01)
(52) U.S. Cl. .......................................... 429/30; 429/34
(58) Field of Classification Search .................. 429/30, 429/31, 34
See application file for complete search history.

(56) References Cited

U.S. PATENT DOCUMENTS

| 4,395,468 A | 7/1983 | Isenberg ........................ 429/31 |
| 4,490,444 A | 12/1984 | Isenberg ........................ 429/31 |
| 4,721,556 A | 1/1988 | Hsu ............................ 204/258 |
| 5,411,767 A | 5/1995 | Soma et al. ............... 429/31 X |

FOREIGN PATENT DOCUMENTS

| EP | A 1-0180289 | 5/1986 |
| EP | 0696824 A1 | 2/1996 |
| JP | A 61-91880 | 5/1986 |
| JP | A 5-94828 | 4/1993 |
| JP | A 6-44991 | 2/1994 |
| JP | 08-050913 | * 2/1996 |
| JP | A 8-175868 | 7/1996 |

OTHER PUBLICATIONS

Patent Abstracts of Japan, vol. 017, No. 525 (E-1436), Sep. 21, 1993—Abstract for JP 05-144463A, published Jun. 11, 1993.
Patent Abstracts of Japan, vol. 017, No. 683 (E-1477), Dec. 15, 1993 Abstract for JP 05-234607A, published Sep. 10, 1993.

* cited by examiner

*Primary Examiner*—Jonathan Crepeau
(74) *Attorney, Agent, or Firm*—Birch, Stewart, Kolasch & Birch, LLP

(57) ABSTRACT

A solid electrolyte type fuel battery in which a material for an interconnector for connecting cells of the solid electrolyte type fuel battery comprises a matrix of the general formula $MTiO_3$, where M is an alkaline earth metal element such as Mg, Ca, Sr or Ba. This fuel battery can be produced by burning at a lower temperature of 1,300 to 1,400° C. than before, shows output performance comparable to or better than that of conventional devices, and has better durability and thermo cycle resistance characteristics than the conventional devices.

14 Claims, 50 Drawing Sheets

FIG. 4

| Burning temp. | MgTiO$_3$ system | La$_{0.8}$Sr$_{0.2}$CrO$_3$ system |
|---|---|---|
| 1400°C | MgTiO$_3$ phase | LaCrO$_3$ phase |
| 1450°C | MgTiO$_3$ phase | LaCrO$_3$ phase |
| 1550°C | MgTiO$_3$ phase | LaCrO$_3$ phase | x : La-substituted amount / $Mg_{1-x}La_xTi_{1-y}Nb_yO_3$

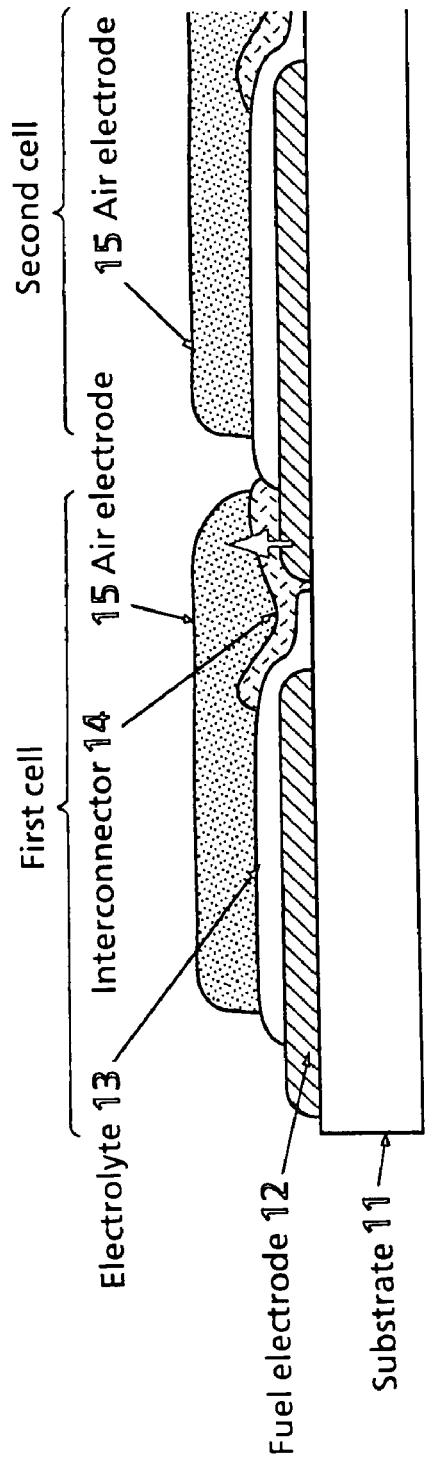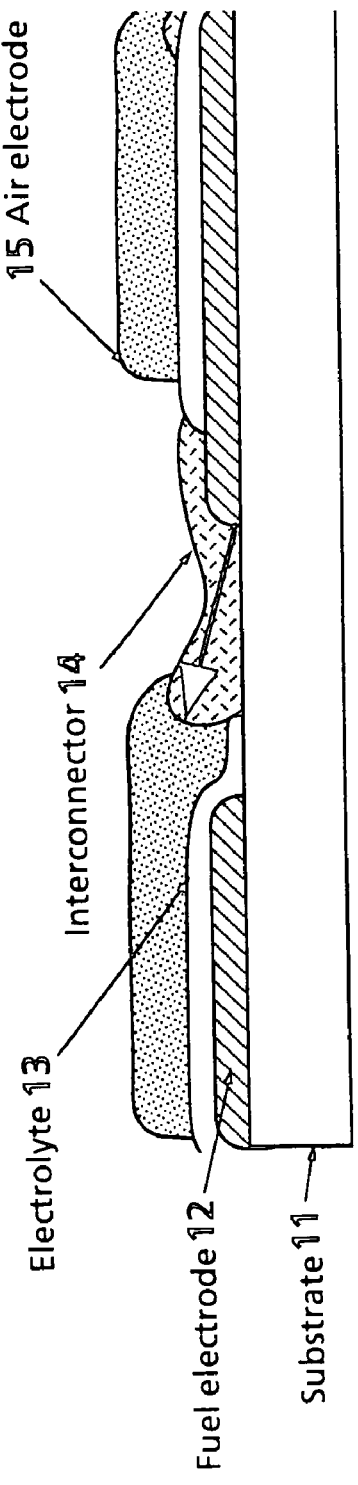
FIG. 44(a) Vertical current collection  Advantage: High resistance can be evaded by small thickness.
FIG. 44(b) Horizontal current collection  Disadvantage: Not usable for a high resistance material

SOLID ELECTROLYTE TYPE FUEL BATTERY

BACKGROUND OF THE INVENTION

This invention relates to a solid electrolyte type fuel battery.

A fuel battery converts chemical energy, obtained by the reaction between a fuel (a reducing agent) and air (an oxidizing agent), directly into electric energy, rather than taking it as heat. The fuel battery can serve as a highly efficient power generation system, because it carries out direct power generation and it is not restricted by the Carnot's cycle. The fuel battery comes in various types, and can be roughly divided into a phosphate type, a molten carbonate type, and a solid electrolyte type according to the solid electrolyte used. The temperatures used for these types are about 200° C., 600° C. and 1,000° C., respectively. The solid electrolyte type fuel battery, in particular, can utilize high waste heat, and thus shows a high thermal efficiency of about 60%.

The constituent materials for the solid electrolyte type fuel battery, as a single cell, are a solid electrolyte, a fuel electrode, and an air electrode. The materials generally used are yttrium stabilized zirconia (hereinafter referred to as YSZ), an NiO/YSZ system material, and a lanthanum manganese system material, respectively.

However, the open circuit voltage of a single cell is about 1 V, so that the series connection of the cells needs to be made by an interconnector for actual use. To support the respective constituent materials in terms of strength, a cylindrical battery generally requires the use of calcia stabilized zirconia (hereinafter referred to as CSZ) as a support pipe, while a flat plate type battery requires the use of the interconnector itself as a support plate.

The interconnector must fulfill the stringent requirements that it be too tight to allow passage of a gas; it be chemically stable in both oxidizing and reducing atmospheres at a high temperature of about 1,000° C.; it should not form an insulating layer upon reaction with other constituent material during battery production and in operation; it be highly electrically conductive and should undergo only electronic conduction without involving ion conduction; and its thermal expansion be comparable to that of other constituent material, such as YSZ.

As a material that satisfies the foregoing strict requirements, an $LaCrO_3$ system material (hereinafter referred to as lanthanum chromite) is generally used. This material does not completely fulfill the required properties, and has much to be improved, particularly, in terms of burning properties and cracking due to expansion during reduction. The cracking during reduction occurs by the following mechanism: One surface of the interconnector is in contact with the oxidizing atmosphere, while the other surface of the interconnector contacts the reducing atmosphere. Thus, some oxygen is drawn out on the reducing side, causing expansion. As a result, a "warping" force works in the same material, resulting in fracture.

In the solid electrolyte type fuel battery, as noted above, severe requirements are imposed on the interconnector. Lanthanum chromite, in particular, is difficult to burn, and is usually burned only at a burning temperature higher than 1,600° C. in a reducing or vacuum atmosphere.

Thus, when a lanthanum chromite system interconnector is to be produced by a so-called integral burning method, the burning temperature has to be made high. This poses the problem that the porosity of the electrodes is lost to lower the output characteristics, and the problem that an insulating layer is formed at the interface between the lanthanum chromite and other constituent material, thereby deteriorating the performance. Therefore, there have been no cases in which batteries are produced by integral burning.

Film-forming methods for lanthanum chromite other than the burning method include the EVD (Electrochemical Vapor Deposition) method described in a report of an invention by Isenberg et al. (U.S. Pat. No. 4,490,444), and thermal spraying which is a common method. Both of these methods are problematical in the manufacturing cost, and they are not suitable for mass production.

Furthermore, lanthanum chromite has the property that it tends to expand in a reduced condition. Thus, when exposed to an oxidizing atmosphere and a reducing atmosphere, this material breaks owing to its own expansion difference.

Besides, the interconnector contacts all materials, and faces stress associated with the differences in thermal expansion coefficient among the respective constituent materials, as well as stress due to the aforementioned expansion during reduction. Unless the interconnector has high strength, it will break.

SUMMARY OF THE INVENTION

The present invention has been accomplished in light of the various problems involved in the use of the interconnector for use in a solid electrolyte type fuel battery. The invention uses a material comprising a matrix of $MTiO_3$ as an interconnector for connecting cells in series. Through this use, the invention attempts to provide a solid electrolyte type fuel battery which can be produced easily and which is excellent in durability and reliability.

A first aspect of the invention for attaining this object is a solid electrolyte type fuel battery in which an interconnector for connecting cells of the solid electrolyte type fuel battery comprises a material having a matrix of the general formula $MTiO_3$ where M is an alkaline earth metal element.

A second aspect of the invention is the solid electrolyte type fuel battery according to the first aspect of the present invention in which the alkaline earth metal element is Mg, Ca, Sr or Ba.

A third aspect of the invention is the solid electrolyte type fuel battery according to the first or second aspect of the present invention in which the current passage of the interconnector is current collection in the vertical direction.

As noted above, the invention uses the material having the matrix of $MTiO_3$, which can be easily burned and has a small difference in expansion between oxidizing conditions and reducing conditions, as the interconnector for the cells. Because of this use, the invention has succeeded in obtaining the solid electrolyte type fuel battery which is easily producible and excellent in durability and reliability.

The interconnector for use in the solid electrolyte type fuel battery of the invention can make the burning temperature low, thus diminishing damage to the other constituent materials. Thus, the interconnector can be burned integrally with the other constituent materials, thus reducing the manufacturing cost. Furthermore, the interconnector of the invention has a small expansion difference between oxidizing and reducing atmospheres, and arouses no concern about breakage at the interconnector area. Hence, a solid electrolyte type fuel battery having excellent durability and high reliability can be obtained.

The invention, as stated earlier, uses a material having a matrix of $MTiO_3$ as the material for the interconnector. This material can be burned not at a conventional high temperature of 1,600° C., but at a lower temperature of 1,300° C. to 1,400° C. as will be shown in Examples to be given later on.

The interconnector of the invention can be sintered at a low temperature. Thus, a solid electrolyte type fuel battery can be produced by an ordinary manufacturing method using a ceramic slurry, such as dipping, coating, slip casting, or printing. The fuel battery can also be produced by the thermal spraying method that uses a powdery starting material, or by vacuum evaporation of raw materials other than oxides.

That is, the interconnector of the invention does not pose any special problems in producing a solid electrolyte type fuel battery.

BRIEF DESCRIPTION OF THE DRAWINGS

FIG. 4 is a graph showing the crystal phase of an $MgTiO_3$ system interconnector in Example 2 of the invention;

FIGS. 44(*a*) and 44(*b*) are views showing the ways of current collection by a battery using the $MTiO_3$ system interconnector in Example 7 of the invention;

DETAILED DESCRIPTION OF THE PREFERRED EMBODIMENTS

The present invention will become more fully understood from the detailed description given hereinbelow and the accompanying drawings which are given by way of illustration only, and thus are not limitative of the present invention.

EXAMPLE 1

In inventing an interconnector different from a conventional lanthanum chromite interconnector, materials were preliminarily selected. Aside from lanthanum chromite, a material for an interconnector that fulfills thermal expansion characteristics, electric conductivity characteristics, and reduction expansion characteristics is selected in accordance with the following criteria:

① Be an oxide (a metal other than the platinum group or even a nonoxide system ceramic is oxidized in the air of 1,000° C.).

② Be a composite oxide (properties of a single-element oxide are difficult to control).

③ Requires a transition metal (an element having a d-orbit electron) for imparting electric conductivity.

Lanthanoid series elements and actinoid series elements are difficult to accept because of a great energy gap and radioactivity, respectively. Second and third transition metals are also difficult to adopt because of their limited amounts as resources and firing properties.

④ Stability of a composite oxide to a reducing atmosphere depends on a low-stability oxide.

Under the criteria ① to ④, candidate materials will be composite oxides containing first transition metals including Ti, V, Cr, Mn, Fe, Co, Ni and Cu. Thus, the stability of oxides of first transition metals against reduction was examined.

Figure 1:
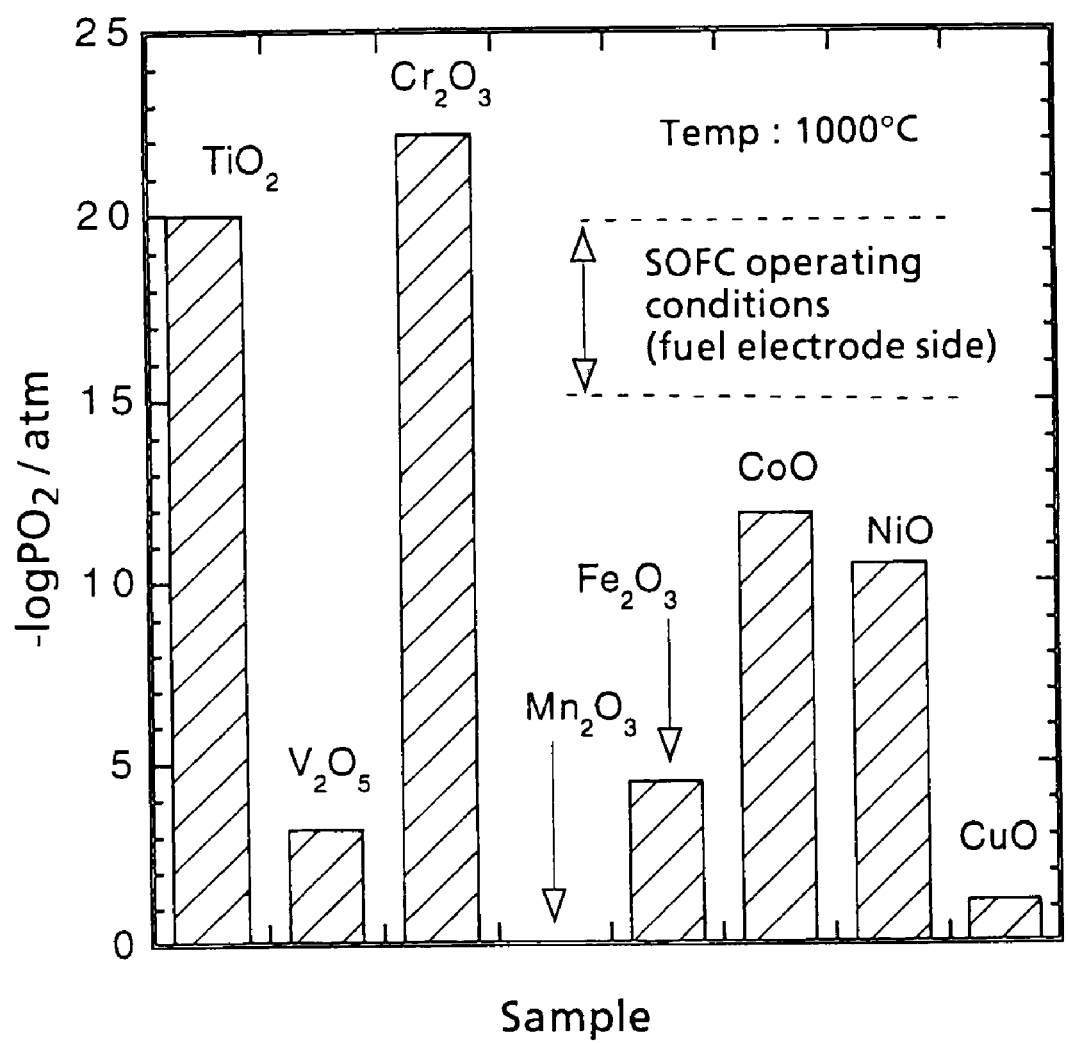
FIG. 1 is a graph showing screening for an interconnector in Example 1 of the present invention.

FIG. 1 shows the dissociation partial pressures of oxides at 1,000° C. that were determined thermodynamically. Normally, the oxygen partial pressure on the fuel electrode side at 1,000° C. of a solid electrolyte fuel battery is about $10^{-15}$ to $10^{-21}$ atmosphere. Thus, FIG. 1 shows oxides of Cr and Ti to be stable.

In selecting a composite oxide containing a transition metal, a two-component system composite oxide is the commonest. Promising combinations with elements stable to reduction, if selected from oxides of Cr and Ti, will be Ln(lanthanoid)$CrO_3$ and M(alkaline earth metal) $TiO_3$.

Among Ln(lanthanoid)$CrO_3$ compounds is conventional $LaCrO_3$ (lanthanum chromite). A composite oxide containing Cr is difficult to burn, like an oxide of Cr alone, as is clear to people skilled in the art.

Figure 2:
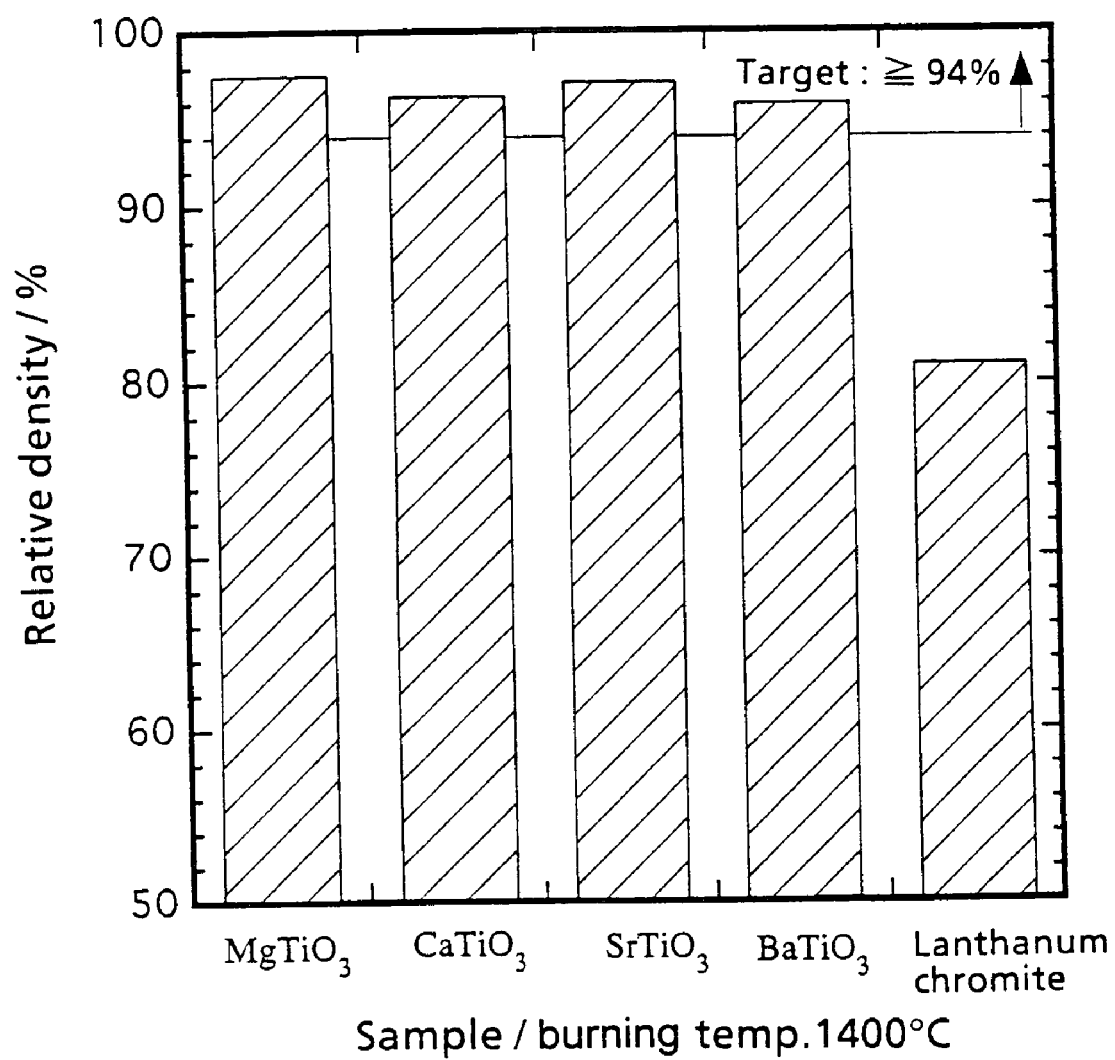
FIG. 2 is a graph showing the relative densities of $MTiO_3$ system interconnectors in Example 1 of the invention.

FIG. 2 is a graph showing the relative densities of lanthanum chromite and $MTiO_3$ system interconnectors burned at 1,400° C. in the air. The relative density is the ratio of the density of an actual sample determined by the Archimedean method to the theoretical density calculated based on the crystal structure. The lanthanum chromite and $MTiO_3$ are $La_{0.8}Sr_{0.2}CrO_3$ and $MTiO_3$ (M=Mg, Ca, Sr, Ba), respectively. To prepare the interconnectors, powdered starting materials were mixed in a mortar, calcined for 5 hours at 1,200° C., monoaxially pressure molded, then CIP (cold isostatic pressing) molded, and burned.

FIG. 2 demonstrates that lanthanum chromite is poor in burning properties and does not become a densified product, while the $MTiO_3$ systems are very satisfactory in burning properties, and particularly suitable for integral burning capable of reducing the cost.

Generally, interconnectors with a relative density of 94 to 95% or more make hermetic films, so that the $MTiO_3$ system interconnectors meet this requirement.

Figure 3:
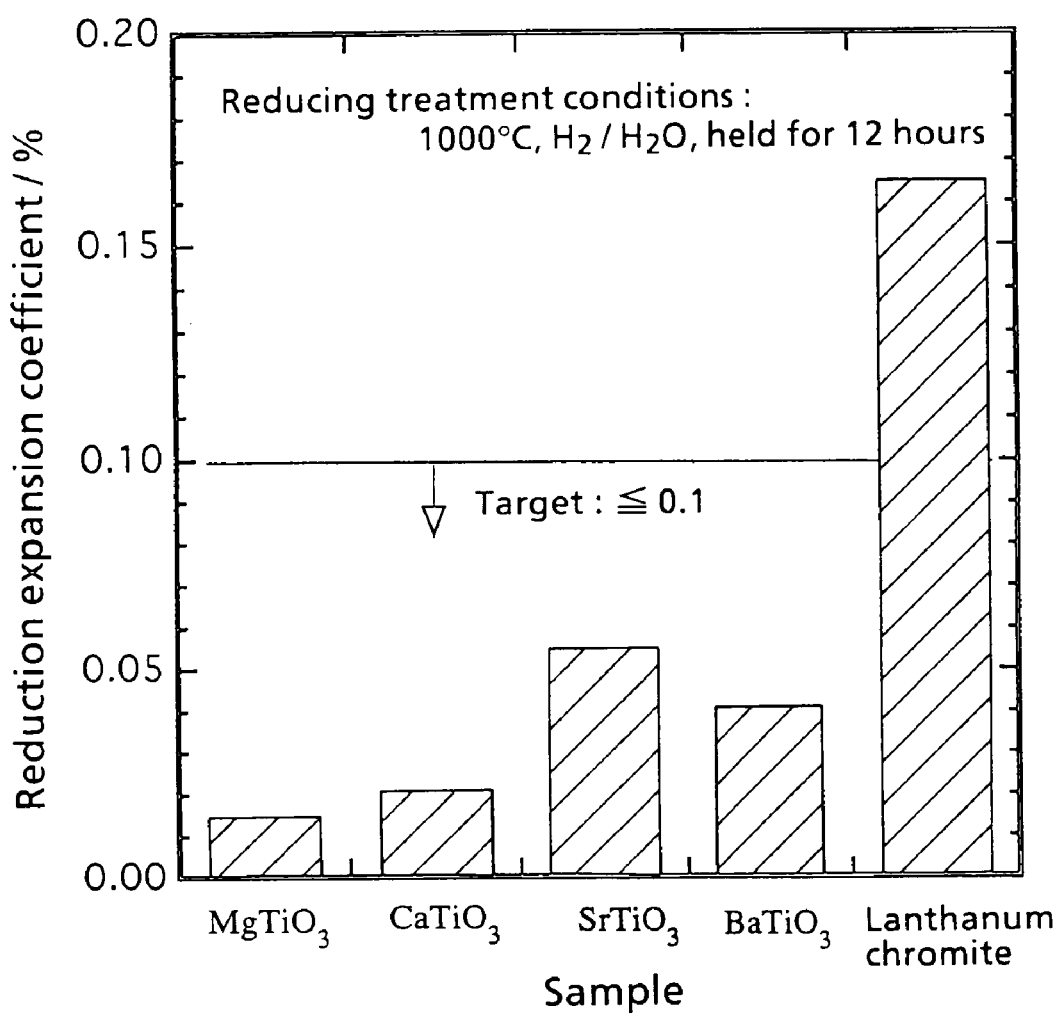
FIG. 3 is a graph showing the reduction expansion coefficients of the $MTiO_3$ system interconnectors in Example 1 of the invention.

Then, the resulting burned products were each reduced for 12 hours at 1,000° C. under $H_2/H_2O$ conditions (room temperature humidified hydrogen: about 97% hydrogen). The reduction expansion coefficient of each reduced sample relative to the sample before reduction was measured, and the results are shown in FIG. 3. The reduction expansion coefficient was determined by the following equation:

$$\text{Reduction expansion coefficient} = (L_1-L_0)/L_0 \times 100 = dL/L_0 \times 100 \quad (1)$$

where $L_0$: Length (mm) when returned to room temperature after burning, $L_1$: Length (mm) at room temperature after reduction, and $dL$: $(L_1-L_0)$ (mm)

FIG. 3 reveals that the lanthanum chromite shows an expansion of about 0.17%, while the $MTiO_3$ systems show expansions of 0.06% or less, meaning that these products have small expansion differences between oxidizing and reducing atmospheres, and undergo low stress imposed on themselves. Thus, the $MTiO_3$ systems are found to provide battery materials with a low possibility for cracking and high reliability.

Generally, the allowable value for the reduction expansion coefficient is said to be 0.1% or less. The $MTiO_3$ systems fulfill this requirement.

EXAMPLE 2

Next, the present invention will be described in further detail with reference to concrete examples using $MgTiO_3$ system interconnectors.

Example 1 shows that $MgTiO_3$ system interconnectors exhibit better characteristics than lanthanum chromite. When an interconnector is to be used industrially for a solid electrolyte fuel battery, there is need to use interconnector materials mass produced by the ball mill mixing method described below, rather than the mortar mixing method mentioned in Example 1. Example 2 offers a more detailed explanation for the method of preparing materials, and the properties of the resulting interconnector.

First, $MgTiO_3$ system materials and a $LaCrO_3$ system material were prepared. The composition for the $MgTiO_3$ materials was $Mg_{1-x}La_xTi_{1-y}Nb_yO_3$ (x=0, 0.01, 0.05, 0.1, 0.2 and y=0, 0.01, 0.05, 0.1, 0.2), while the composition for the lanthanum chromite material was $La_{0.8}Sr_{0.2}CrO_3$. Except that strontium carbonate was used as the Sr material, all the materials used were oxides. Predetermined amounts of the materials were weighed and placed in a pot charged with zirconia balls and ethanol. With the weight concentration of the resulting slurry set at 50%, the materials were mixed and pulverized for 24 hours. Then, the slurry was concentrated and dried by a rotary evaporator, and dried for a whole day with a dryer of 150° C. The resultant dry powder was burned in an alumina crucible for 5 hours at 1,200° C. to prepare a calcined powder. The calcined powder was pulverized for 48 hours in an ethanol solvent with the weight concentration of the resulting slurry being set at 50%. Then, the slurry was concentrated and dried by a rotary evaporator, and dried for a whole day with a dryer at 150° C. Then, the dry powder was put in a mold with an inside diameter of 20$\phi$ (mm), monoaxially pressed at a pressure of 200 kg/cm$^2$, and then CIP molded (2 t/cm$^2$) in a rubber mold.

The resulting molded product was placed on a spread powder (the same calcined powder), and burned for 2 hours at a temperature each of 1,300° C., 1,350° C., 1,400° C., and 1,500° C.

The burned product was subjected to identification of the crystal phase by the X ray diffraction method, measurement of the density by the Archimedean method, and measurement of the thermal expansion coefficient in an oxidizing or reducing atmosphere. To measure reduction expansion, the ratio of the length at room temperature of the sample after reduction for 12 hours under 1,000° C. $H_2/H_2O$ treatment to the length at room temperature of the sample immediately after burning in the air was calculated and taken as the reduction expansion coefficient.

FIG. 4 shows the crystal phase, as identified by X-ray diffraction, of the $MgTiO_3$ system samples of a varying composition expressed as $Mg_{1-x}La_xTi_{1-y}Nb_yO_3$ (x=0, 0.01, 0.05, 0.1, 0.2 and y=0, 0.01, 0.05, 0.1, 0.2). The samples were identified as single phases, $MgTiO_3$ and $LaCrO_3$, and the absence of a second phase was confirmed.

Figure 5:
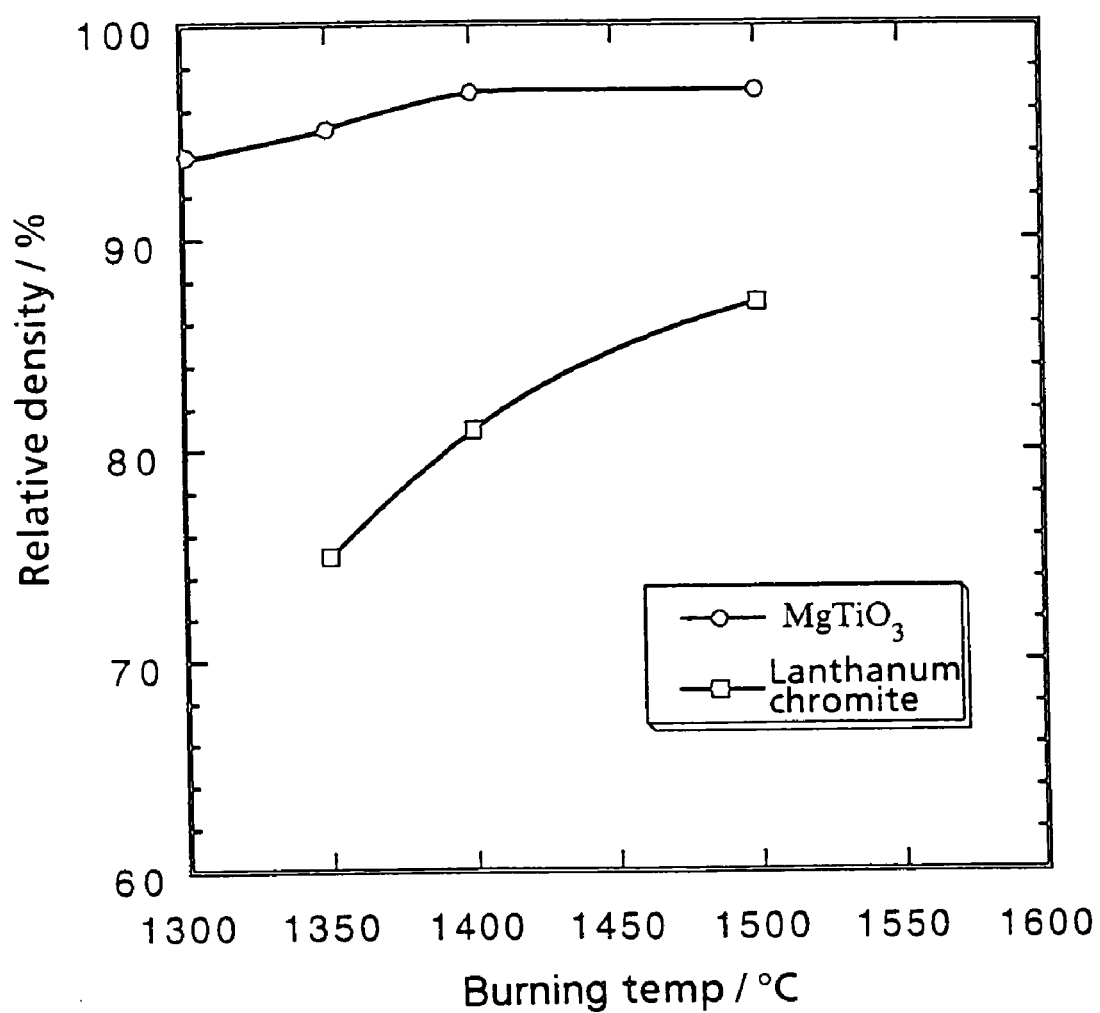
FIG. 5 is a graph showing the relative densities of the $MgTiO_3$ system interconnector in Example 2 of the invention.

FIG. 5 shows changes in the relative density of $MgTiO_3$ and lanthanum chromite versus the burning temperature.

The results show that even the $MgTiO_3$ sample prepared by the industrial manufacturing method was able to obtain high relative densities not lower than the desired value 94% as in Example 1. The lanthanum chromite sample, on the other hand, showed low relative densities in the entire temperature range in comparison with $MgTiO_3$.

Figure 6:
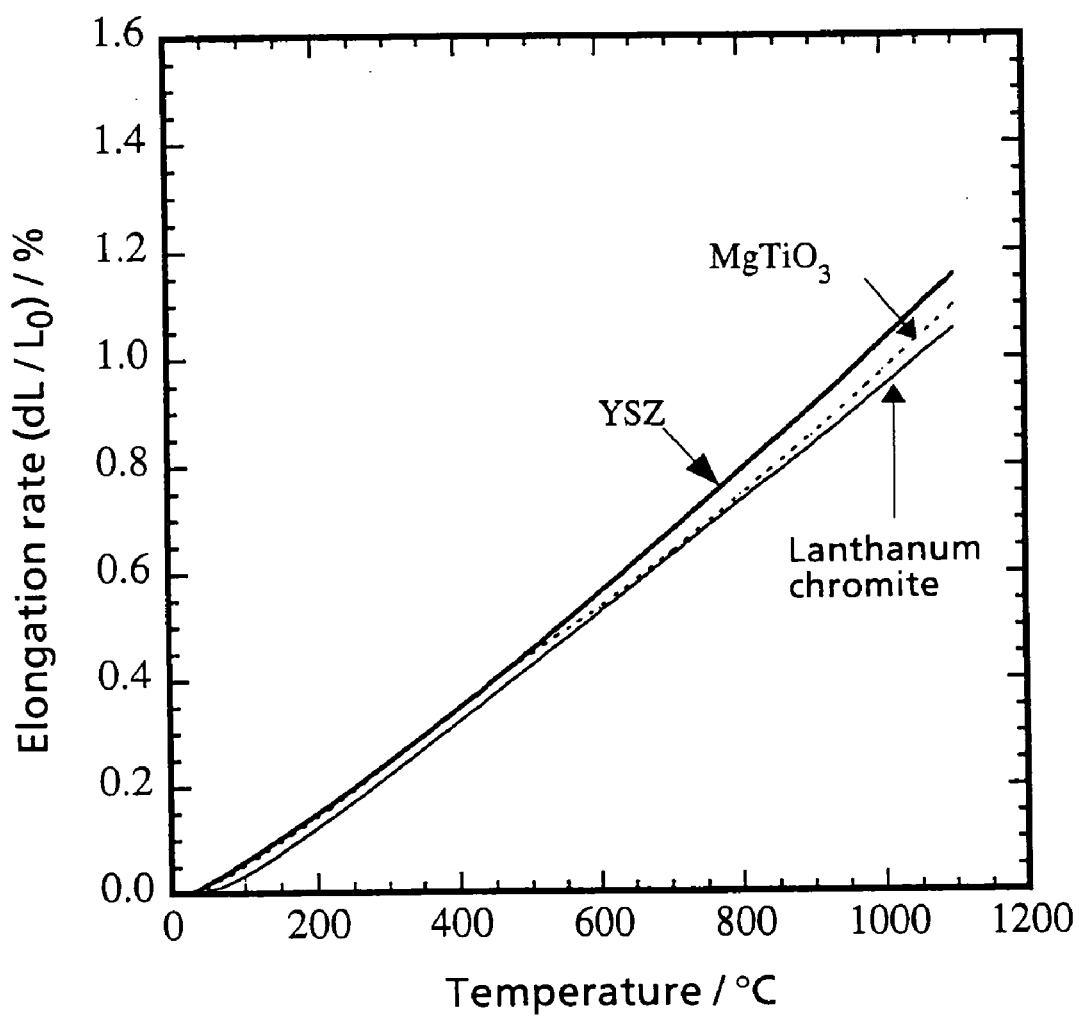
FIG. 6 is a graph showing the thermal expansion behavior of the $MgTiO_3$ system interconnector in Example 2 of the invention.

FIG. 6 shows the thermal expansion behaviors of $MgTiO_3$ and lanthanum chromite, and the elongation rate was expressed by the following equation:

$$\text{Elongation rate}=(L_2-L_0)/L_0\times100=dL/L_0\times100 \quad (2)$$

where $L_0$: Length (mm) when returned to room temperature after burning, $L_2$: Length (mm) at measuring temperature, and dL: ($L_2-L_0$) (mm)

The $MgTiO_3$ system sample was found to exhibit a thermal expansion behavior similar to that of the electrolyte (YSZ) in comparison with lanthanum chromite.

Figure 7:
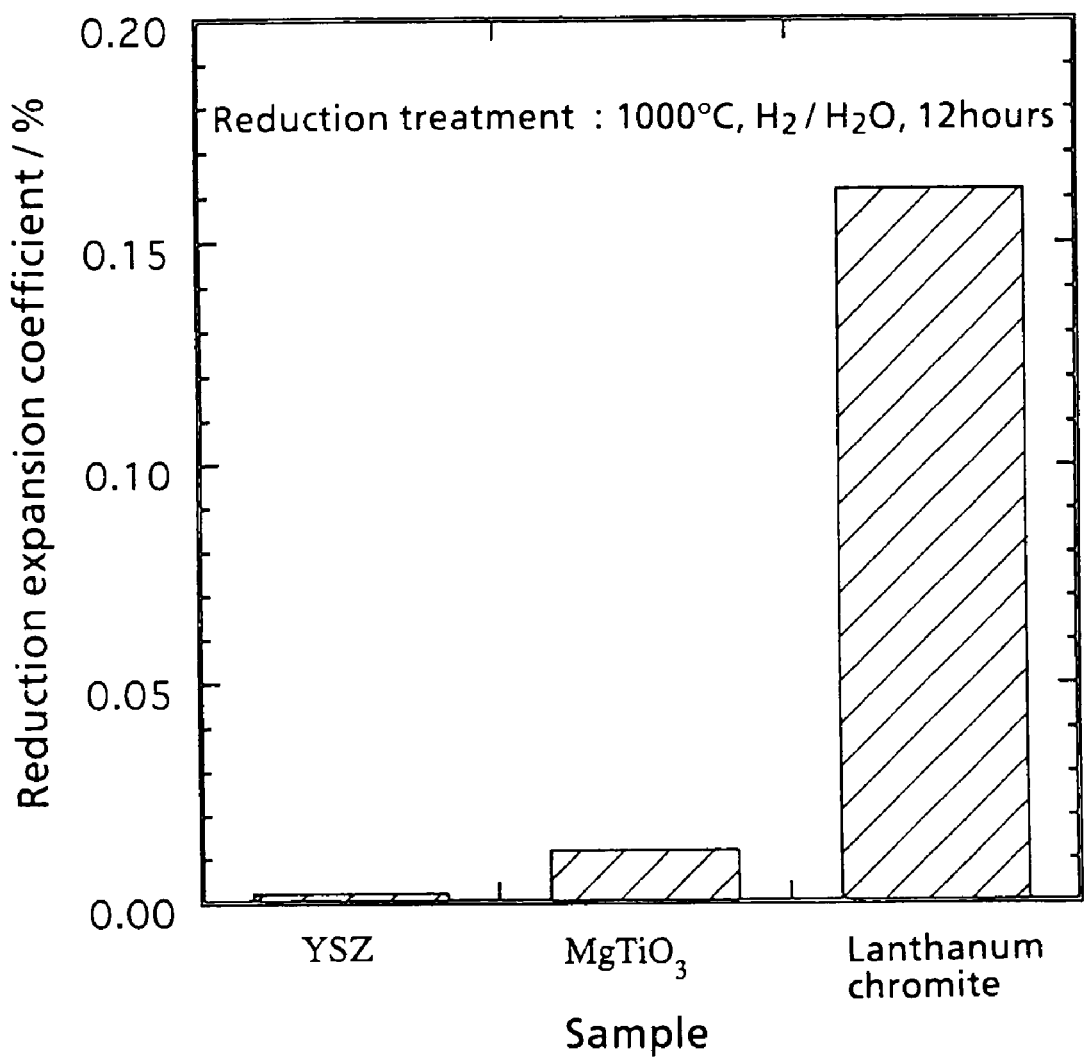
FIG. 7 is a graph showing the reduction expansion coefficient of the $MgTiO_3$ system interconnector in Example 2 of the invention.

FIG. 7 shows the reduction expansion coefficients of the burned products of an $MgTiO_3$ system and lanthanum chromite. The $MgTiO_3$ system sample prepared by the industrial manufacturing method was found to have a reduction expansion coefficient which was one-tenth or less of that of lanthanum chromite.

With $MgTiO_3$ as a single compound, control of the properties is impossible. Thus, its Mg element was partially substituted by La and its Ti element was partially substituted by Nb to measure various properties. Previous measurement has confirmed $MgTiO_3$ to be an n-type semiconductor. Hence, various elements can be added by the valence control method which performs the partial substitution of an element with a small valence by an element with a large valence. That is, the divalent Mg portion can be partly substituted by a trivalent stable element, i.e., Al, Ga, In or Tl of the IIIA group, Sc, Y, lanthanide or actinoid of the IIIB group, or Cr which is a transition metal, but is a trivalent, stable element. Actually, however, In of the IIIA group is expensive, Tl of the IIIA group is highly toxic, and actinoid is radioactive and expensive, and so these elements cannot be used. Therefore, Sc, Y, Al, Ga, lanthanoid (La, Ce, Pr, Nd, Pm, Sm, Eu, Gd, Tb, Dy, Ho, Er, Tm, Yb, Lu), and Cr are usable.

The tetravalent Ti portion can be partially substituted by a pentavalent, stable element such as Nb or Ta. Needless to say, the valence control method is also capable of substitution by an element having a valence larger by +2 or +3, rather than substitution by an element having a valence larger by +1.

Figure 8:
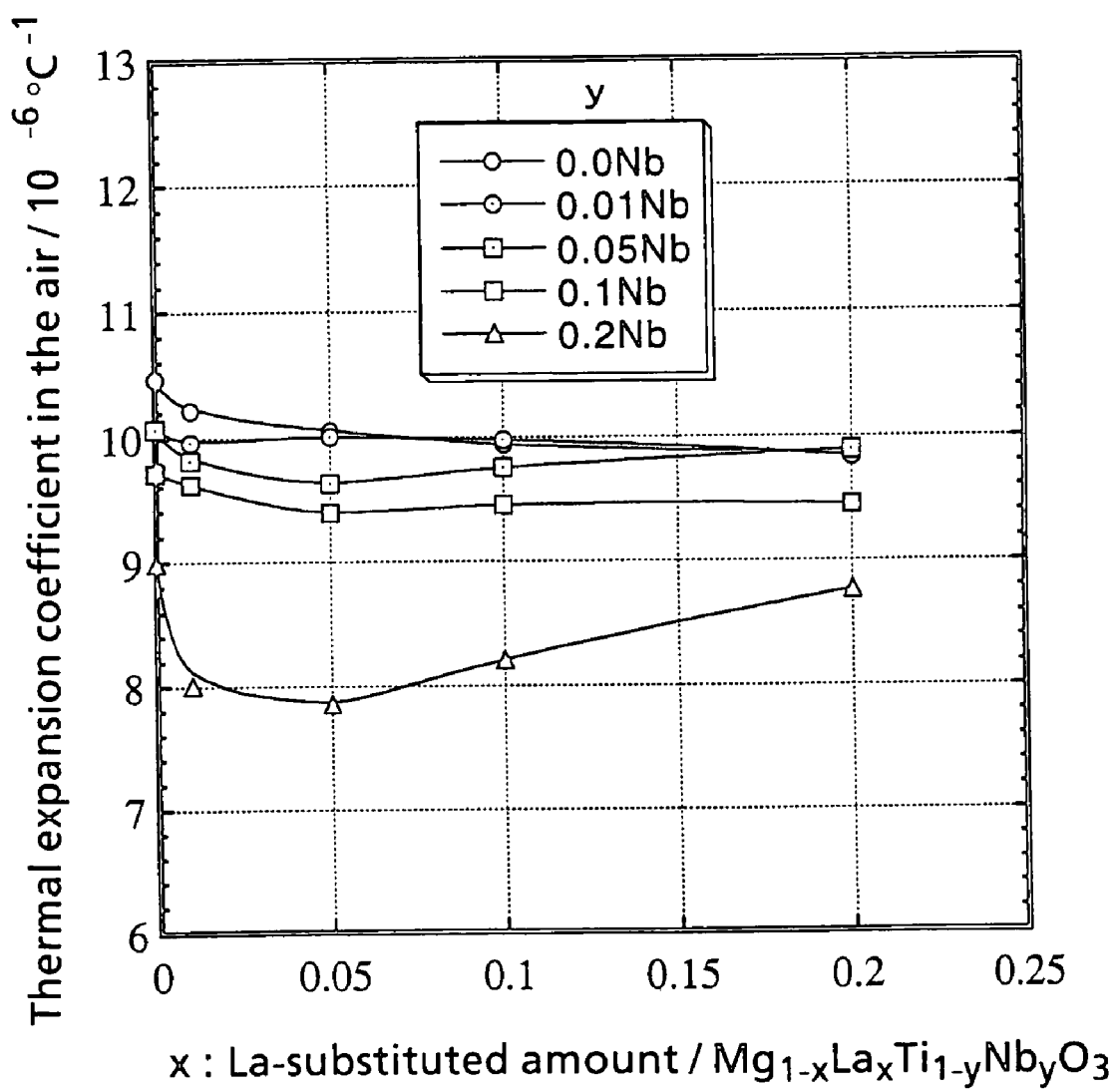
FIG. 8 is a graph showing the composition dependency of the thermal expansion coefficients in the air of the $MgTiO_3$ system interconnectors in Example 2 of the invention.
Figure 9:
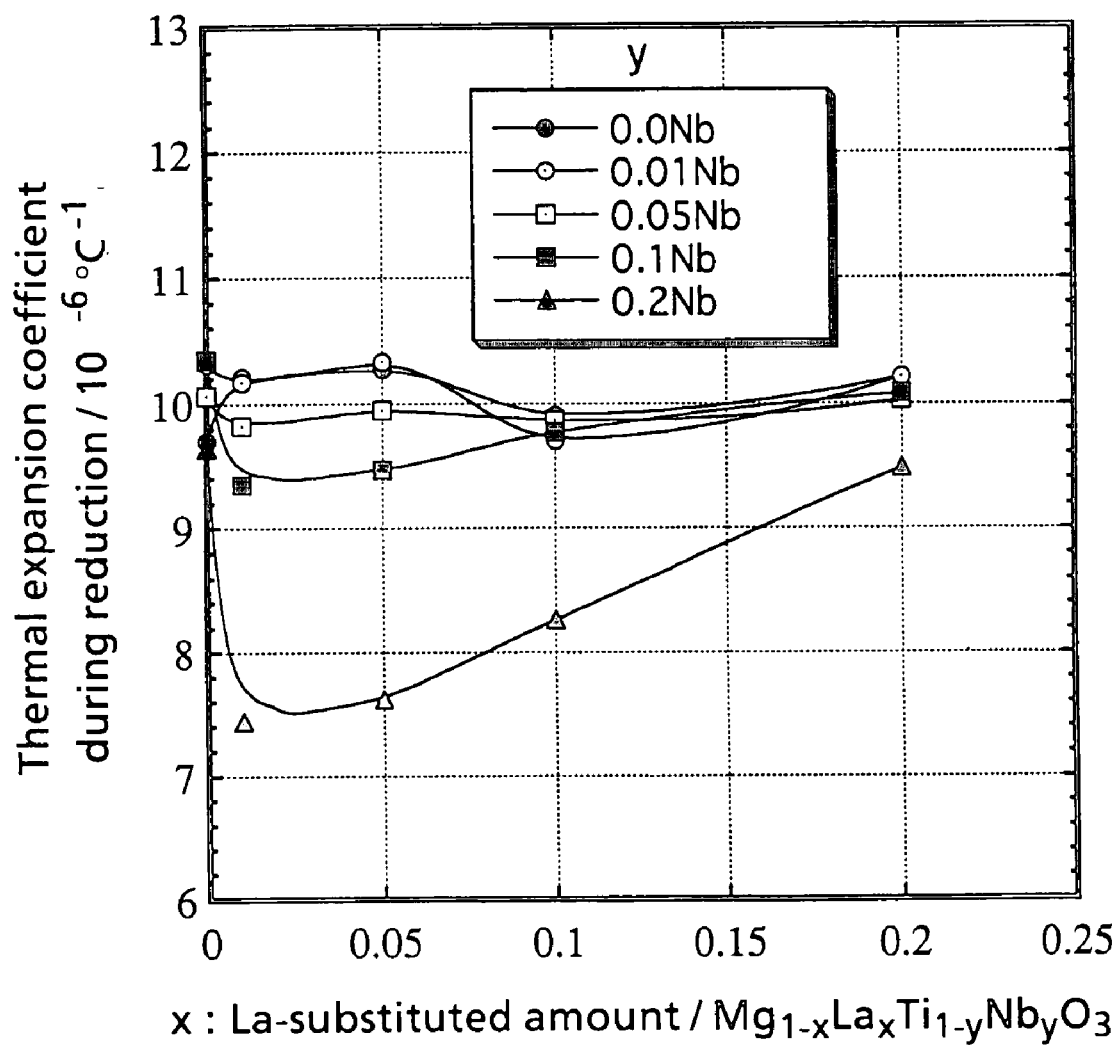
FIG. 9 is a graph showing the composition dependency of the thermal expansion coefficients during reduction of the $MgTiO_3$ system interconnectors in Example 2 of the invention.
Figure 10:
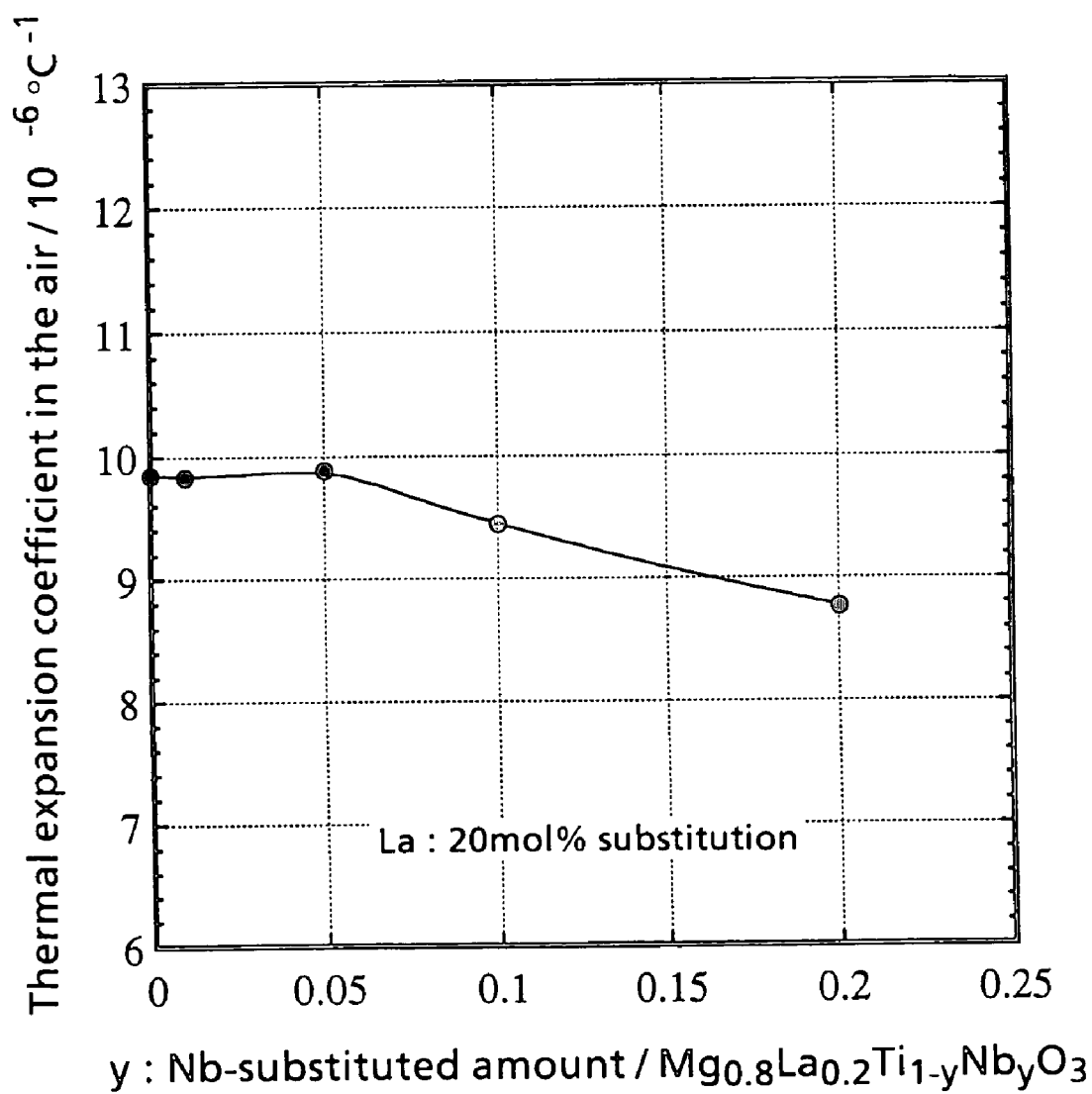
FIG. 10 is a graph showing the composition dependency of the thermal expansion coefficients in the air of two-component-substituted $MgTiO_3$ system interconnectors in Example 2 of the invention.
Figure 11:
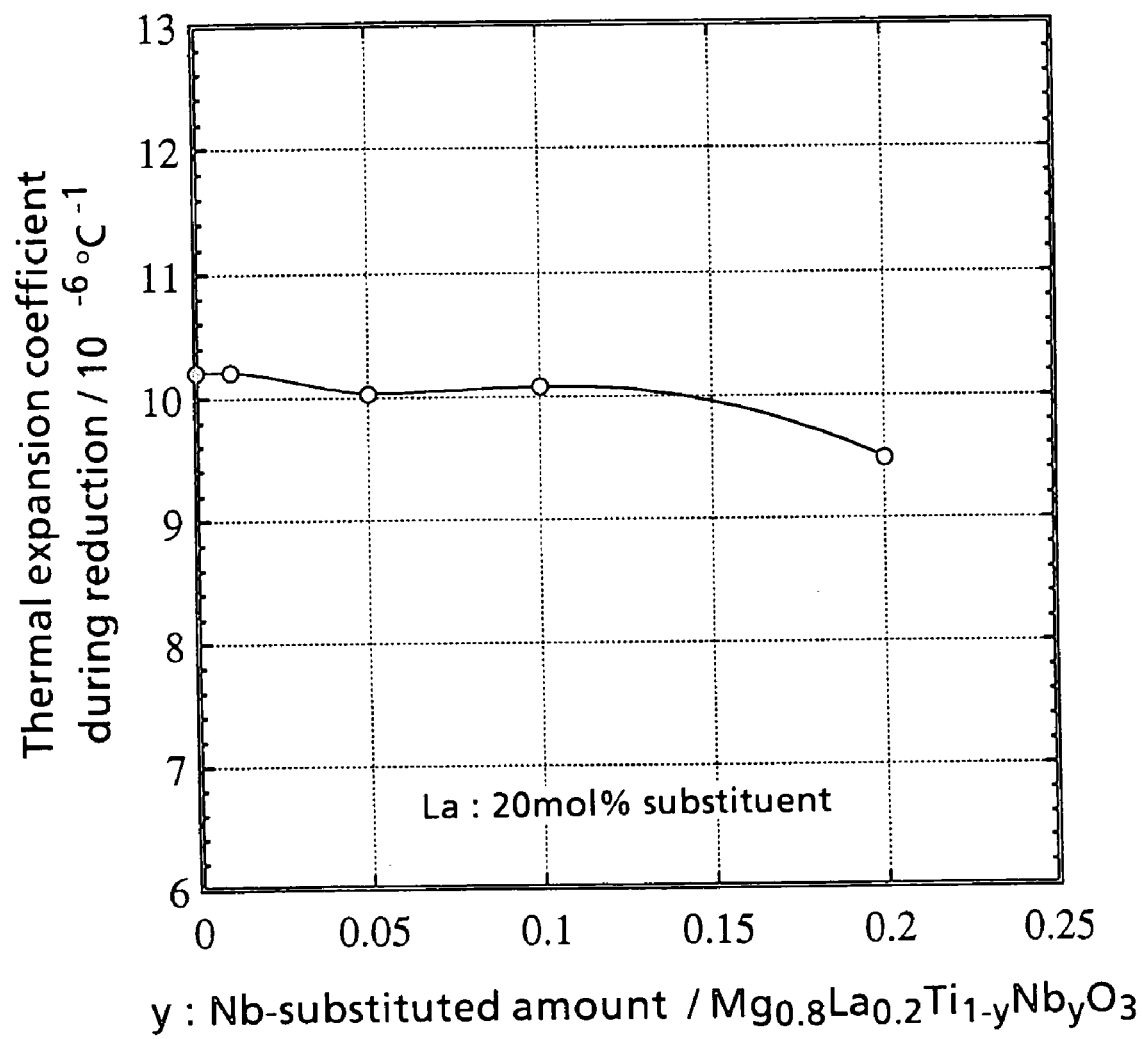
FIG. 11 is a graph showing the composition dependency of the thermal expansion coefficients during reduction of the two-component-substituted $MgTiO_3$ system interconnectors in Example 2 of the invention.

FIGS. 8 and 9 show the thermal expansion coefficients at 1,000° C. in the air and during reduction, respectively. FIGS. 10 and 11 show the thermal expansion coefficients in the air and during reduction, respectively, with the La-substituted amount being fixed at 20 mol %. The thermal expansion coefficient is defined as follows:

$$\text{Thermal expansion coefficient}=(L_2-L_0)/L_0/(T_1-T_0)$$
$$=dL/L_0/dT \quad (3)$$

where $L_0$: Length (mm) when returned to room temperature after burning, $L_2$: Length (mm) at measuring temperature, dL: ($L_2-L_0$) (mm), $T_0$: Room temperature/° C., $T_1$: Measuring temperature/° C., and dT: ($T_2-T_0$)/° C.

As seen in FIGS. 8, 9, 10 and 11, the La- and Nb-substituted amounts of 20% and 10% or less, respectively, give thermal expansion coefficients close to that of an electrolyte (10×10$^{-6}$/° C.)

The amounts substituted by La and Nb are both set at 20 mol % or less for the following reasons: Normally, partial substitution is possible by up to about 40 mol %, but an improvement in electric conductivity characteristics by the valence control method is usually saturated by several mol % or more, so that a large amount of substitution was not performed. With substitution by 40 mol % or more, it is highly likely that a decrease in electric conductivity will appear owing to the occurrence of a second phase.

Figure 12:
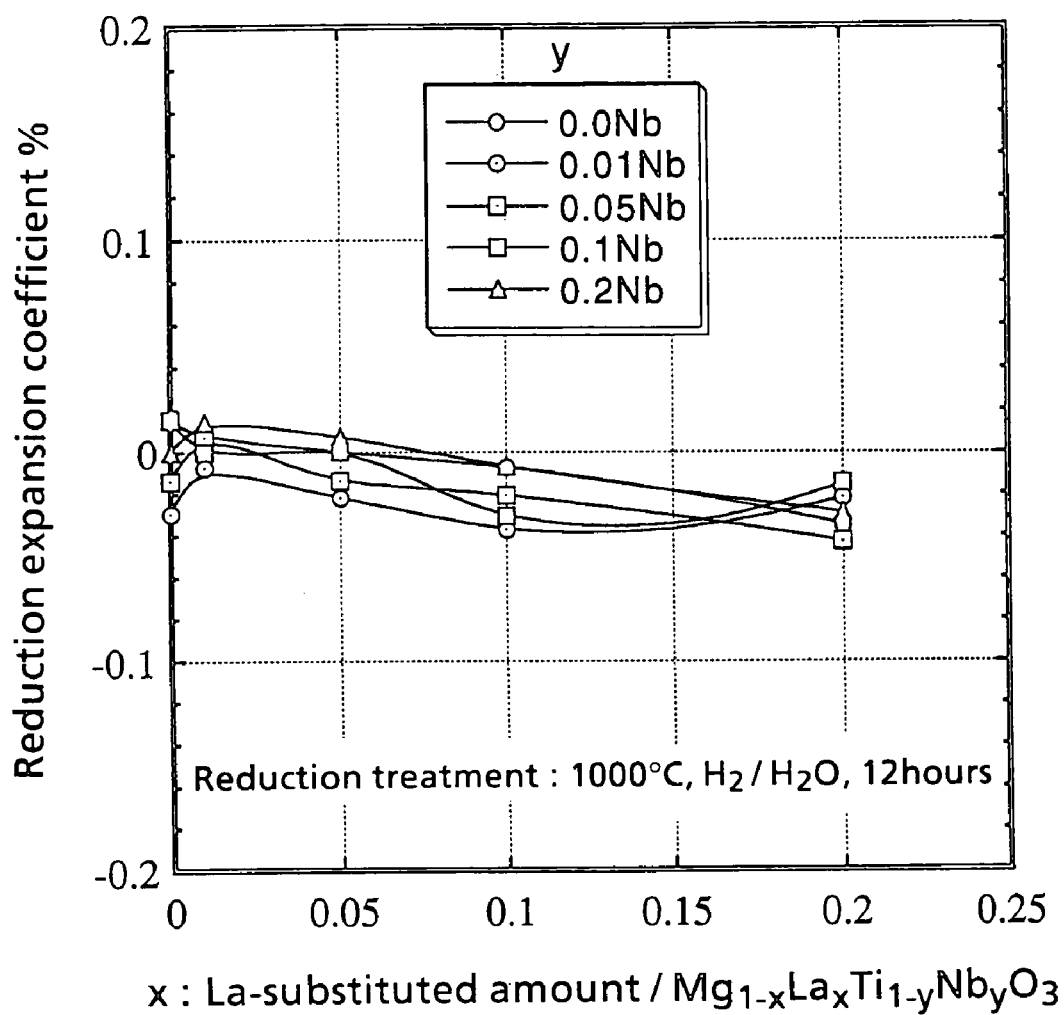
FIG. 12 is a graph showing the reduction expansion coefficients of the $MgTiO_3$ system interconnectors in Example 2 of the invention.
Figure 13:
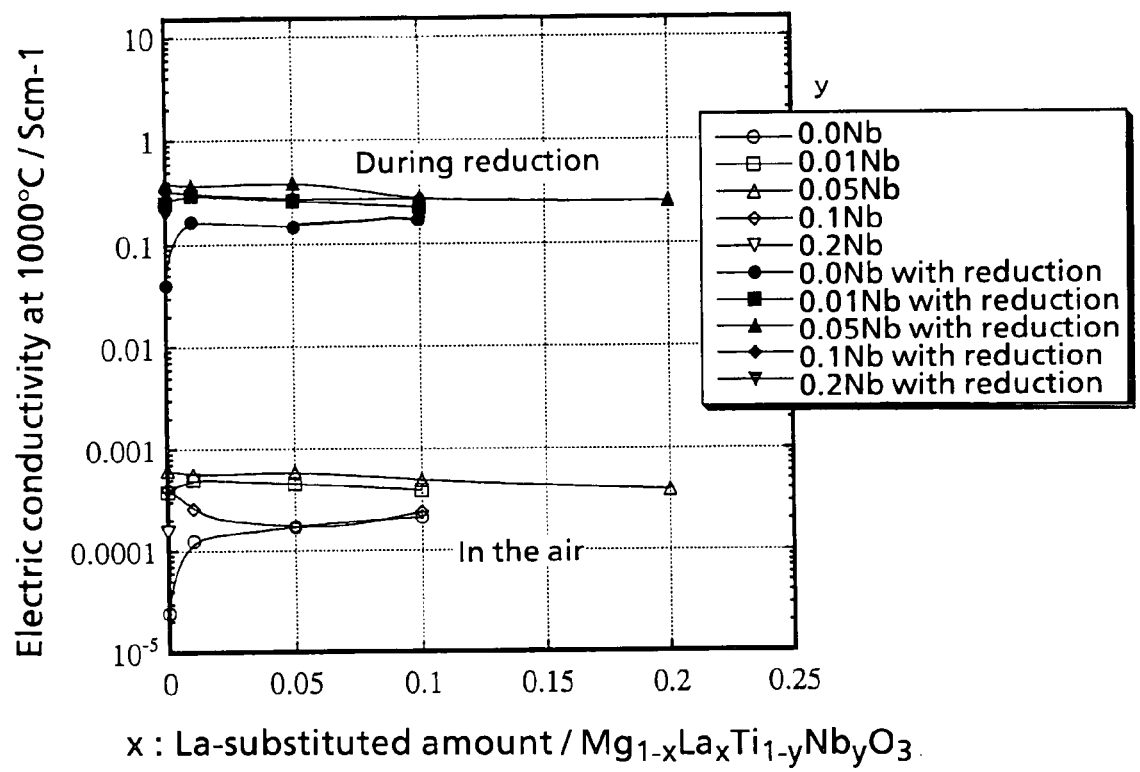
FIG. 13 is a graph showing the electric conductivities of the $MgTiO_3$ system interconnectors in Example 2 of the invention.

FIG. 12 gives the reduction expansion coefficients, which show very small changes with all compositions. FIG. 13 shows the electric conductivities at 1,000° C. in the air and during reduction. Compared with the samples without substitution by La or Nb, element substitution resulted in an improvement of electric conductivity by an order of magnitude or greater.

As described in detail above, an $MgTiO_3$ system material as an unsubstituted compound or substituted by various elements is suitable as an interconnector for a solid electrolyte type fuel battery.

EXAMPLE 3

Next, the present invention will be described in more detail with reference to concrete examples using a $CaTiO_3$ system interconnector. Example 2 demonstrated $MgTiO_3$ interconnectors to exhibit better characteristics than lanthanum chromite. Whereas Example 3 describes in further detail the properties of $CaTiO_3$ system interconnectors having Ca substituted for the Mg portion.

First, $CaTiO_3$ system interconnectors were prepared in the same manner as in Example 2. The compositions for these interconnectors contained La, Cr, Y, Sm and Al partially substituting for the Ca site (A site), or Nb or Ta partially substituting for the Ti site (B site). Since a $CaTiO_3$ system is also an n-type semiconductor, other elements can be added by the valence control method, as indicated in Example 2.

Figure 14:
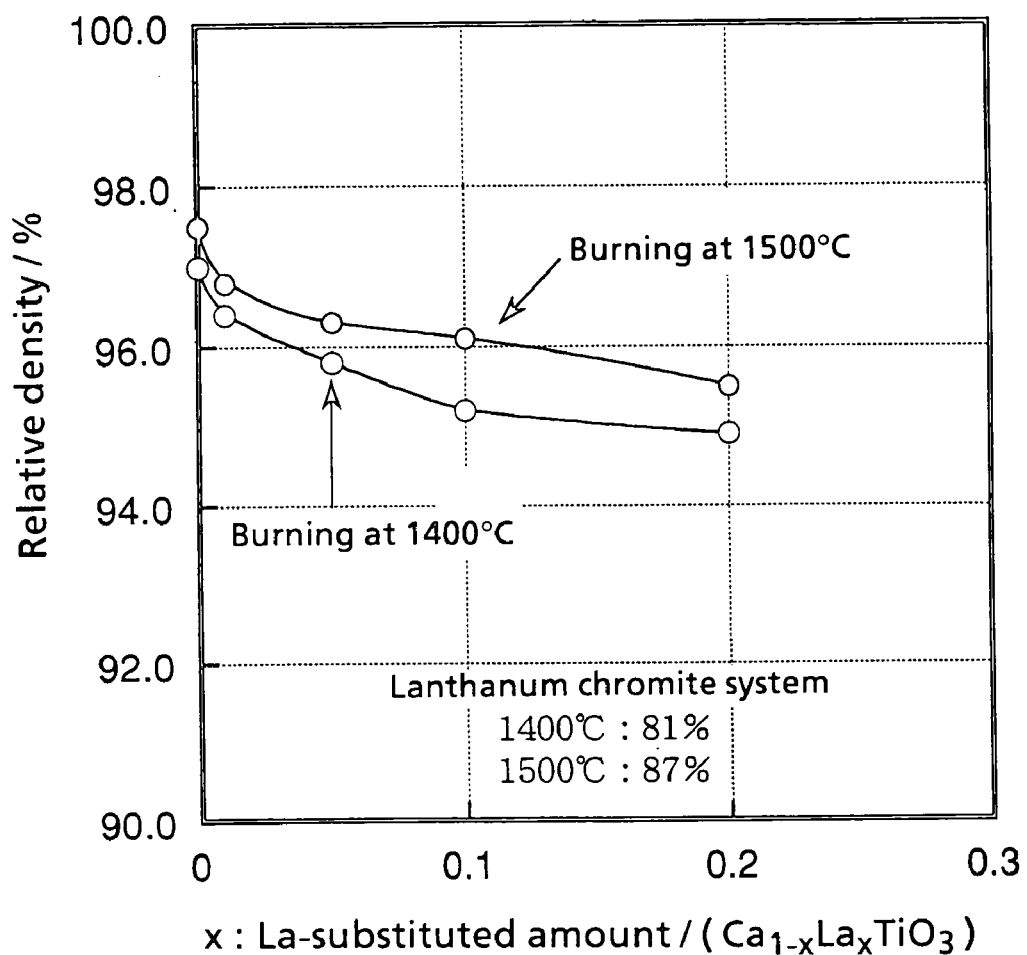
FIG. 14 is a graph showing the relative densities of $CaTiO_3$ system interconnectors in Example 3 of the invention.
Figure 15:
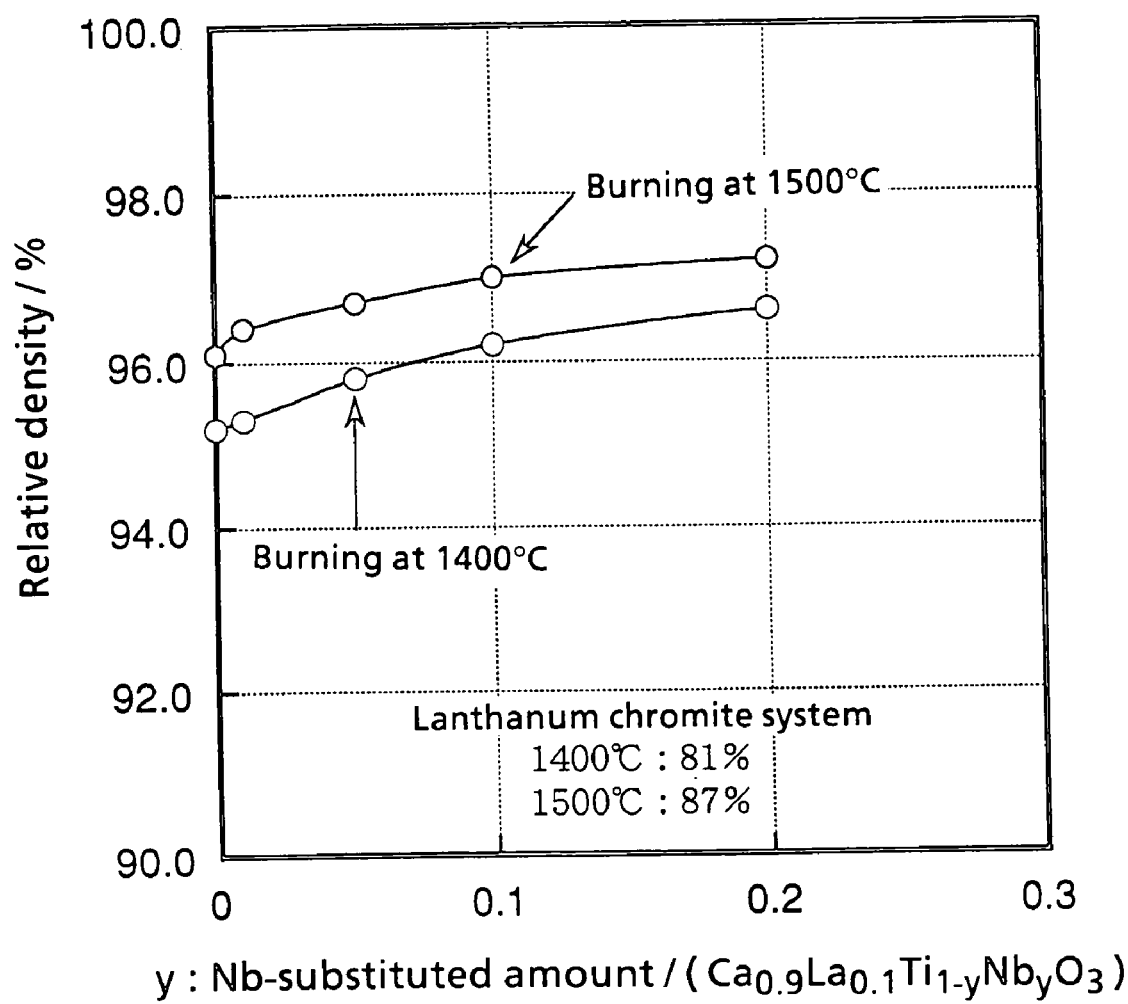
FIG. 15 is a graph showing the composition dependency of the relative densities of two-component-substituted $CaTiO_3$ system interconnectors in Example 3 of the invention.

FIGS. 14 and 15 show the relative densities of burned $CaTiO_3$ system products with the varied amounts of La and Nb added. FIGS. 14 and 15 reveal that even after burning at 1,400° C., the relative densities were 95% or more with all compositions, while the burned lanthanum chromite as control exhibited relative densities of 81% at 1,400° C. and 87% at 1,500° C. This is proof that the $CaTiO_3$ system products are easy to burn. The addition of Nb has the effect of promoting particle growth, so that as the amount of Nb added increased, there was a tendency toward a higher relative density.

Figure 16:
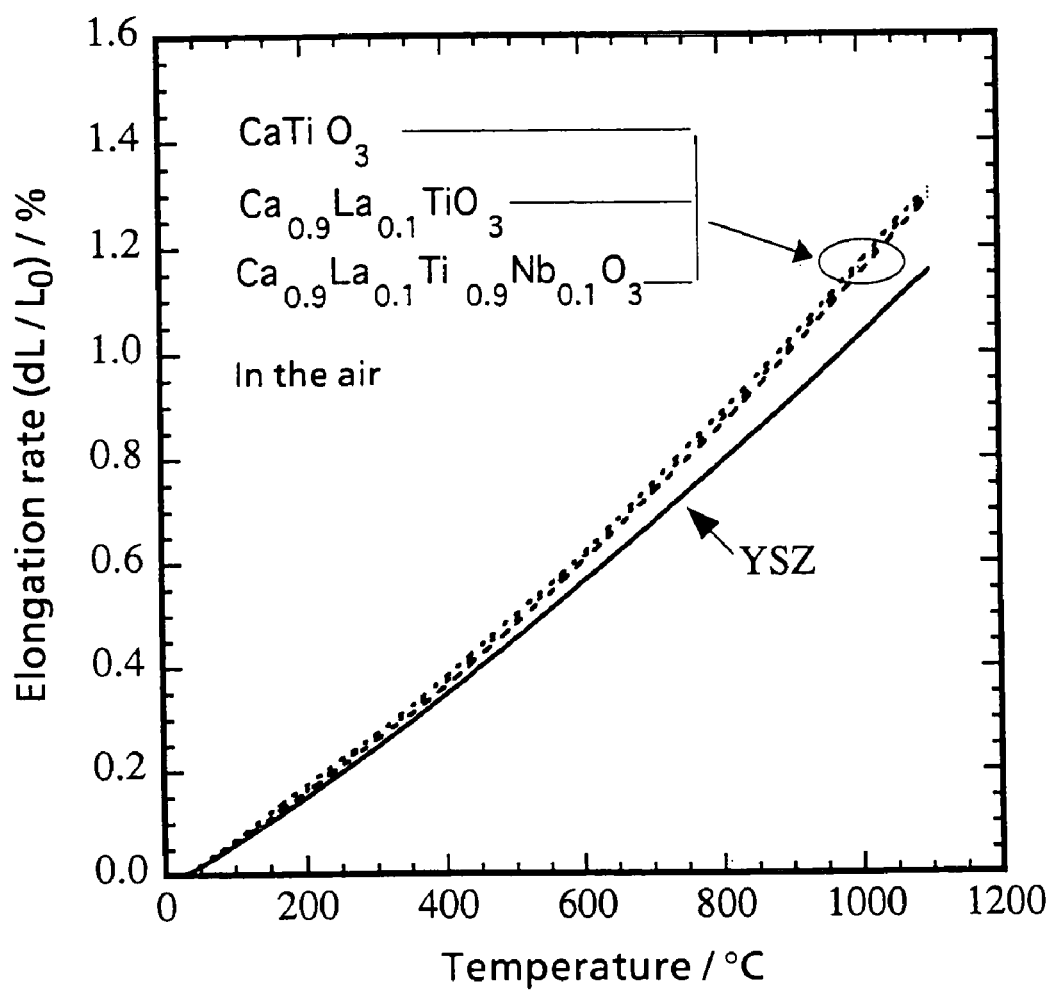
FIG. 16 is a graph showing the thermal expansion characteristics of the $CaTiO_3$ system interconnectors in Example 3 of the invention.
Figure 17:
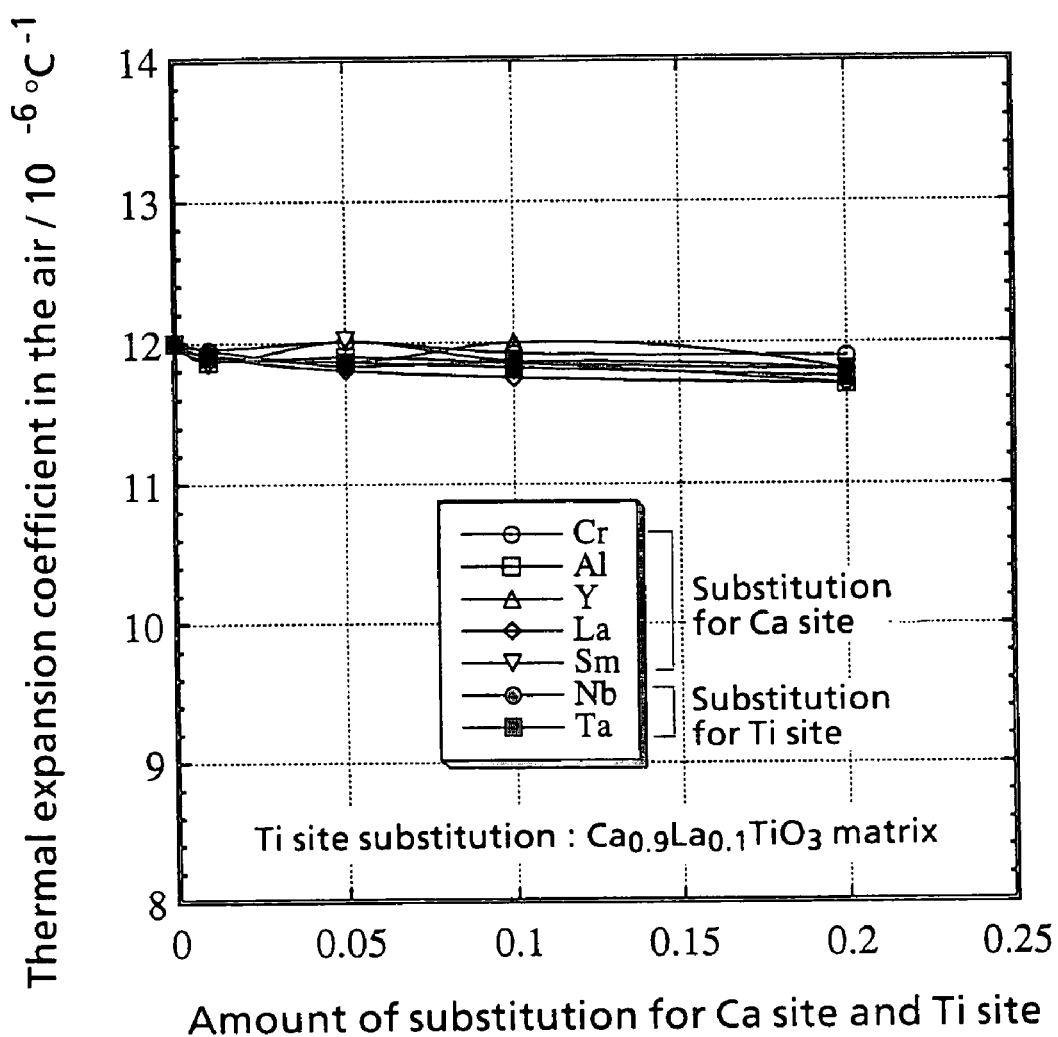
FIG. 17 is a graph showing the composition dependency of the thermal expansion coefficients in the air of the $CaTiO_3$ system interconnectors in Example 3 of the invention.
Figure 18:
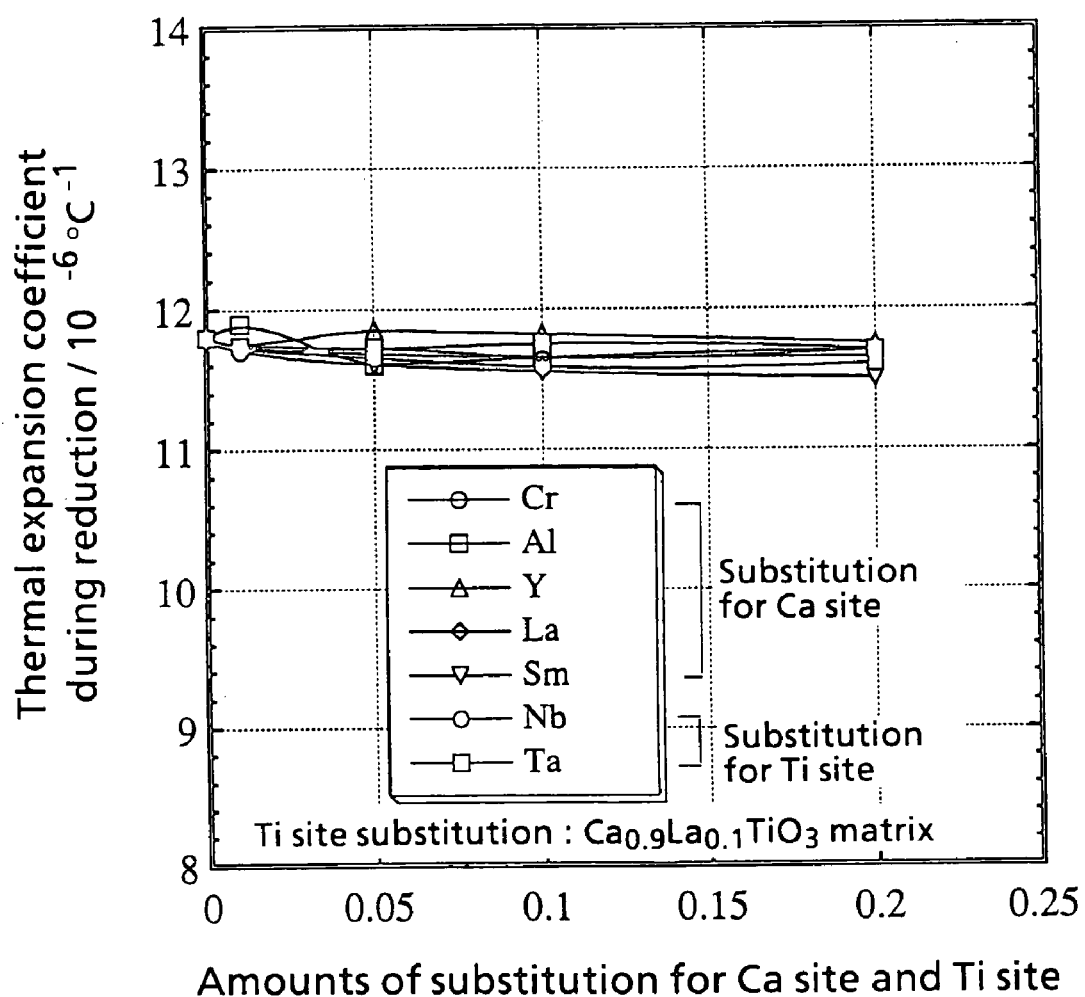
FIG. 18 is a graph showing the composition dependency of the thermal expansion coefficients during reduction of the $CaTiO_3$ system interconnectors in Example 3 of the invention.

FIG. 16 shows the thermal expansion behavior of burned $CaTiO_3$ system products, which is slightly greater than the thermal expansion of YSZ. FIGS. 17 and 18 show the thermal expansion coefficients in the air and during reduction.

From FIGS. 17 and 18, it is clear that the values are about 11.5 to $12.0 \times 10^{-6}$ $C.^{-1}$ regardless of the composition, and they are slightly higher than the value of YSZ, $10.0 \times 10^{-6}$ $C.^{-1}$.

Figure 19:
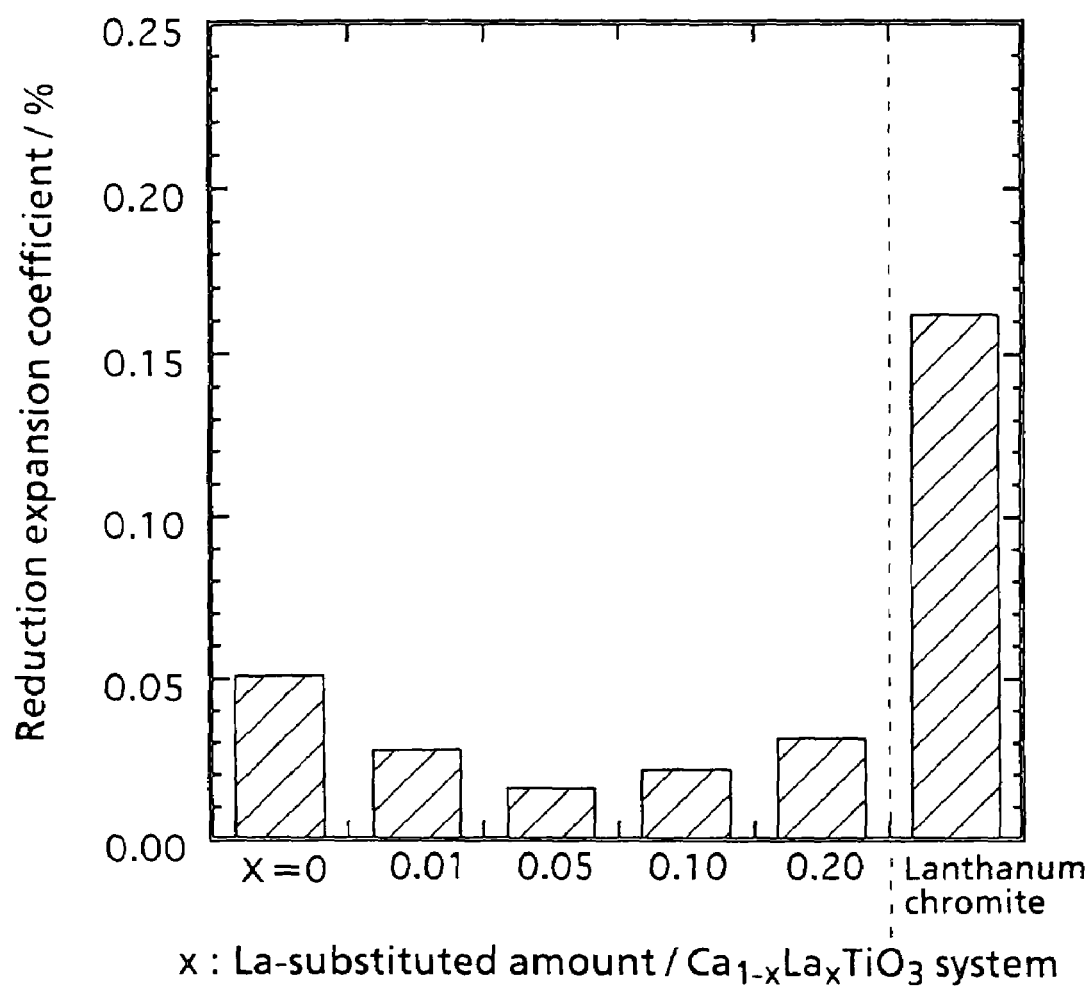
FIG. 19 is a graph showing the reduction expansion coefficients of the $CaTiO_3$ system interconnectors in Example 3 of the invention.
Figure 20:
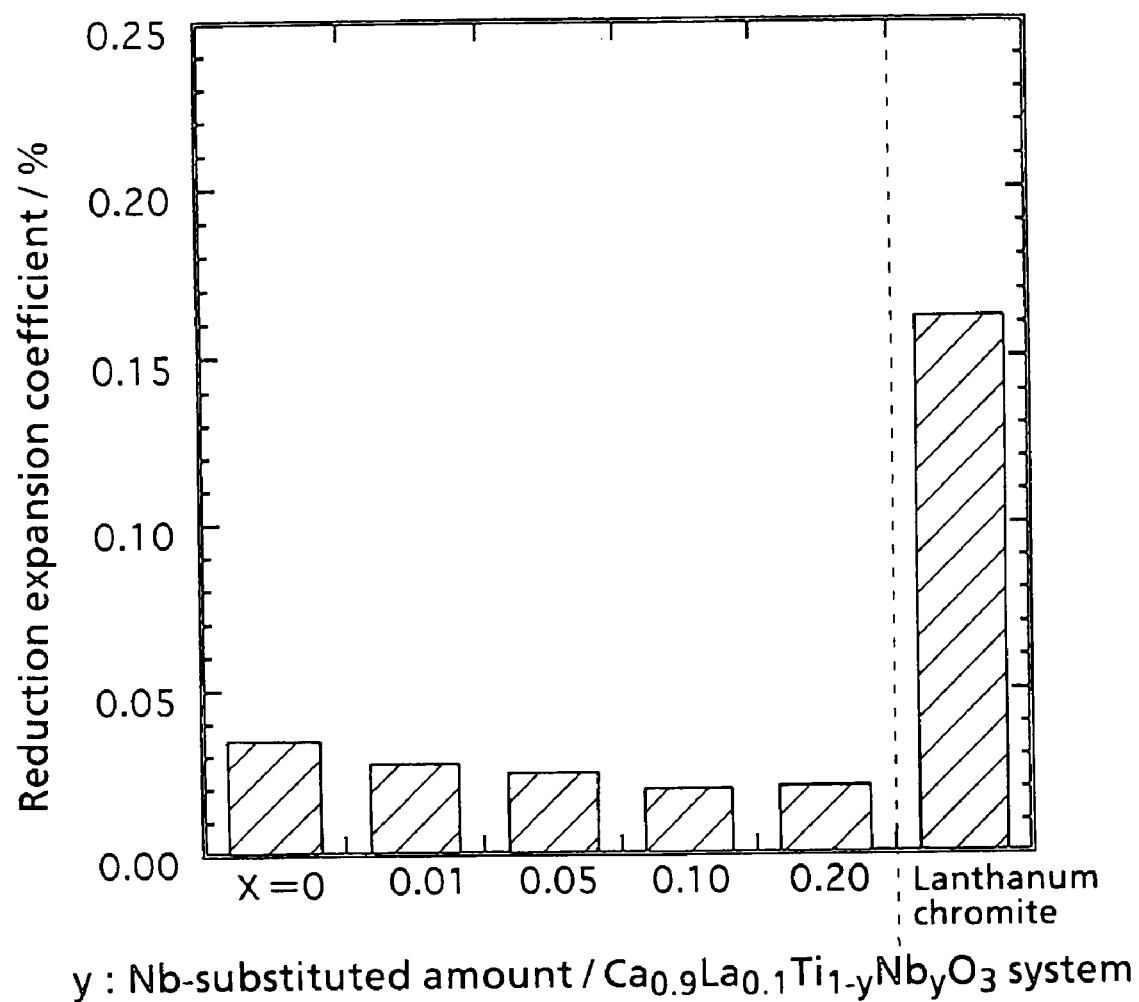
FIG. 20 is a graph showing the reduction expansion coefficients of the two-component-substituted $CaTiO_3$ system interconnectors in Example 3 of the invention.

FIGS. 19 and 20 show the reduction expansion coefficients of $CaTiO_3$ systems with the varied amounts of La and Nb added. These drawings indicate that the reduction expansion coefficients of the $CaTiO_3$ systems are very small compared with that of lanthanum chromite and are minimally affected by the composition.

Figure 21:
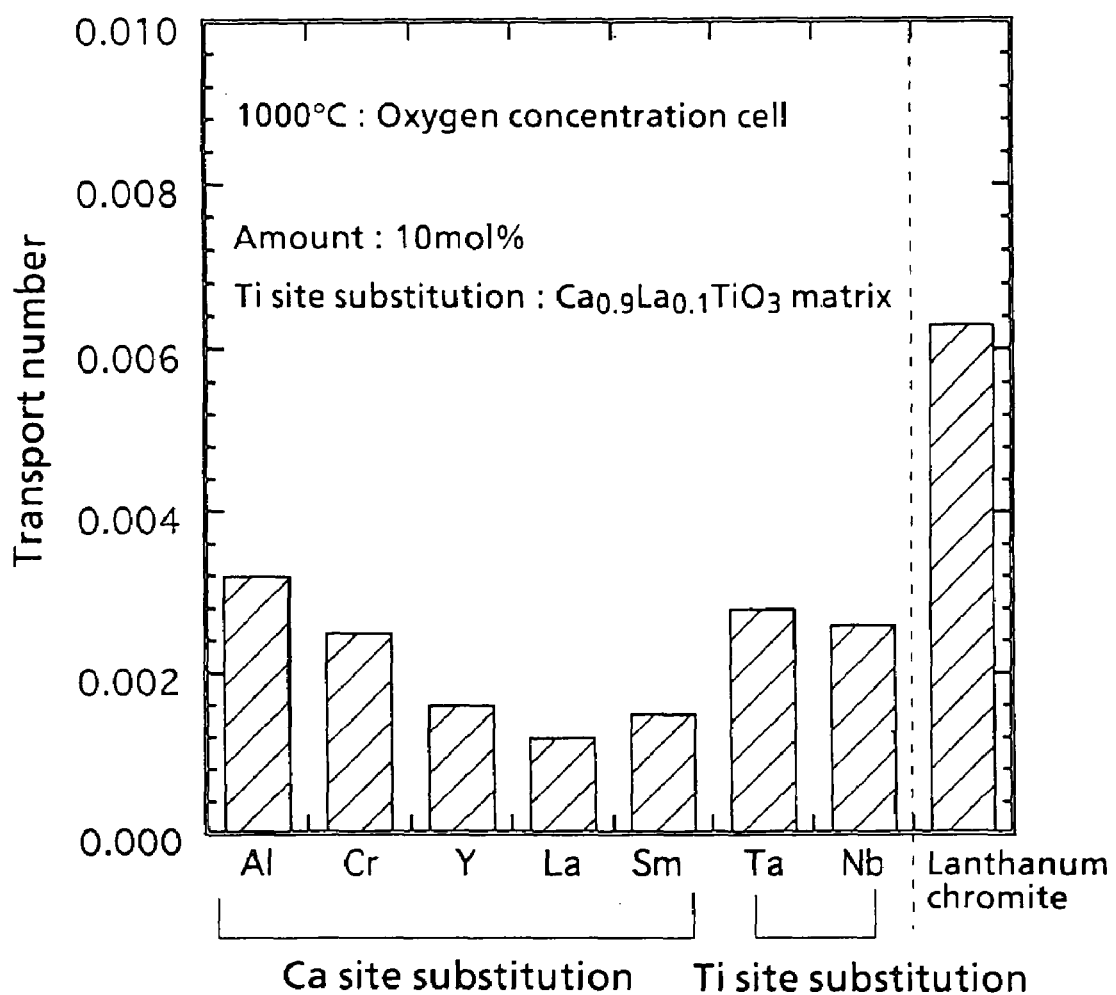
FIG. 21 is a graph showing the transport numbers of the $CaTiO_3$ system interconnectors in Example 3 of the invention.

FIG. 21 shows the transport numbers of oxygen ions which are the incorporation rates of oxygen ion conduction in $CaTiO_3$ system interconnectors.

Figure 22:
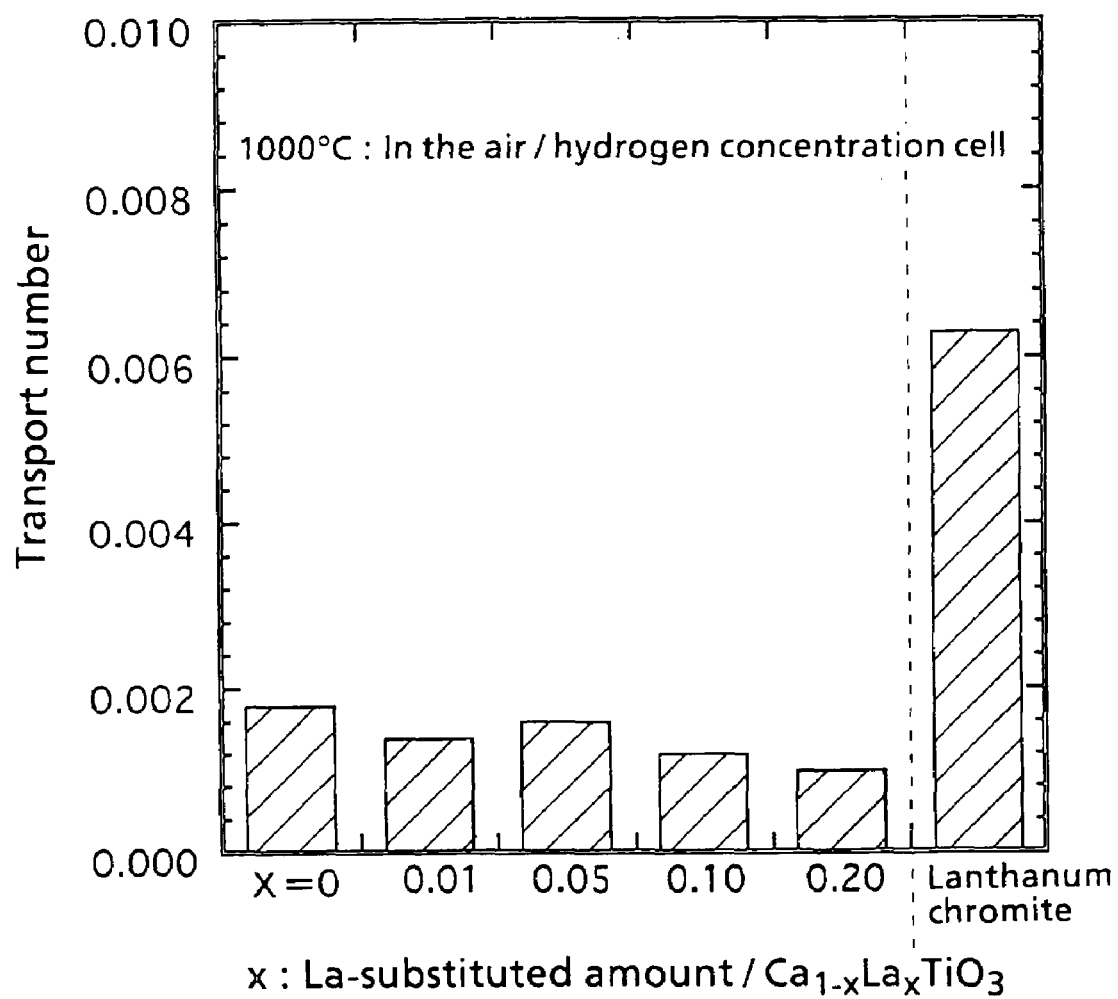
FIG. 22 is a graph showing the transport numbers of the two-component-substituted $CaTiO_3$ system interconnectors in Example 3 of the invention.

The transport number was determined by a method which comprises bonding the resulting pellets to an alumina ceramic tube by the use of an inorganic adhesive, flowing room temperature humidified hydrogen and air on both sides of the pellets to form an oxygen concentration cell at 1,000° C., and measuring the electromotive force. In the case of an interconnector, the lower the value of the transport number, the better the outcome. FIG. 21 shows that the $CaTiO_3$ system interconnectors have smaller transport numbers for oxygen ions in comparison with lanthanum chromite. FIG. 22 indicates the relationship between the transport numbers and compositions of $CaTiO_3$ system interconnectors. The results in these drawings show that the transport numbers of the $CaTiO_3$ system interconnectors do not depend on the composition, but are fully small.

Figure 23:
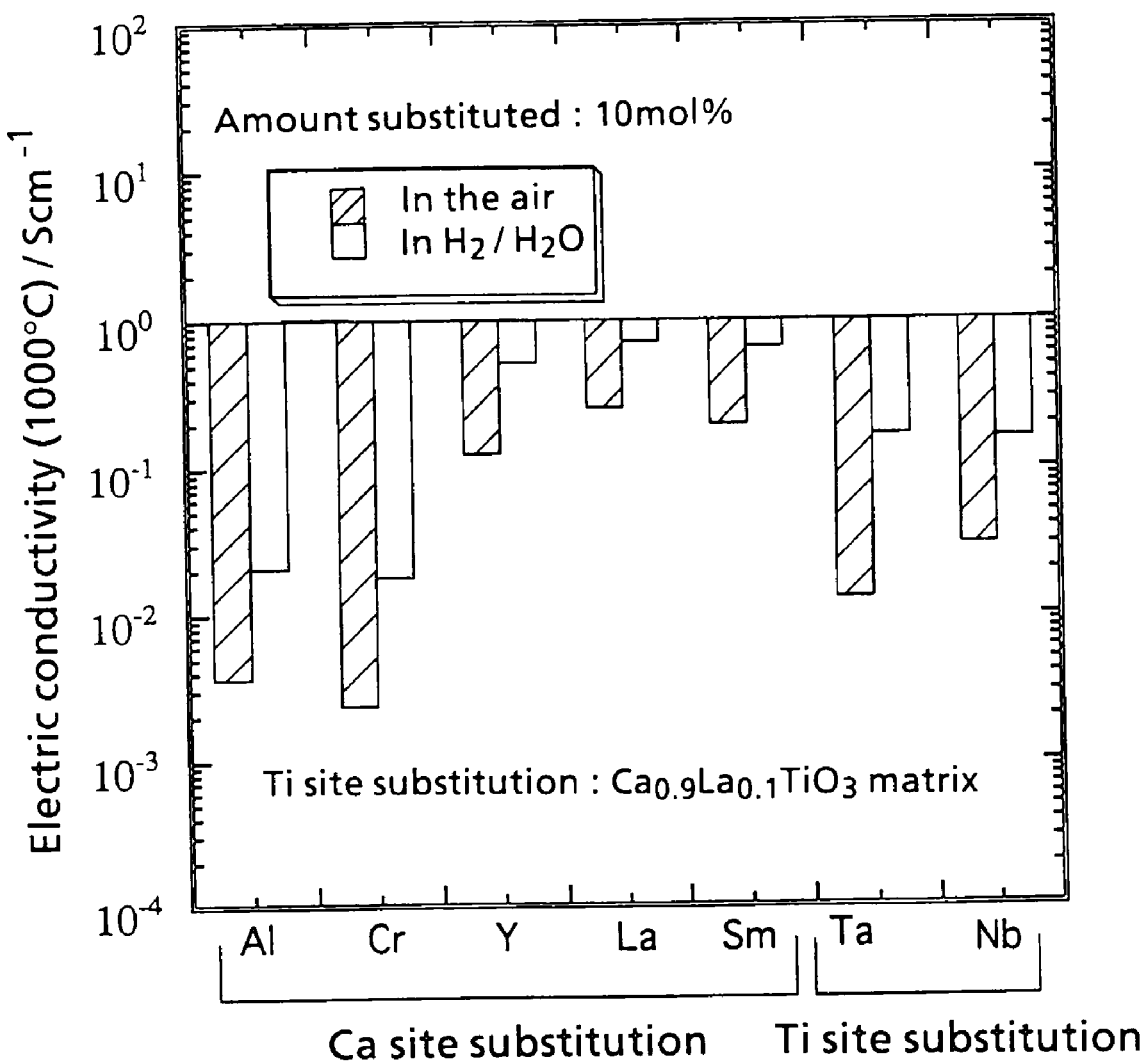
FIG. 23 is a graph showing the electric conductivities of the $CaTiO_3$ system interconnectors in Example 3 of the invention.

FIG. 23 shows the electric conductivities, in the air and during reduction, of $CaTiO_3$ system interconnectors substituted by various elements. From this drawing, it is clear that the conducting properties of the interconnectors with the Ca partially substituted by Y, La and Sm were satisfactory.

Figure 24:
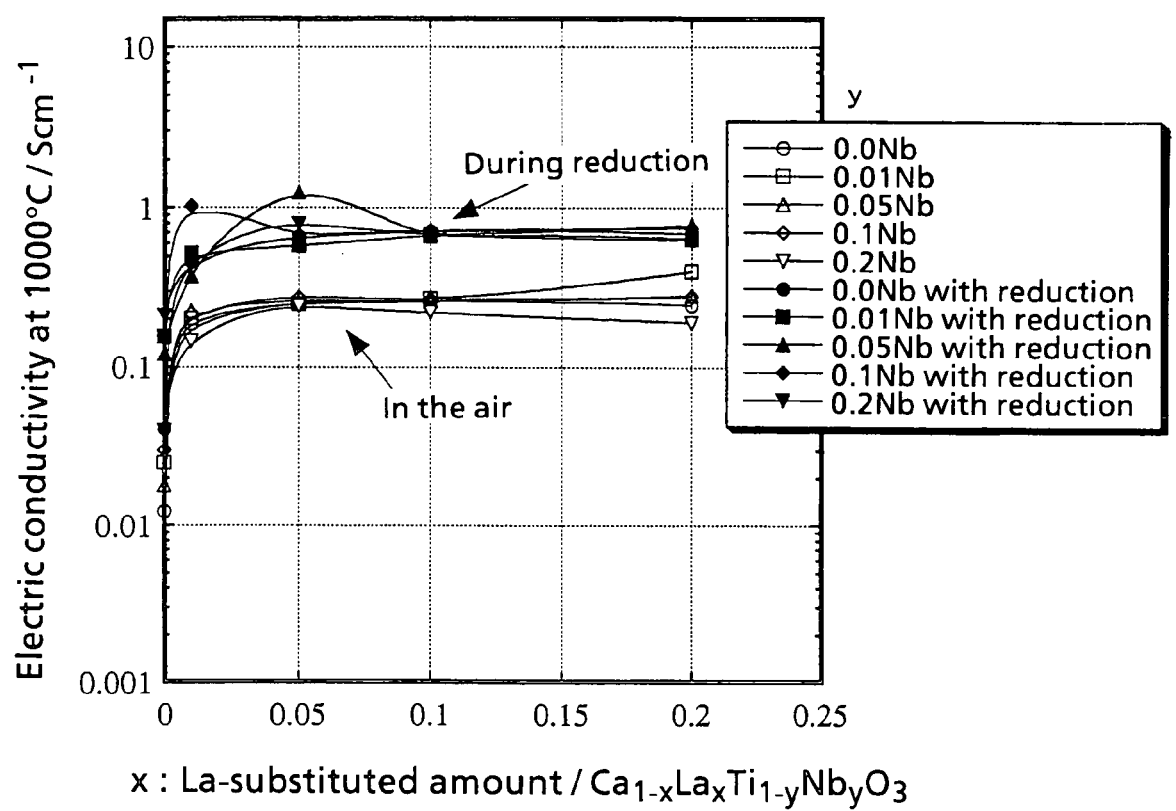
FIG. 24 is a graph showing the electric conductivities of the two-component-substituted $CaTiO_3$ system interconnectors in Example 3 of the invention.

FIG. 24 shows the effect of the amount of substitution on the electric conductivity in $CaTiO_3$ system interconnectors with the Ca site and the Ti site substituted by La and Nb, respectively. The results show that element substitution results in a marked improvement in electric conductivity. FIG. 24 shows only systems with the Ca site and the Ti site substituted by La and Nb, respectively. The systems illustrated in FIG. 23, on the other hand, were subjected to substitution of the Ca site by a single element, substitution of the Ti site by a single element, and simultaneous substitution of both sites. As a result, it turned out that electric conductivity is improved by substitution as in FIG. 24, and that in substitution of both sites, substitution by a single element which imparts higher conducting properties is predominant as is generally said.

As described in detail above, a $CaTiO_3$ system material as an unsubstituted compound or substituted by various elements is suitable as an interconnector for a solid electrolyte type fuel battery.

EXAMPLE 4

In FIGS. 16, 17 and 18 of Example 3, the thermal expansion coefficients of $CaTiO_3$ system interconnectors were shown to be slightly larger than that of YSZ. In this Example, materials having low thermal expansion materials added to a $CaTiO_3$ system to control the thermal expansion coefficient will be described in more detail with reference to concrete examples.

The $CaTiO_3$ system used here is $Ca_{0.9}La_{0.1}TiO_3$, and it was prepared by the same method as in Example 2. Low thermal expansion materials in predetermined amounts were each added to the resulting calcined powder, and their mixing was continued for 12 hours in the form of an ethanol slurry. The mixture was turned into a dry powder, and then the powder was formed into a burned product.

Figure 25:
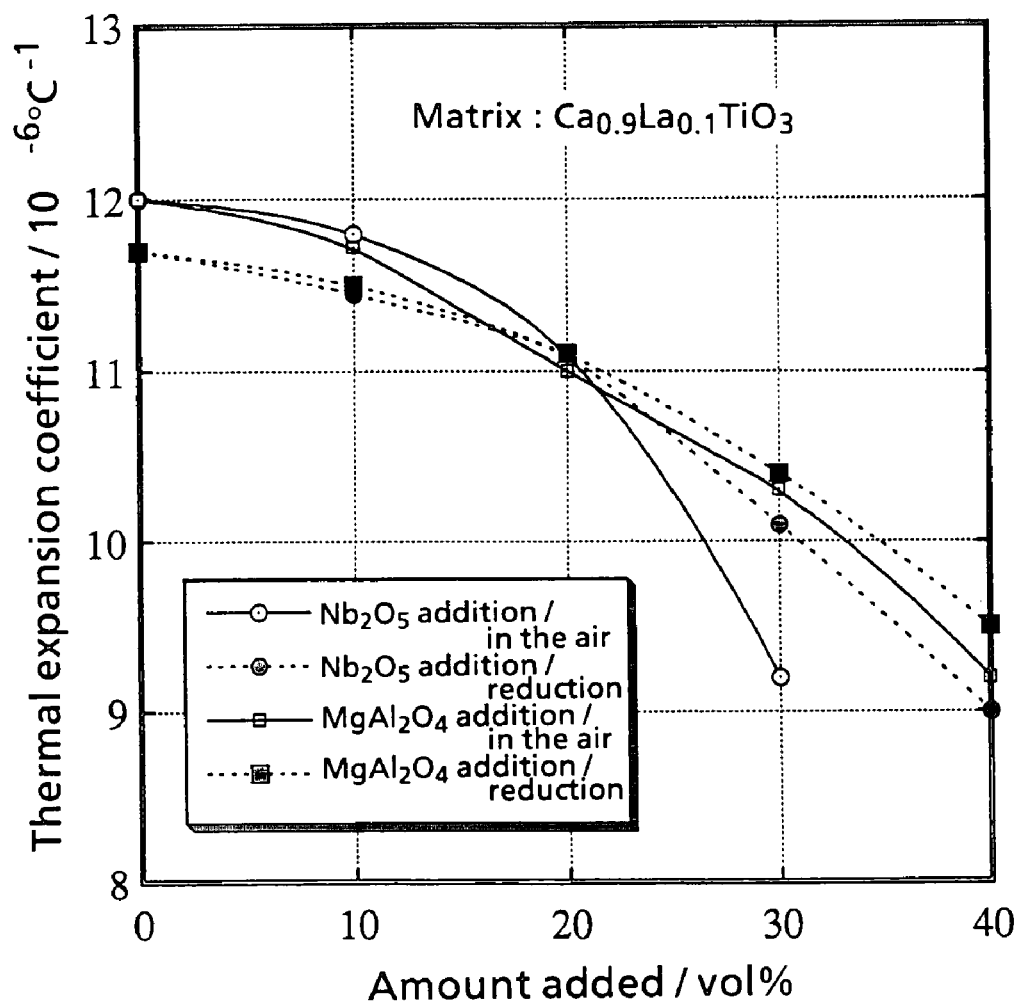
FIG. 25 is a graph showing the thermal expansion coefficients of thermal expansion coefficient control type $CaTiO_3$ system interconnectors in Example 4 of the invention.

FIG. 25 shows changes in the thermal expansion coefficients in response to the amounts of low thermal expansion materials, $Nb_2O_5$ and $MgAl_2O_4$ added to $Ca_{0.9}La_{0.1}TiO_3$. From FIG. 25, it is clear that the addition of the low thermal expansion material made it possible to control the thermal expansion coefficient so as to agree with the thermal expansion coefficient of YSZ. Such control of the thermal expansion coefficient by the addition of a low thermal expansion material is clear to competitors of the ordinary skill in the art. Besides $Nb_2O_5$ and $MgAl_2O_4$, it is also fully feasible to add $Al_2O_3$, $Y_2O_3$, $TiO_2$, $ZrO_2$, $SiO_2$, $Ta_2O_5$, $SiO_2$, $HfO_2$, $Pr_2O_{11}$, $Ta_2O_5$, $ZrSiO_4$, oxides of rare earth elements, and oxides of alkaline earth elements. When the thermal expansion coefficient was measured with the amount of the above oxide added being fixed at 20 vol %, it was confirmed that the thermal expansion coefficients in all systems except for the $SiO_2$-added system became smaller than before the addition.

Figure 26:
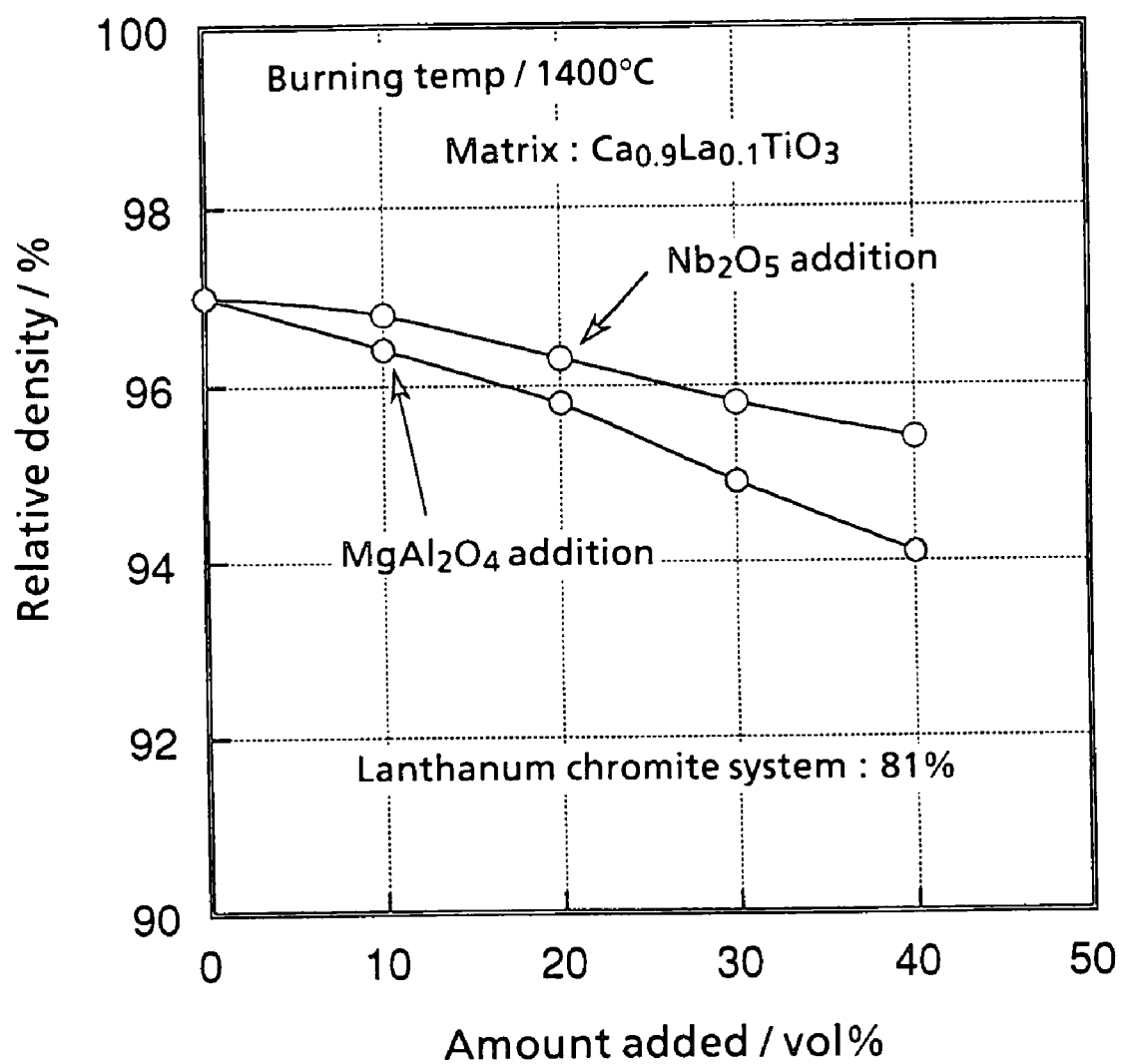
FIG. 26 is a graph showing the relative densities of the thermal expansion coefficient control type $CaTiO_3$ system interconnectors in Example 4 of the invention.

FIG. 26 shows the relative densities at 1,400° C. of burned $CaTiO_3$ systems with the varied amounts of low thermal expansion materials added. This drawing reveals that even after burning at 1,400° C., the relative densities were 94% or more with all compositions, while the burned lanthanum chromite as control exhibited a relative density of 81%. This is proof that even the $CaTiO_3$ systems incorporating the low thermal expansion materials are fully easy to burn.

Figure 27:
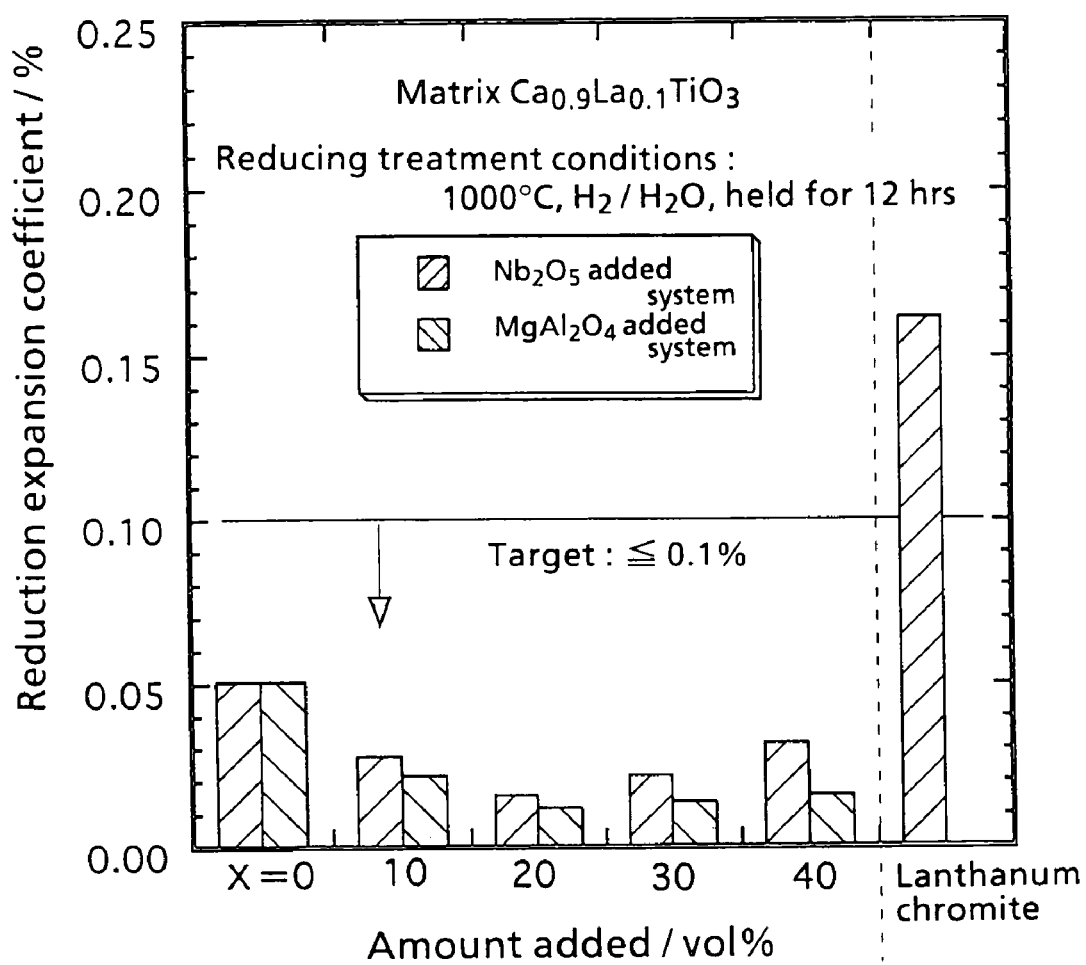
FIG. 27 is a graph showing the reduction expansion coefficients of the thermal expansion coefficient control type $CaTiO_3$ system interconnectors in Example 4 of the invention.

FIG. 27 shows the reduction expansion coefficients of $CaTiO_3$ systems incorporating low thermal expansion materials, which are found to be very low compared with that of lanthanum chromite.

Figure 28:
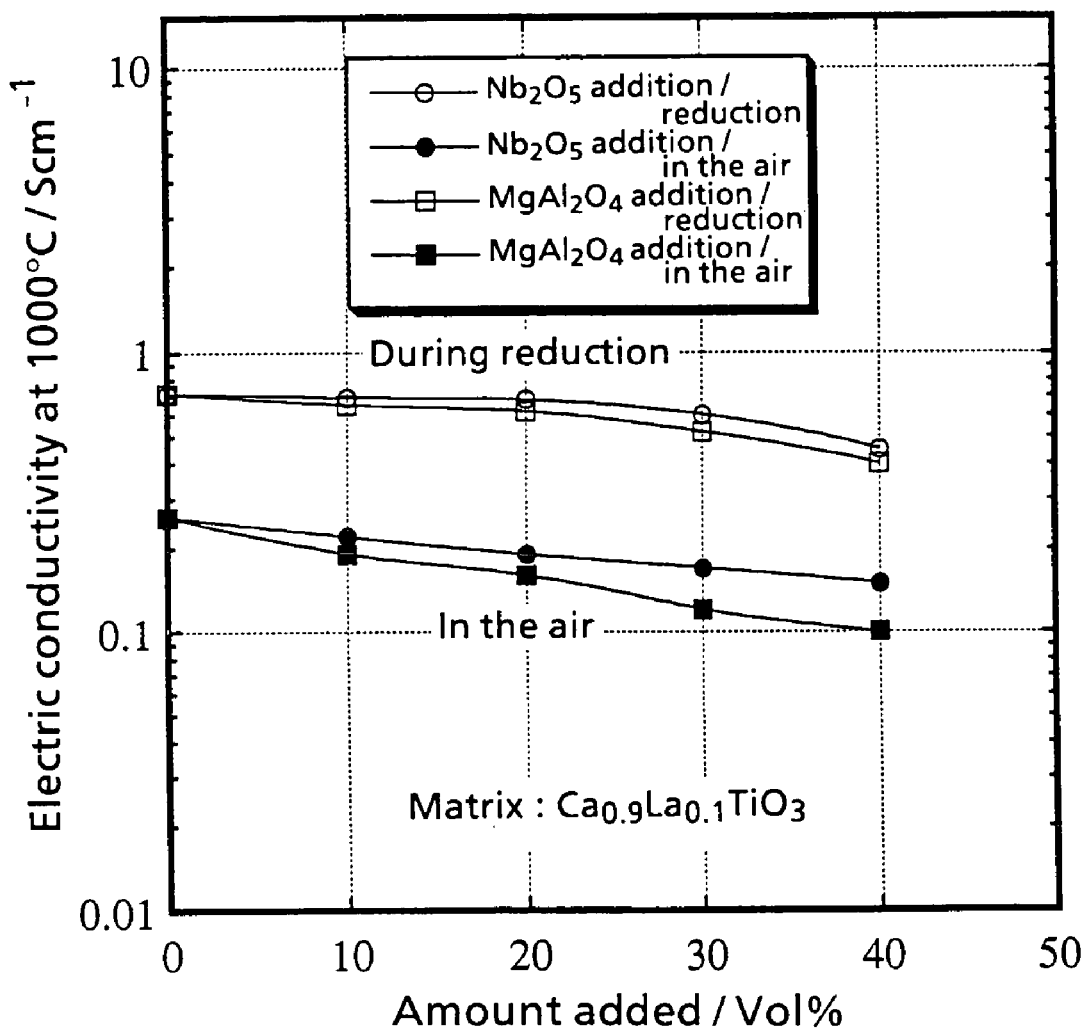
FIG. 28 is a graph showing the electric conductivities of the thermal expansion coefficient control type $CaTiO_3$ system interconnectors in Example 4 of the invention.
Figure 29:
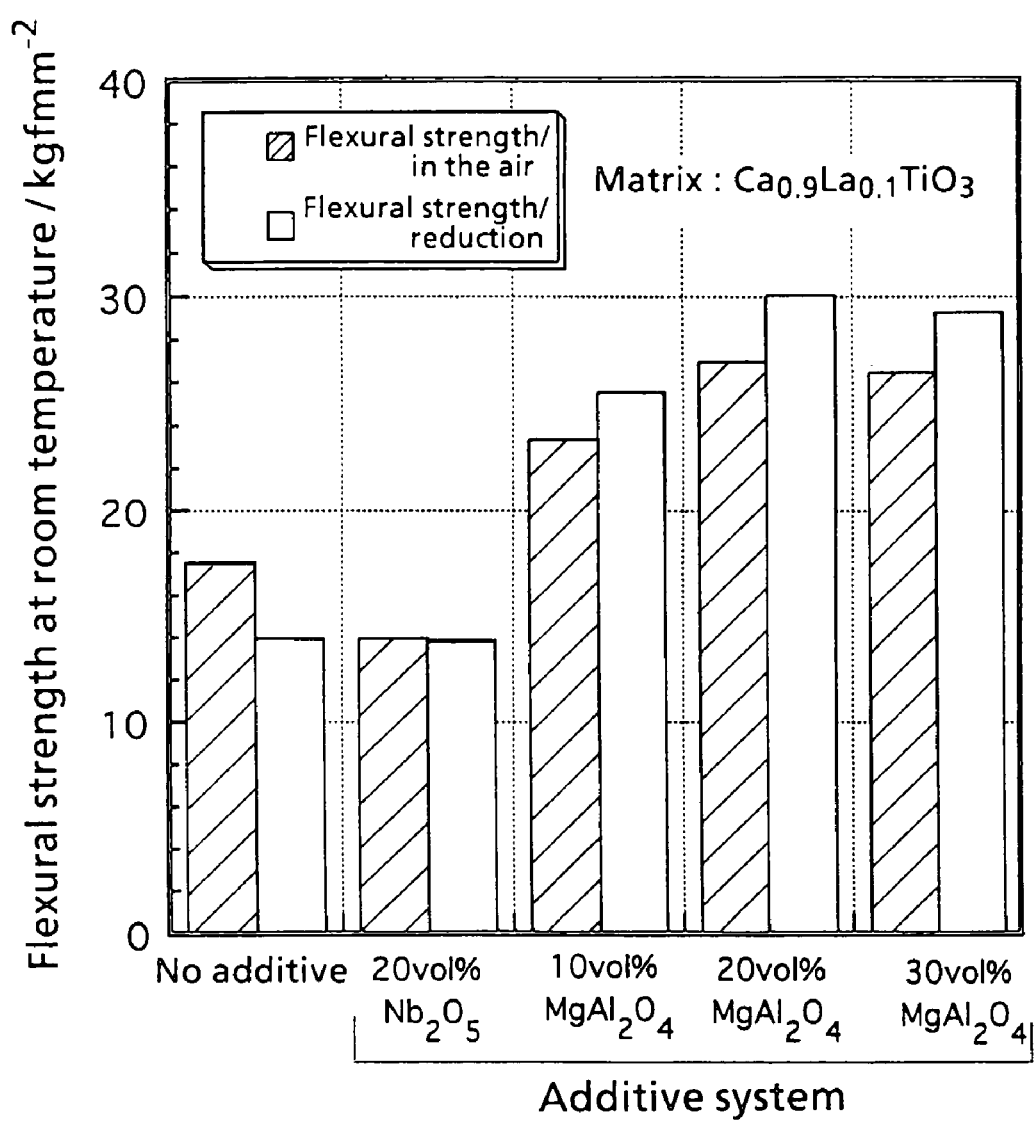
FIG. 29 is a graph showing the flexural strengths of the thermal expansion coefficient control type $CaTiO_3$ system interconnectors in Example 4 of the invention.

FIG. 28 shows the electric conductivities, in the air and during reduction, of $CaTiO_3$ systems containing low thermal expansion materials. The results in the drawing showed that the addition of the low thermal expansion materials did not result in a sharp decrease in electric conductivity. FIG. 29 shows the flexural strengths of $CaTiO_3$ systems containing low thermal expansion materials from the viewpoint of practical use. From FIG. 29, it becomes clear that compared with the material without addition, the addition of $Nb_2O_5$ produced little change in strength, while the addition of $MgAl_2O_4$ rather increased strength because of its effect of preventing particle growth.

As described in detail above, a $CaTiO_3$ system incorporating a low thermal expansion material is a satisfactory material as an interconnector for a solid electrolyte type fuel battery.

EXAMPLE 5

Next, the present invention will be described in greater detail by reference to concrete examples using $SrTiO_3$ system interconnectors. Examples 2 and 3 demonstrated $MgTiO_3$ and $CaTiO_3$ system interconnectors to exhibit better characteristics than lanthanum chromite, while this Example 5 presents a more detailed explanation for the properties of $SrTiO_3$ system interconnectors.

First, $SrTiO_3$ system interconnectors were prepared in the same manner as in Example 2. The compositions for these interconnectors contained rare earth elements such as Al, Cr and La partially substituting for the Sr site (A site), or elements such as Ta and Nb partially substituting for the Ti site (B site). Since $SrTiO_3$ systems are also found by measurement to be n-type semiconductors, other elements can be added, as described in detail in Example 3.

Figure 30:
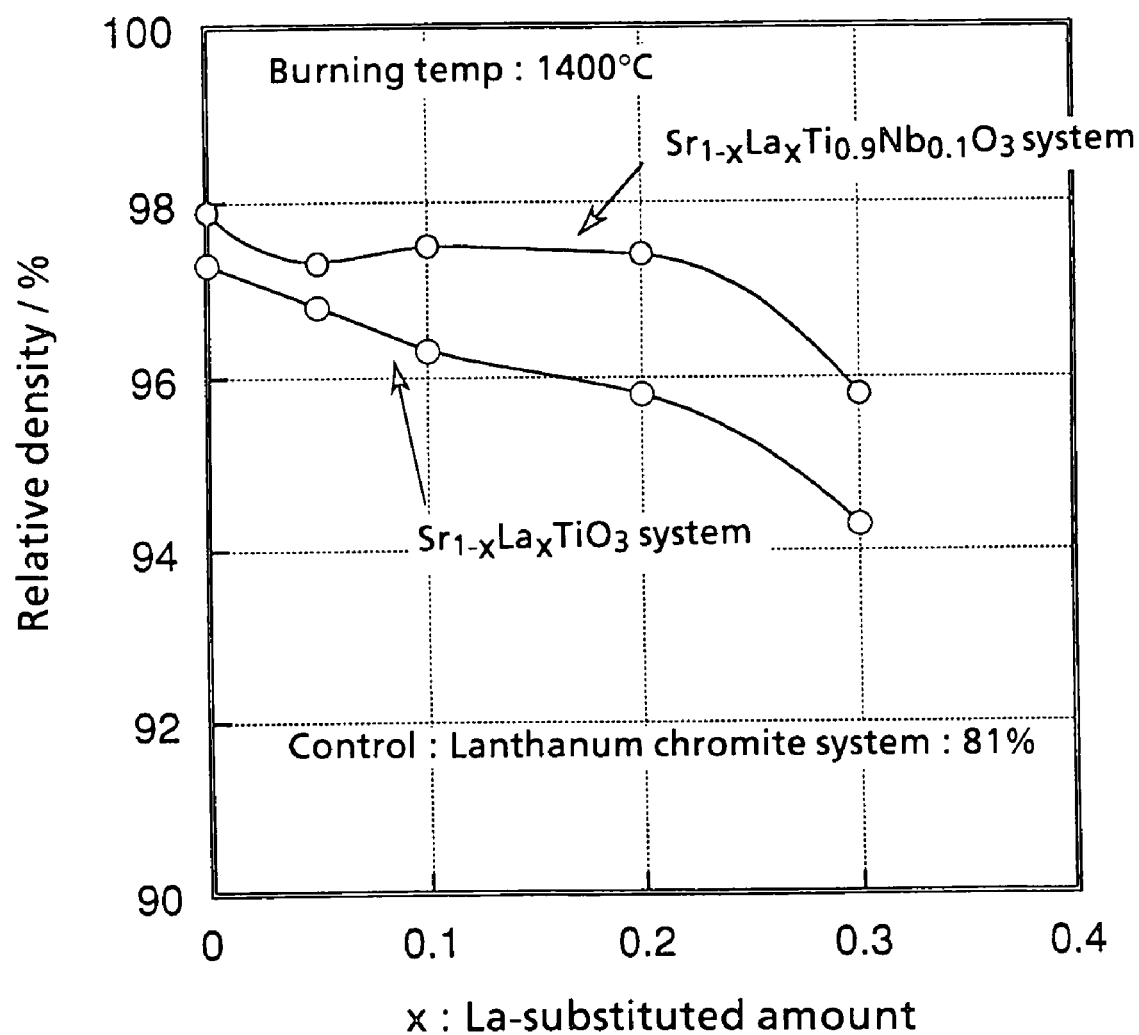
FIG. 30 is a graph showing the relative densities of $SrTiO_3$ system interconnectors in Example 5 of the invention.

FIG. 30 shows the relative densities of burned $SrTiO_3$ systems with the varied amounts of La added. It becomes clear that even after burning at 1,400° C., the relative densities were 94% or more with all compositions, while the burned lanthanum chromite as control exhibited a relative density of 81%. This is proof that the $SrTiO_3$ systems are easy to burn. With all the other compositions having the substitution amount of 20 mol % or less, the relative densities were 95% or more.

Figure 31:
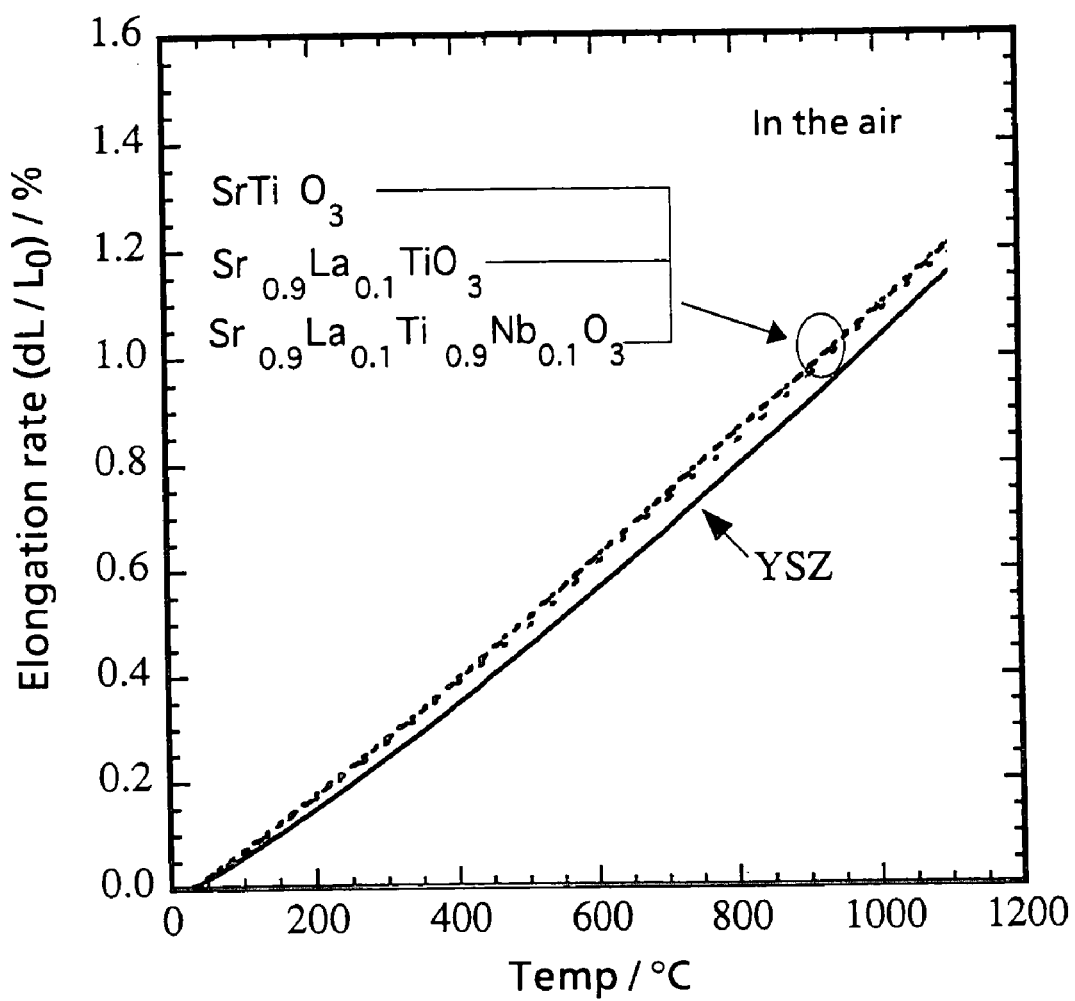
FIG. 31 is a graph showing the thermal expansion characteristics of the $SrTiO_3$ system interconnectors in Example 5 of the invention.

FIG. 31 shows the thermal expansion behavior in the air of burned $SrTiO_3$ system products.

Figure 32:
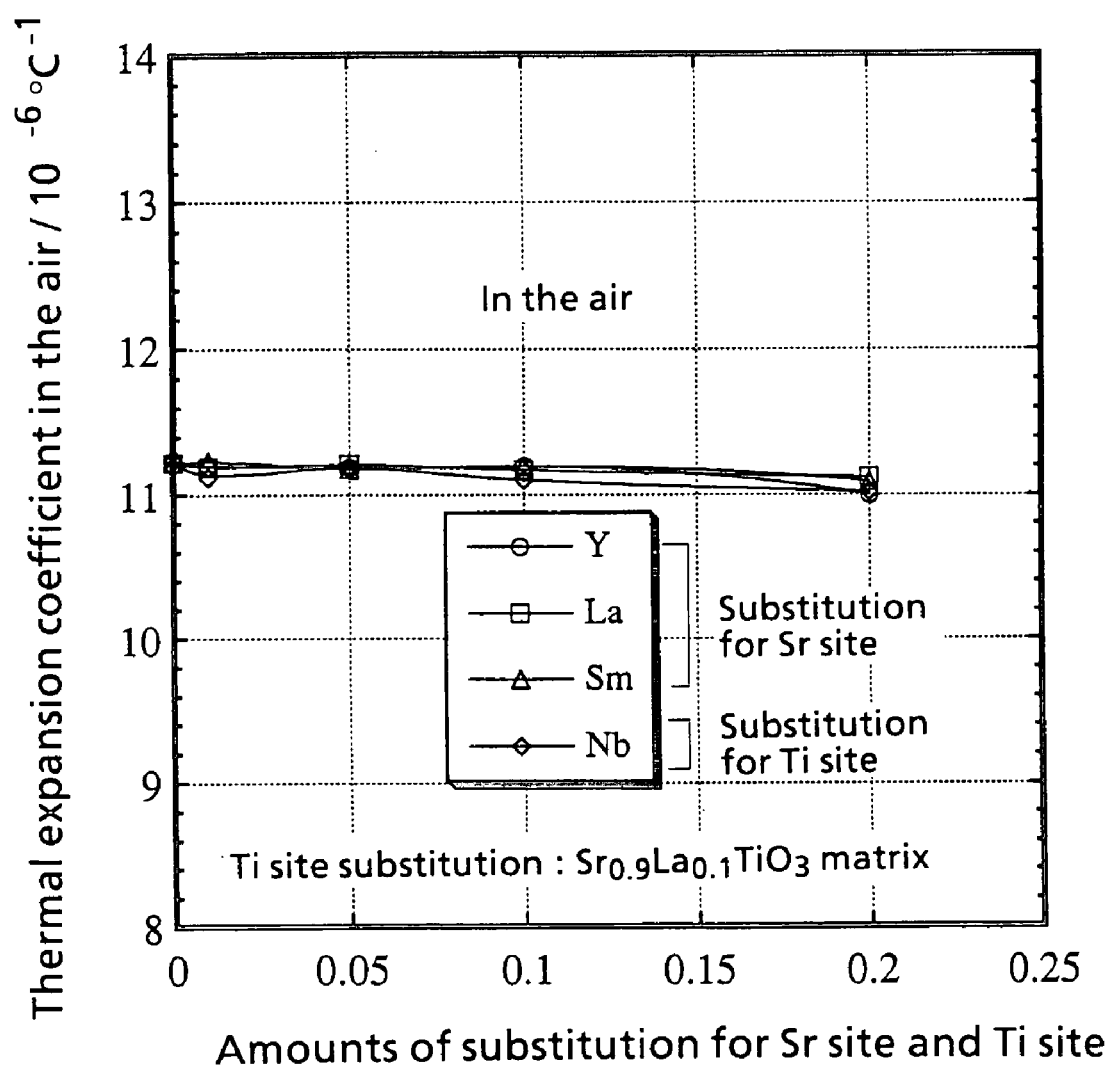
FIG. 32 is a graph showing the thermal expansion coefficients in the air of the $SrTiO_3$ system interconnectors in Example 5 of the invention.
Figure 33:
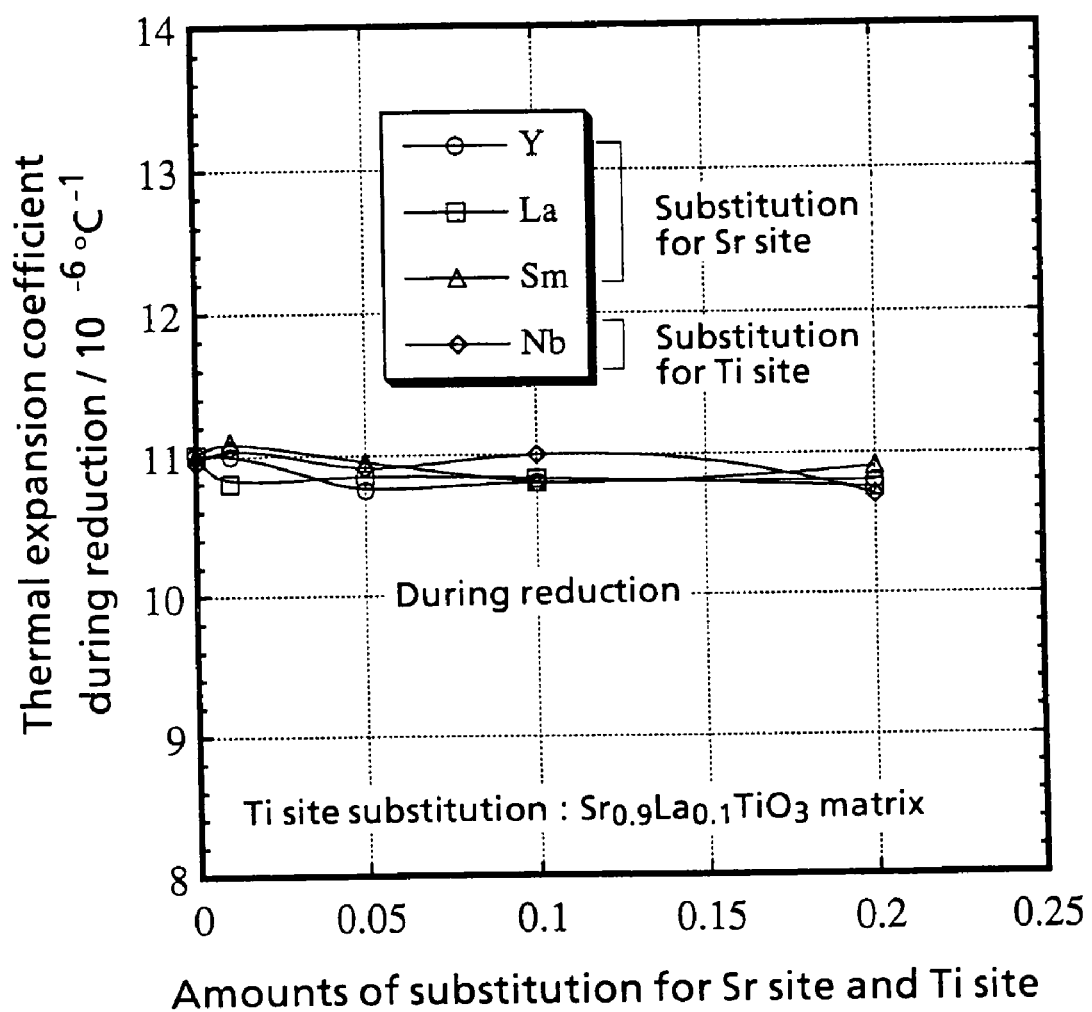
FIG. 33 is a graph showing the thermal expansion coefficients, during reduction, of the $SrTiO_3$ system interconnectors in Example 5 of the invention.

FIGS. 32 and 33 show the decomposition dependency of the thermal expansion coefficients, in the air and during reduction, of $SrTiO_3$ systems.

From FIGS. 31, 32 and 33, it becomes clear that the decomposition dependency of the thermal expansion coefficients of the $SrTiO_3$ systems is minimal.

Also, FIGS. 31, 32 and 33 show that the thermal expansion coefficients of the $SrTiO_3$ systems are slightly larger than the value of YSZ ($10.0 \times 10^{-6\circ}$ $C.^{-1}$), but are close to the values of the $CaTiO_3$ systems described in Examples 3 and 4 and the $BaTiO_3$ systems described in Example 6, the example to follow. As detailed in Example 4, it can be easily analogized that the addition of a low thermal expansion material can control the thermal expansion coefficient.

Figure 34:
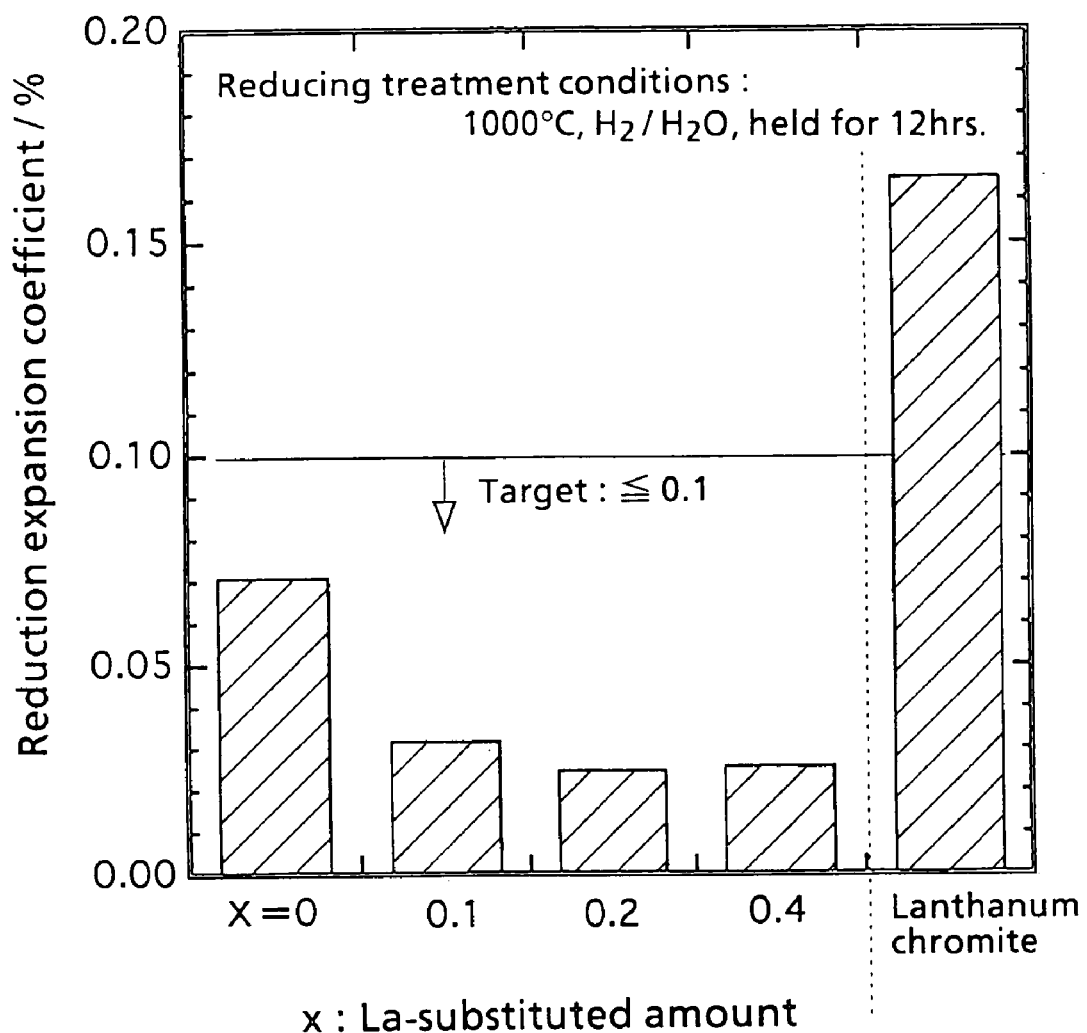
FIG. 34 is a graph showing the reduction expansion coefficients of the $SrTiO_3$ system interconnectors in Example 5 of the invention.
Figure 35:
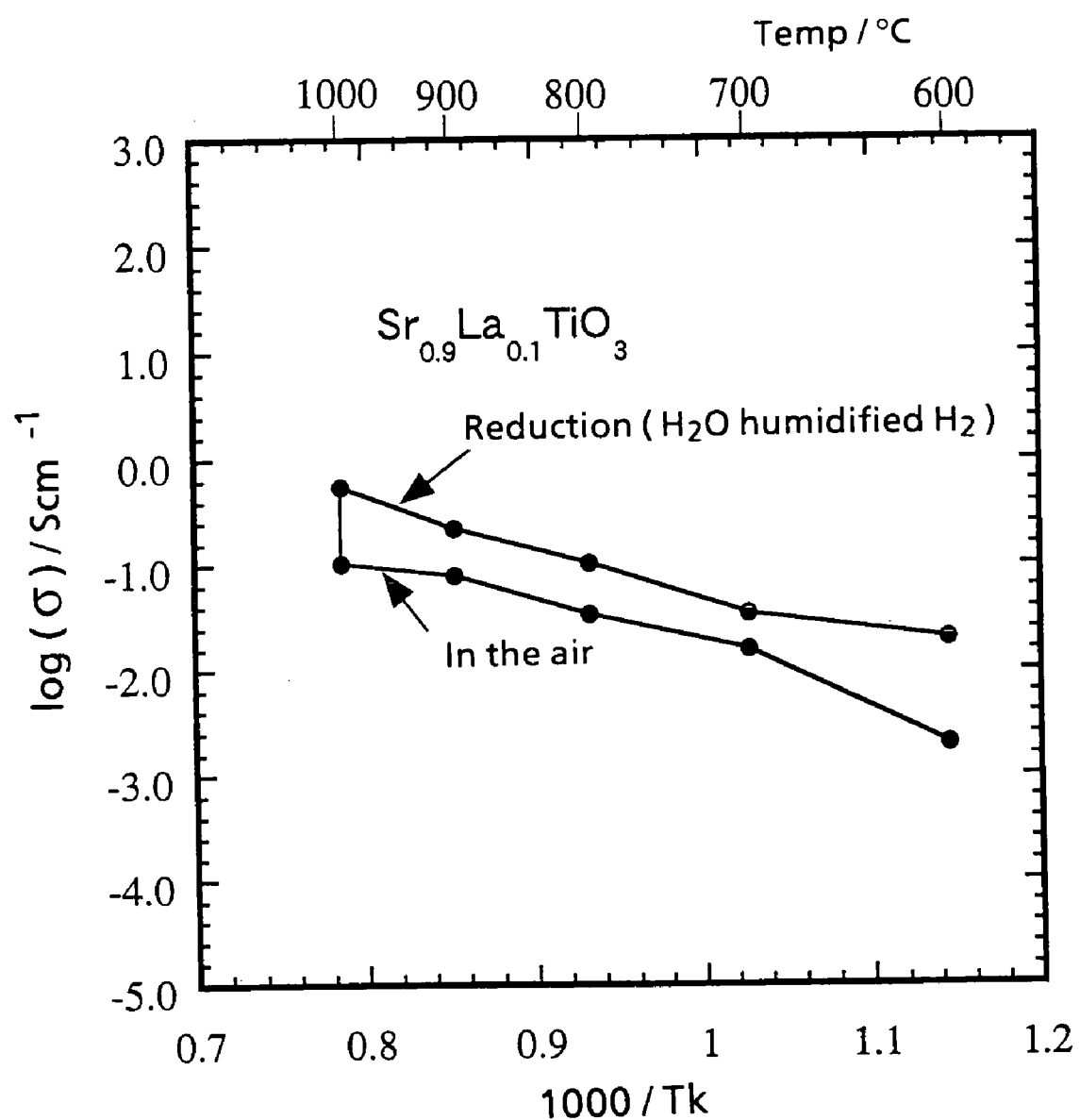
FIG. 35 is a graph showing the temperature- and atmosphere-dependency of the electric conductivities of the $SrTiO_3$ system interconnector in Example 5 of the invention.

FIG. 34 shows the reduction expansion coefficients, which indicate that those of $SrTiO_3$ systems are very low compared with that of lanthanum chromite. FIG. 35 shows the temperature dependency of the electric conductivities (r) of $Sr_{0.9}La_{0.1}TiO_3$ in the air and during reduction.

The temperature dependency and atmosphere dependency of FIG. 35 point to the semiconductor-like electrically conducting properties and n-type semiconductor properties.

Figure 36:
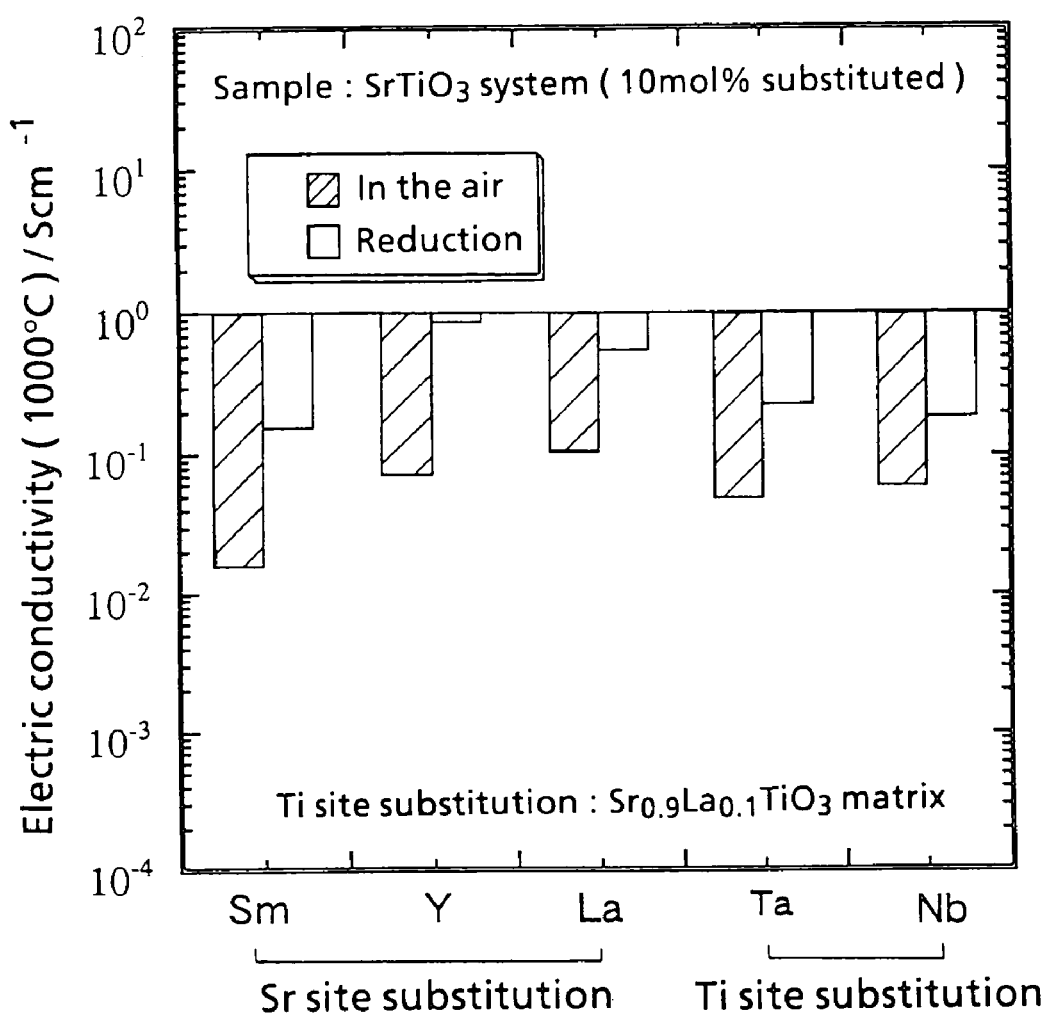
FIG. 36 is a graph showing the electric conductivities of the $SrTiO_3$ system interconnectors in Example 5 of the invention.

Furthermore, FIG. 36 shows the electric conductivities, in the air and during reduction, of $SrTiO_3$ systems substituted by various elements. From FIG. 36, it is seen that all compositions show high conducting properties, and the system having Sr partially substituted by La, in particular, exhibits satisfactory conducting properties.

As described in detail above, an $SrTiO_3$ system material as an unsubstituted compound or substituted by various elements is suitable as an interconnector for a solid electrolyte type fuel battery.

EXAMPLE 6

Next, the present invention will be described in greater detail by reference to concrete examples using $BaTiO_3$ system interconnectors. Examples 2, 3 and 5 demonstrated $MgTiO_3$, $CaTiO_3$ and $SrTiO_3$ system interconnectors to exhibit better characteristics than lanthanum chromite. Whereas this Example 6 presents a more detailed explanation for the properties of $BaTiO_3$ system interconnectors.

First, $BaTiO_3$ system interconnectors were prepared in the same manner as in Example 2. The compositions for these interconnectors contained rare earth elements such as Y, Cr and La partially substituting for the Ba site (A site), or elements such as Nb and Ta partially substituting for the Ti site (B site). Since $BaTiO_3$ systems are also n-type semiconductors, it goes without saying that other elements can be added thereto.

Figure 37:
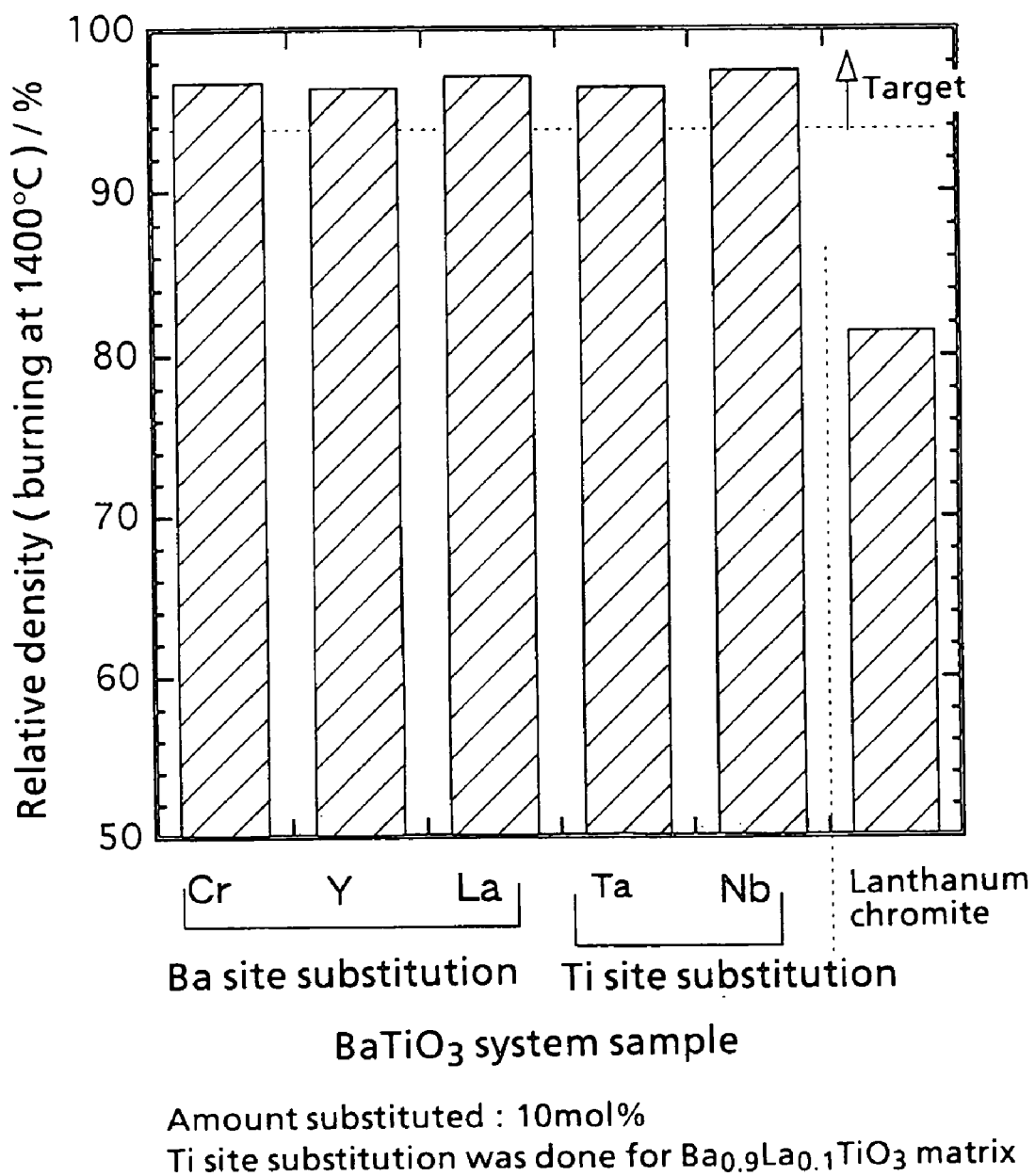
FIG. 37 is a graph showing the relative densities of $BaTiO_3$ system interconnectors in Example 6 of the invention.

FIG. 37 shows the relative densities of burned $BaTiO_3$ systems partially substituted by various elements. It becomes clear that even after burning at 1,400° C., the relative densities were 96% or more with all compositions, while the burned lanthanum chromite as control exhibited a relative density of 81%. This is proof that the $BaTiO_3$ systems are easy to burn.

Figure 38:
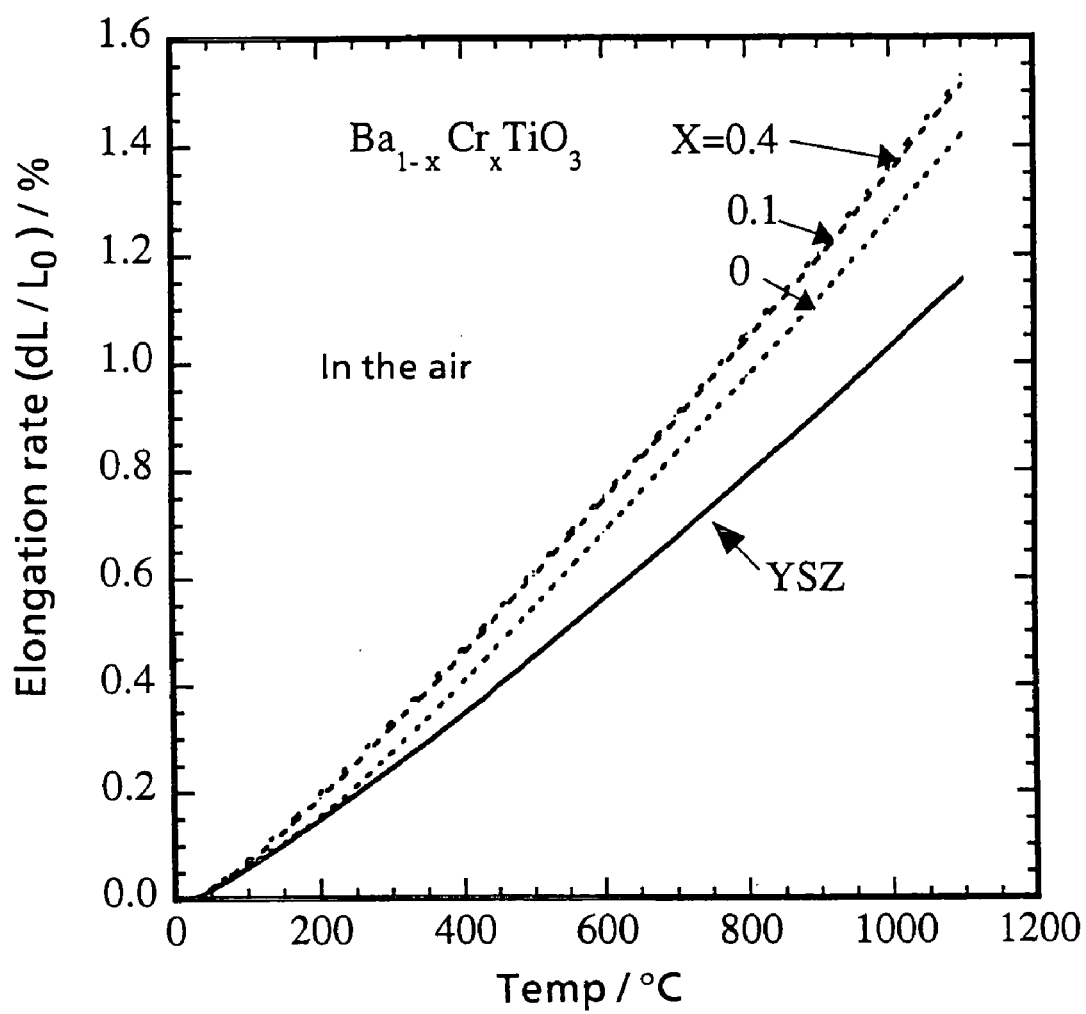
FIG. 38 is a graph showing the thermal expansion characteristics of the $BaTiO_3$ system interconnectors in Example 6 of the invention.

FIG. 38 shows the thermal expansion behavior of burned $BaTiO_3$ systems with the varying amounts of Cr added. Their values are found to increase with the increase in the amount of Cr added.

Figure 39:
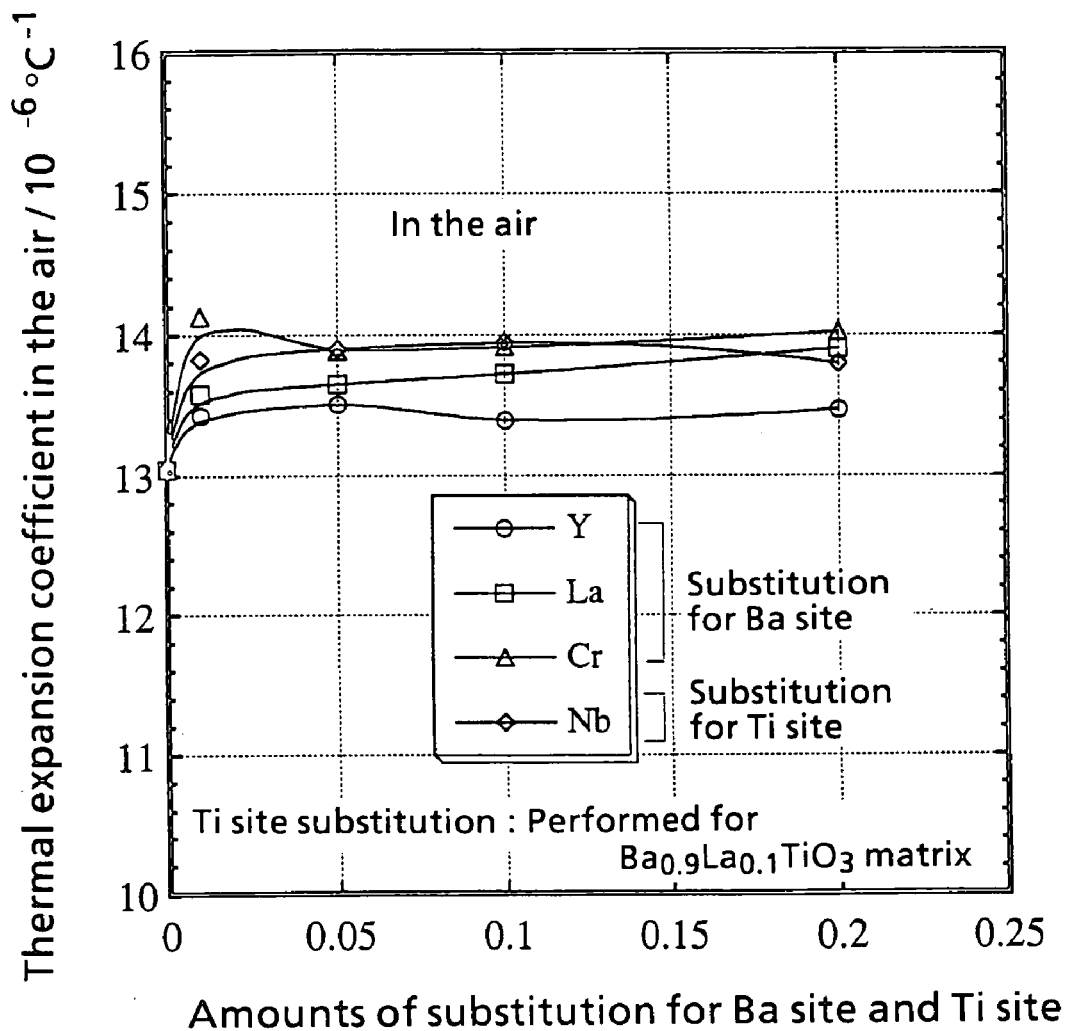
FIG. 39 is a graph showing the thermal expansion coefficients of the $BaTiO_3$ system interconnectors in Example 6 of the invention.
Figure 40:
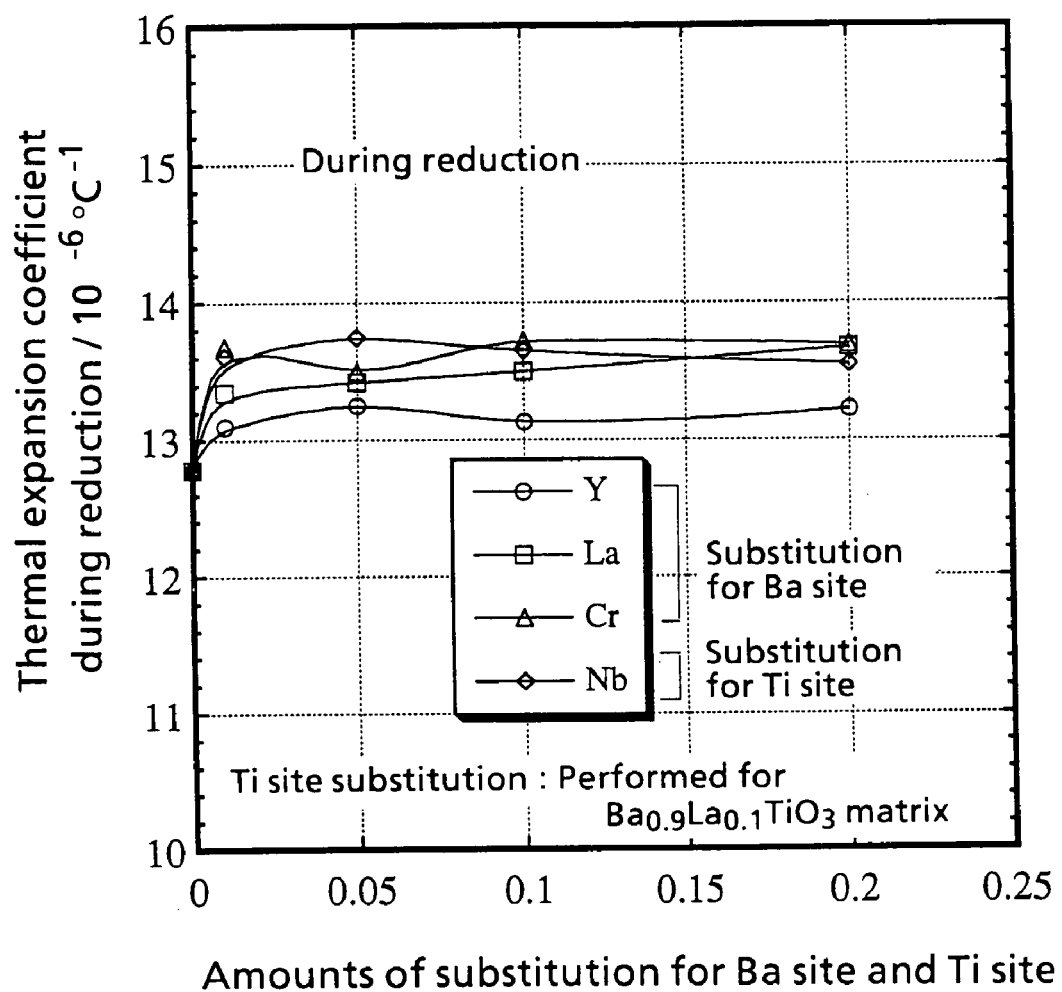
FIG. 40 is a graph showing the thermal expansion coefficients, during reduction, of the $BaTiO_3$ system interconnectors in Example 6 of the invention.

FIGS. 39 and 40 show the decomposition dependency of the thermal expansion coefficients, in the air and during reduction, of various $BaTiO_3$ system materials.

From FIGS. 38, 39 and 40, it becomes clear that the thermal expansion coefficients of the $BaTiO_3$ systems are slightly larger than the value of YSZ for all compositions. As detailed in Example 4, however, the addition of a low thermal expansion material can control the thermal expansion coefficient.

Figure 41:
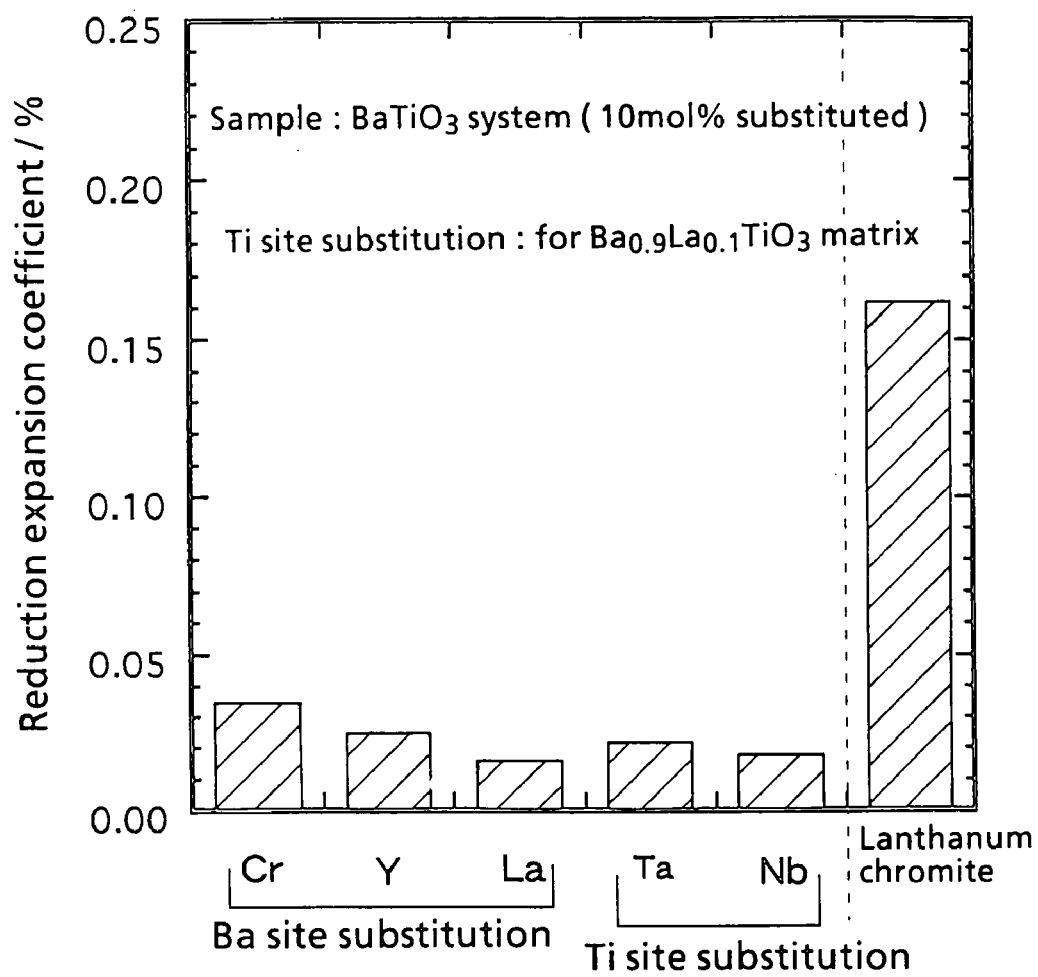
FIG. 41 is a graph showing the reduction expansion coefficients of the $BaTiO_3$ system interconnectors in Example 6 of the invention.

FIG. 41 shows the reduction expansion coefficients of $BaTiO_3$ systems substituted by various elements, which are found to be very low compared with that of lanthanum chromite.

Figure 42:
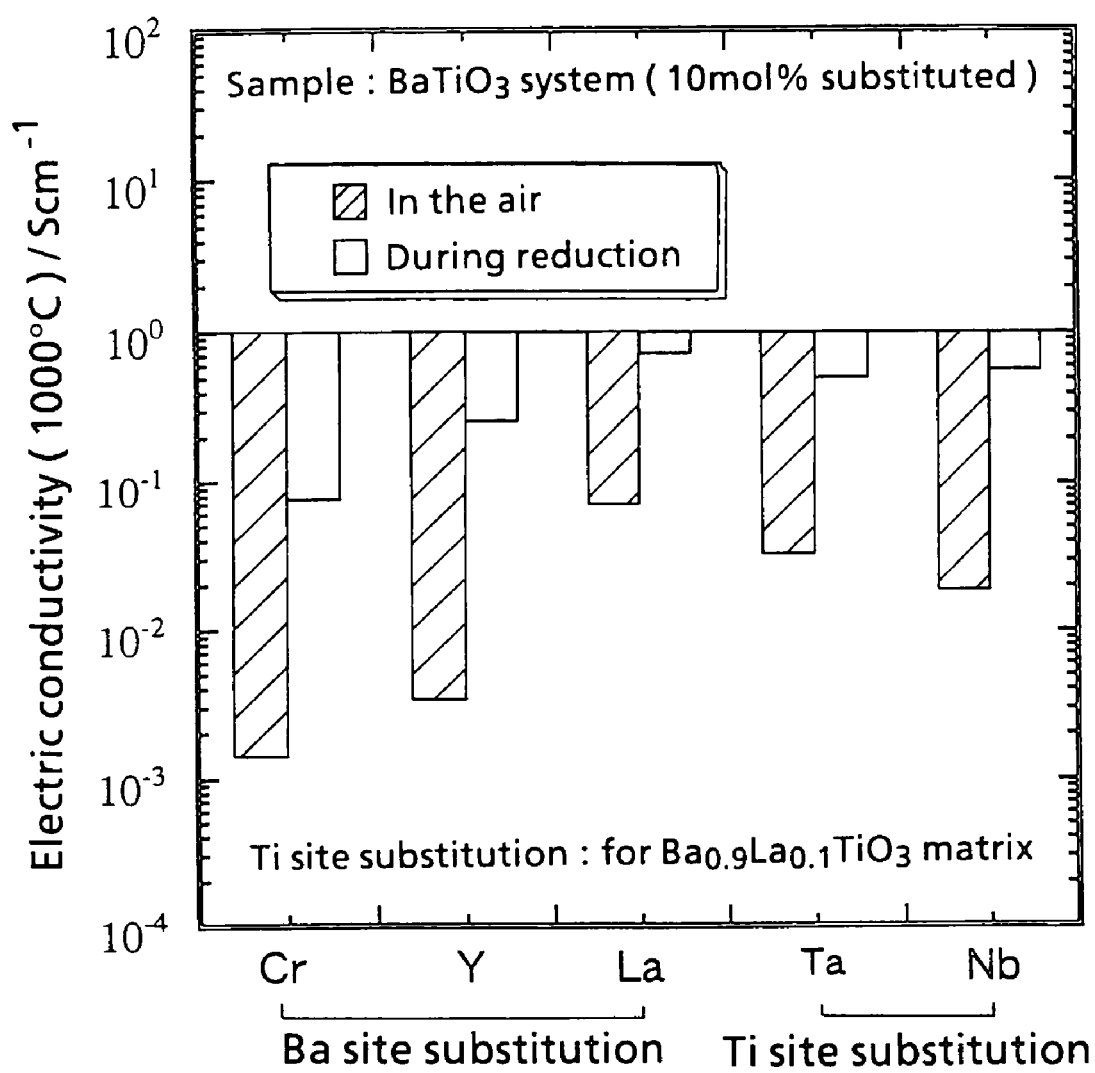
FIG. 42 is a graph showing the electric conductivities of the $BaTiO_3$ system interconnectors in Example 6 of the invention.

Furthermore, FIG. 42 shows the electric conductivities, in the air and during reduction, of $BaTiO_3$ systems substituted by various elements. From FIG. 42, it is seen that the $BaTiO_3$ systems partially substituted by elements other than Cr are improved in conducting properties, and the La-substituted system, in particular, exhibits satisfactory conducting properties.

As described in detail above, a $BaTiO_3$ system material as an unsubstituted compound or substituted by various elements is suitable as an interconnector for a solid electrolyte type fuel battery.

EXAMPLE 7

Next, the present invention will be described in further detail by way of concrete examples in relation to the resistance of an interconnector portion and the structure of the interconnector portion in a solid electrolyte type fuel battery having an $MTiO_3$ system applied to actual cells, as well as the actual battery formed by integral burning.

Examples 1 through 6 explained that $MTiO_3$ systems are interconnectors having excellent characteristics in comparison with lanthanum chromite. However, a simple comparison in terms of electrically conducting properties cannot be made, and $MTiO_3$ systems exhibit n-type semiconducting properties, while lanthanum chromite shows p-type semiconducting properties. If $Ca_{0.9}La_{0.1}TiO_3$ is taken as an example of an $MTiO_3$ system, the electric conductivities of the $MTiO_3$ system at 1,000° C. in the air and during reduction are about 0.25 and 1.0 $Scm^{-1}$, respectively. On the other hand, the electric conductivities of the lanthanum chromite at 1,000° C. in the air and during reduction are about 10 and 2 $Scm^{-1}$, respectively. Judgment based on these values shows the electrically conducting properties of lanthanum chromite to be superior. With the actual battery, however, an operating time as long as tens of thousands of hours is required.

Thus, an electric current was passed through pellets of $Ca_{0.9}La_{0.1}TiO_3$ in the air and during reduction, and changes in the electric conductivity over time were examined. The results are depicted in FIG. 43.

Figure 43:
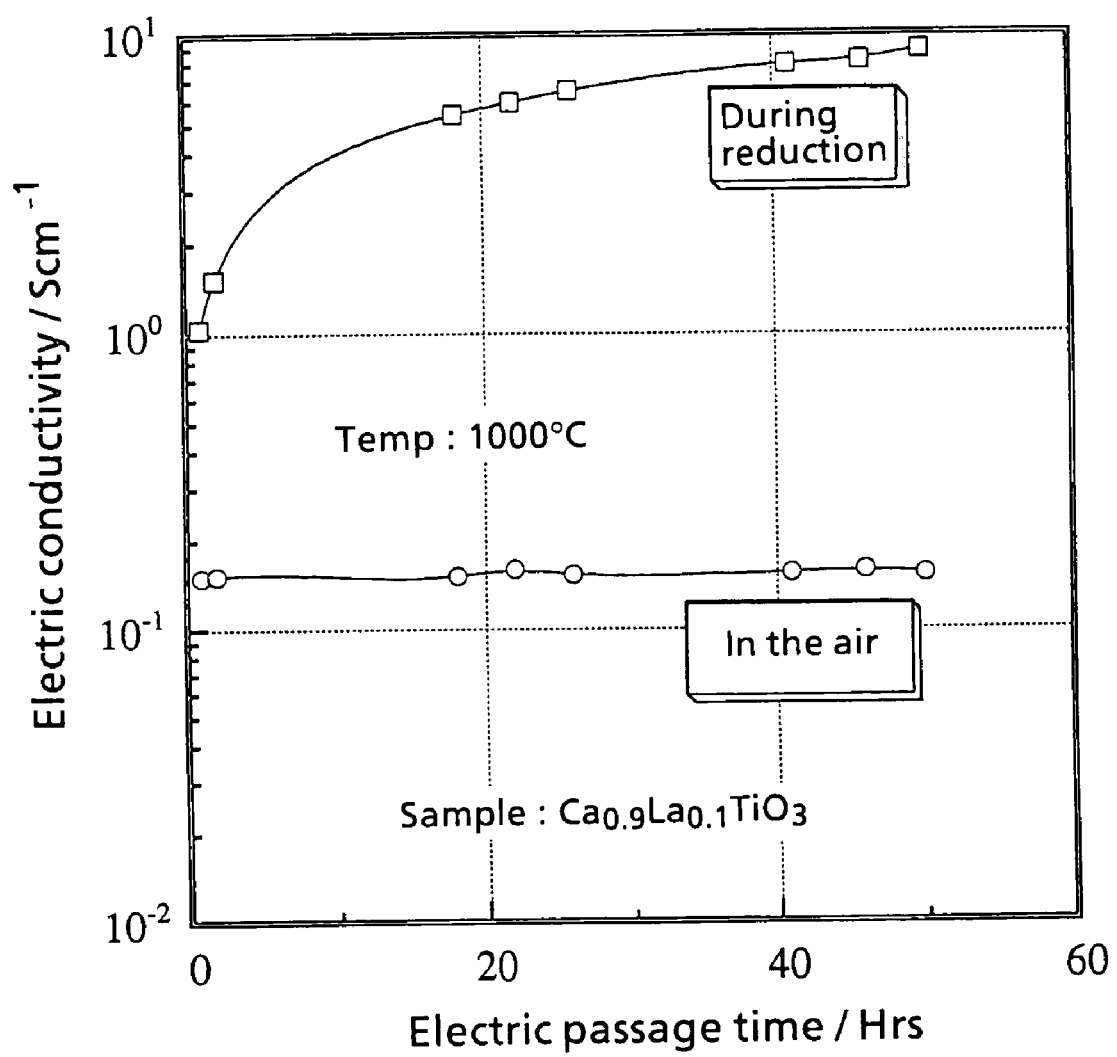
FIG. 43 is a graph showing the time course of the electric conductivities of an $MTiO_3$ system interconnector in Example 7 of the invention.

FIG. 43 shows that the electric conductivity in the air was unchanged, while there was an increase in the electric conductivity by about an order of magnitude following 50 hours of current passage during reduction. These findings demonstrate that the difference in electrically conducting properties between the $MTiO_3$ system and lanthanum chromite can be resolved.

However, the conducting properties of the $MtiO_3$ system do not excel those of lanthanum chromite. Thus, a study was done to further deal with the difference in the conducting properties from the aspect of the structure of the battery.

FIGS. 44(a) and 44(b) each show a schematic view of vertical current collection (FIG. 44(a)) and a schematic view of horizontal current collection (FIG. 44(b)) in respect to the direction of current collection by an interconnector.

In these drawings, fuel electrodes 12 are provided at predetermined intervals along a substrate 11, and electrolytes 13 are provided so as to each cover the surface of the fuel electrode 12 while leaving a part of it uncovered. The electrolyte 13 of the first cell is connected by an interconnector 14 to the fuel electrode 12 of the second cell. Furthermore, an air electrode 15 is provided so as to cover the surface of the electrolyte 13 of the first cell and the surface of the interconnector 14.

As shown in FIG. 44(a), with vertical current collection, the fuel electrodes 12, 12 are provided in proximity to each other, and the air electrode 15 is provided above the fuel electrode 12 of the second cell via the interconnector 14. By thinning the film, therefore, overvoltage due to the resistance of the interconnector 14 can be decreased.

If $MtiO_3$ system and lanthanum chromite are both dense and their film thicknesses are each 30 microns, their difference in overvoltage due to their resistance at a current density of 300 $mA/cm^2$ is calculated at 2 mV. In actual use, there may be little resistance difference.

The above resistance difference is based on the precondition that $MtiO_3$ system and lanthanum chromite are both dense. As stated in the previous Examples, however, lanthanum chromite is not densified, and the performance of a battery using lanthanum chromite is fully expected to be inferior. Thus, actual batteries using $MtiO_3$ system and lanthanum chromite as interconnectors were prepared by the integral burning method, and the degree of denseness of the resulting interconnector films was investigated. The burning temperature for the preparation was 1,400° C.

Figure 45:
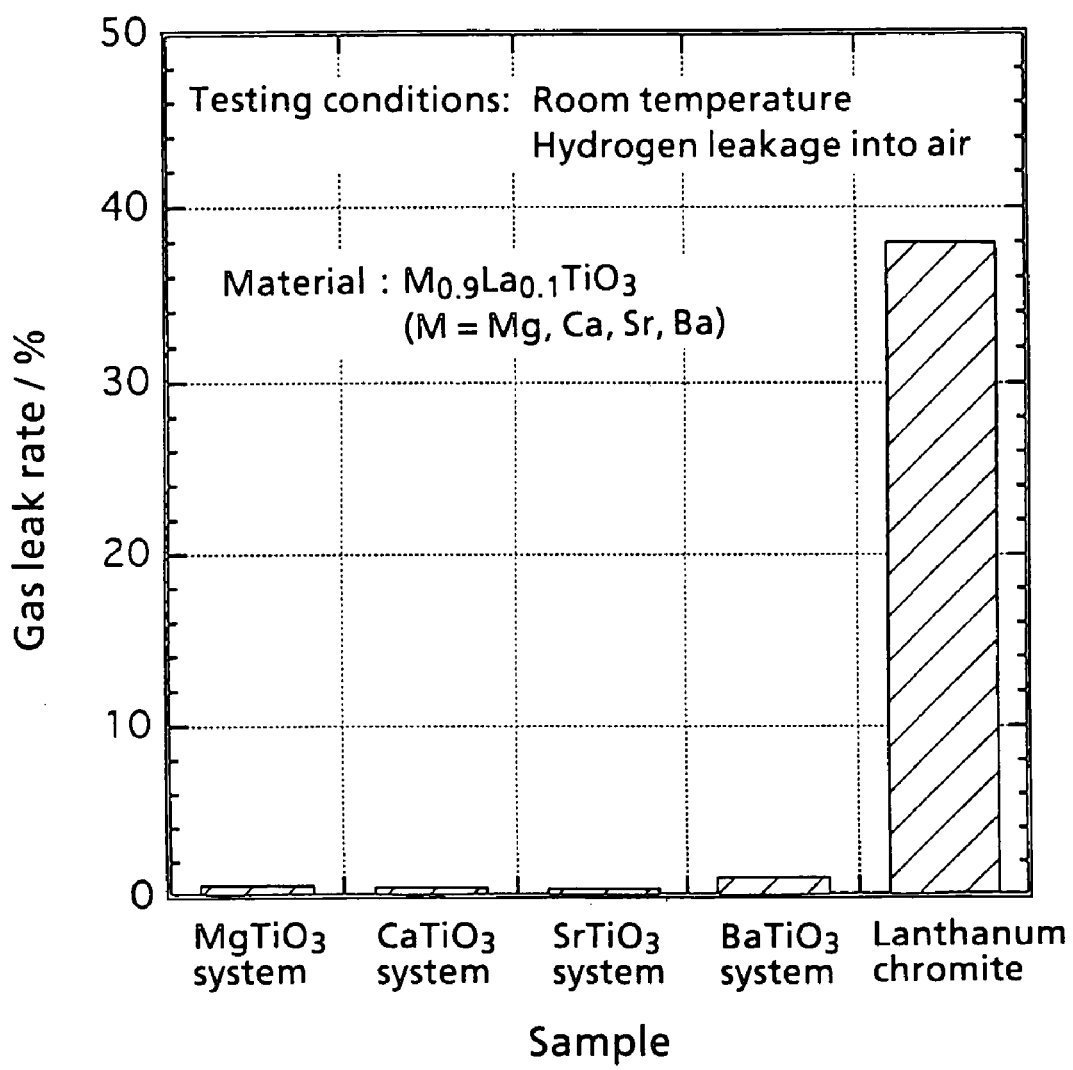
FIG. 45 is a graph showing the gas leak rates of batteries using the $MTiO_3$ system interconnectors in Example 7 of the invention.

FIG. 45 is a graph showing the results of gas leak at room temperature of batteries having interconnectors composed of $M_{0.9}La_{0.1}TiO_3$ systems and lanthanum chromite. In the production of batteries of FIG. 45, it was found that the $M_{0.9}La_{0.1}TiO_3$ system batteries other than the $Mg_{0.9}La_{0.1}TiO_3$ system battery had tiny cracks in the interconnector portion, although this drawback occurred only in several percent of the batteries. Thus, $Nb_2O_5$ or $MgAl_2O_4$, the low thermal expansion material shown in Example 4, was added to control the thermal expansion coefficient. As a result, batteries could be produced in a yield of 100%.

FIG. 45 gives the results of batteries constructed by adding 20 vol % of $Nb_2O_5$ to batteries other than lanthanum chromite and $Mg_{0.9}La_{0.1}TiO_3$ system batteries. The gas leak was determined by flowing hydrogen inside and air outside a cell tube, and measuring the leakage of hydrogen to the air side by gas chromatography.

From FIG. 45, it is seen that the gas leaks of the batteries using $M_{0.9}La_{0.1}TiO_3$ system interconnectors are not more than 1%. These values are very small gas leaks in view of the leak at the seal. For a subsequent performance test, batteries prepared by this method were used. The systems without the addition of a low thermal expansion material, and systems containing 20 vol % of $MgAl_2O_4$ instead of $Nb_2O_5$ had a gas leak of at most 1.2%. This value was evaluated as sufficiently small in the light of measurement accuracy, etc. The gas leak for the battery using lanthanum chromite as an interconnector was as large as about 40%, since the interconnector was not burnt. Its use at 1,000° C. causes explosion, so that a subsequent performance test could not be conducted on this battery.

As described above, an $MTiO_3$ system material is favorable as an interconnector for a solid electrolyte type fuel battery.

EXAMPLE 8

In regard to the output characteristics and durability of a solid electrolyte type fuel battery actually using an $MTiO_3$ system interconnector, the present invention will be described in further detail by way of concrete examples.

Batteries using an $Mg_{0.9}La_{0.1}TiO_3$ system interconnector, a $Ca_{0.9}La_{0.1}TiO_3$ system interconnector, an $Sr_{0.9}La_{0.1}TiO_3$ system interconnector, and a $Ba_{0.9}La_{0.1}TiO_3$ system interconnector were prepared by the method disclosed in Example 7.

Figure 46B:
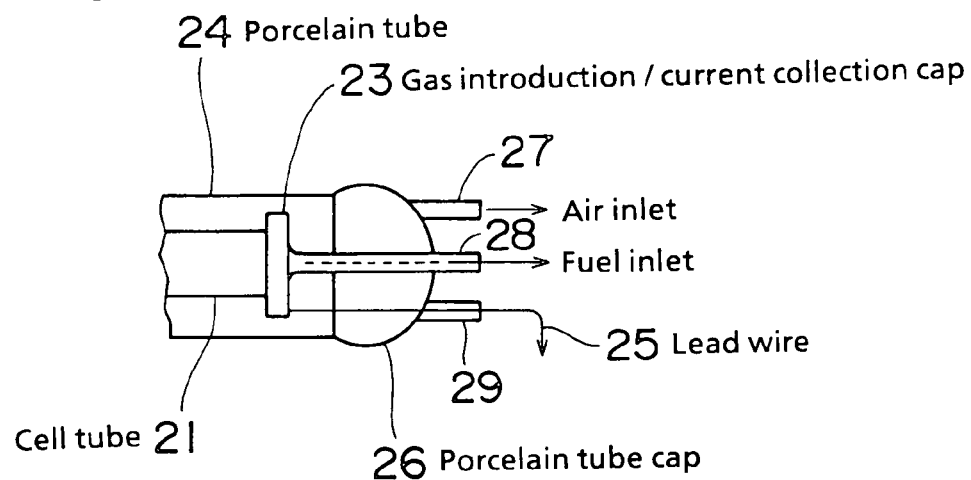
FIGS. 46(*a*) and 46(*b*) are schematic views of a device for evaluating batteries in Example 8 of the invention.
Figure 46A:
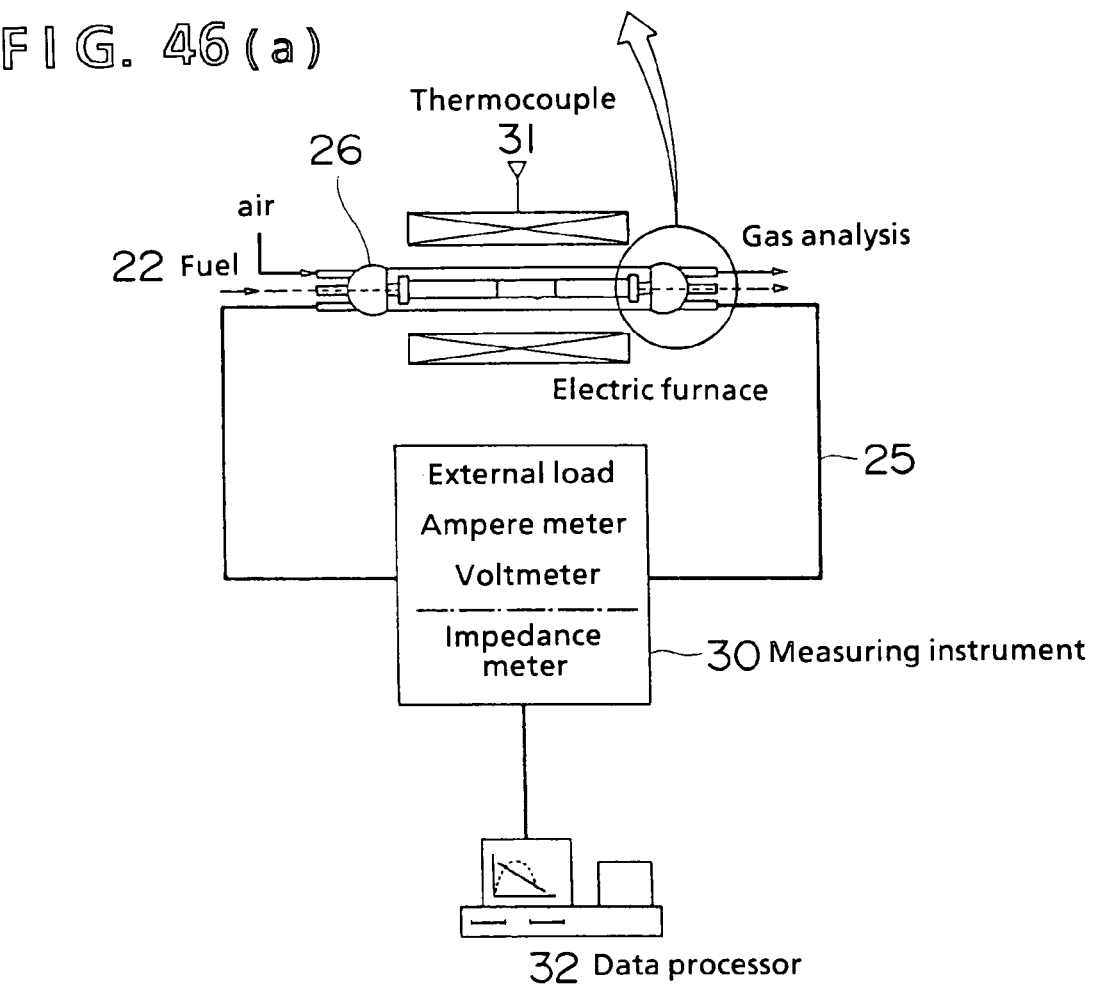

A schematic view of an evaluating apparatus is given as FIGS. 46(a) and 46(b), which explain the status of evaluation of a battery in the form of a single tube from 15-element cells.

The details of the elements were such that an air electrode 15, an electrolyte 13, and a fuel electrode 12 constituted one element (one cell), and they were connected together by an interconnector 14 as shown in FIG. 44(a).

Lead wires were taken out of the fuel electrode of the first element and the air electrode of the 15th element, and connected to the evaluating apparatus, for evaluation of power generation characteristics.

As shown in FIGS. 46(a) and 46(b), gas introduction caps 23 were attached to both ends of the battery to flow a fuel 22 in a cell tube 21, and the battery was set in a porcelain tube 24. Since the gas introduction cap 23 is made of a metal, it also acts as a current collection cap at either end of the battery where the temperature is fully lowered.

In this state, a lead wire 25 was withdrawn from the gas introduction/current collection cap 23, whereafter a porcelain tube cap 26 was attached. From the porcelain tube cap 26, three tubes were taken out. They were, from above in order, a tube 27 as an inlet and an outlet for air which passed outside the tube, a tube 28 as an inlet and an outlet for fuel which passed inside the tube, and a tube 29 as an inlet and an outlet for the lead wire for the investigation of power generation characteristics.

The lead wire 25 was connected to a measuring instrument 30 for the evaluation of various power generation characteristics.

In this state, the temperature of a thermocouple 31 of an electric furnace was raised (usually, to 1,000° C.), and specified amounts of fuel and air were flowed to investigate the power generation characteristics.

The power generation characteristics were examined by varying the magnitude of an external load (resistance), and obtaining the current-voltage characteristics on this occasion by means of a data processor 32. Simultaneously, the impedance of the battery was measured. Long-term durability test was performed by automatically varying the value of the external load so as to give a constant current, and monitoring changes in the voltage under these conditions. Thermo cycle test was conducted by simulating the actual operating conditions, dropping the temperature from 1,000° C. to room temperature during the long-term durability test, raising the temperature to 1,000° C. again, and monitoring voltage at a constant current under these conditions. In this series of tests, the power generation characteristics vary according to the operating conditions and the influence of other materials. Thus, comparisons are made in differences in the power generation characteristics, long-term durability and thermo cycle resistance according to differences in the interconnector with the other conditions being fixed.

Figure 47:
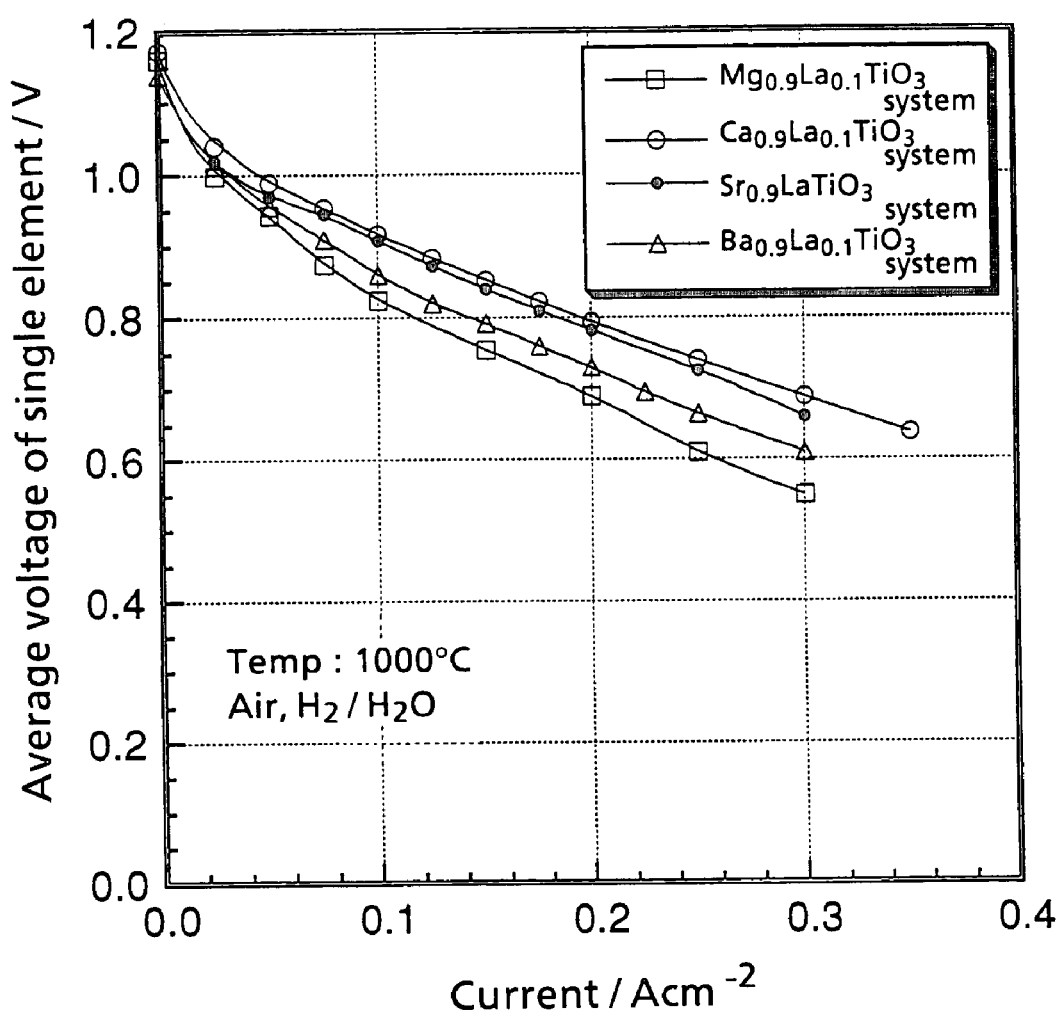
FIG. 47 is a graph showing the output characteristics of the batteries using $MTiO_3$ system interconnectors in Example 8 of the invention.

FIG. 47 shows the output characteristics of batteries using $MgTiO_3$, $CaTiO_3$, $SrTiO_3$ and $BaTiO_3$ system interconnectors. The temperature used was 1,000° C., and the batteries using any materials provided high output. The $CaTiO_3$ and $SrTiO_3$ type batteries, in particular, gave excellent output characteristics. In each of the batteries of FIG. 47, the specifications other than those for the interconnector are fixed, and the battery comprising fifteen elements is made into a single tubular form. Thus, relative comparison of the interconnectors in FIG. 47 is possible to a certain extent. This comparison makes it clear to those skilled in the art that changes in other specifications of the material cause changes in the power generation characteristics of the battery.

FIG. 47 also reveals the results of battery configuration using interconnectors other than the $Mg_{0.9}La_{0.1}TiO_3$ system interconnector which contain 20 vol % of $Nb_2O_5$ added thereto because of the yield of cell production as described in Example 7. The output characteristics of the $Nb_2O_5$-free system prepared as a control showed only a difference within the experimental error (about 5%). In the instant Example 8, however, there were used the results on the system incorporating a low thermal expansion material from the point of view of increased yield of cell production. The battery using the lanthanum chromite system interconnector was not included in the comparison, because lanthanum chromite did not become densified.

Figure 48:
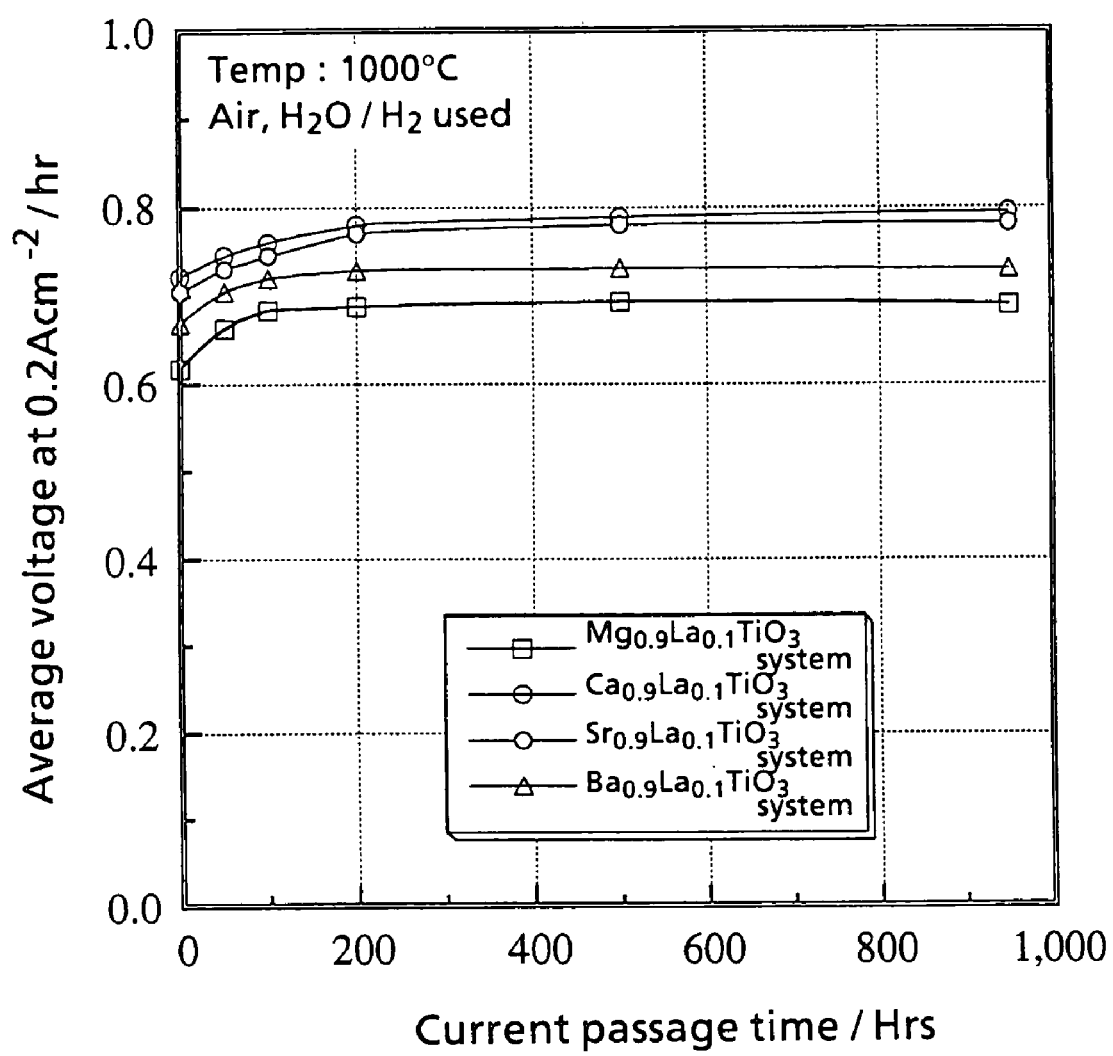
FIG. 48 is a graph showing the durability of the batteries using $MTiO_3$ system interconnectors in Example 8 of the invention.

FIG. 48 shows the results of durability test of batteries using $Mg_{0.9}La_{0.1}TiO_3$, $Ca_{0.9}La_{0.1}TiO_3$, $Sr_{0.9}La_{0.1}TiO_3$ and $Ba_{0.9}La_{0.1}TiO_3$ systems as interconnectors. From FIG. 48, it is seen that none of the batteries using these interconnectors underwent deterioration in the test lasting about 1,000 hours, and they were excellent in durability. FIG. 48 also indicates an improvement in performance with the passage of time. This is attributed to an improvement in the electric conductivity of the interconnector over about 100 hours, as shown in FIG. 43 of Example 7.

Figure 49:
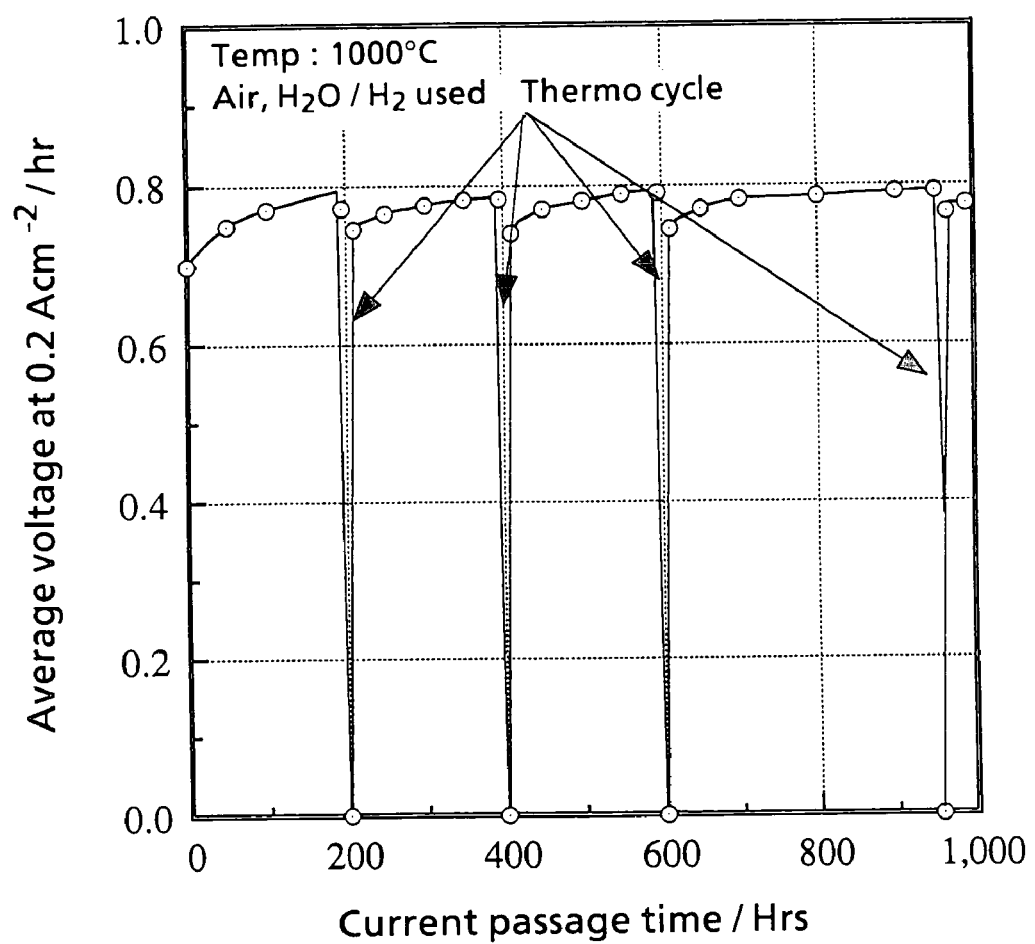
FIG. 49 is a graph showing the heat cycle characteristics of a battery using a $CaTiO_3$ system interconnector in Example 8 of the invention.

Test was also conducted for the deterioration of power generation that could occur in actual batteries. FIG. 49 shows changes in output before and after a thermo cycle in thermo cycle test in which a battery using a $Ca_{0.9}La_{0.1}TiO_3$ system as an interconnector was subjected to four thermo cycles of 1,000° C. dropped to room temperature. FIG. 49 indicates that the battery using the $Ca_{0.9}La_{0.1}TiO_3$ interconnector transiently decreased in output after the thermo cycle compared with before the thermo cycle, but its output recovered in a long period of time. This finding demonstrates its excellent thermo cycle resistance.

Figure 50:
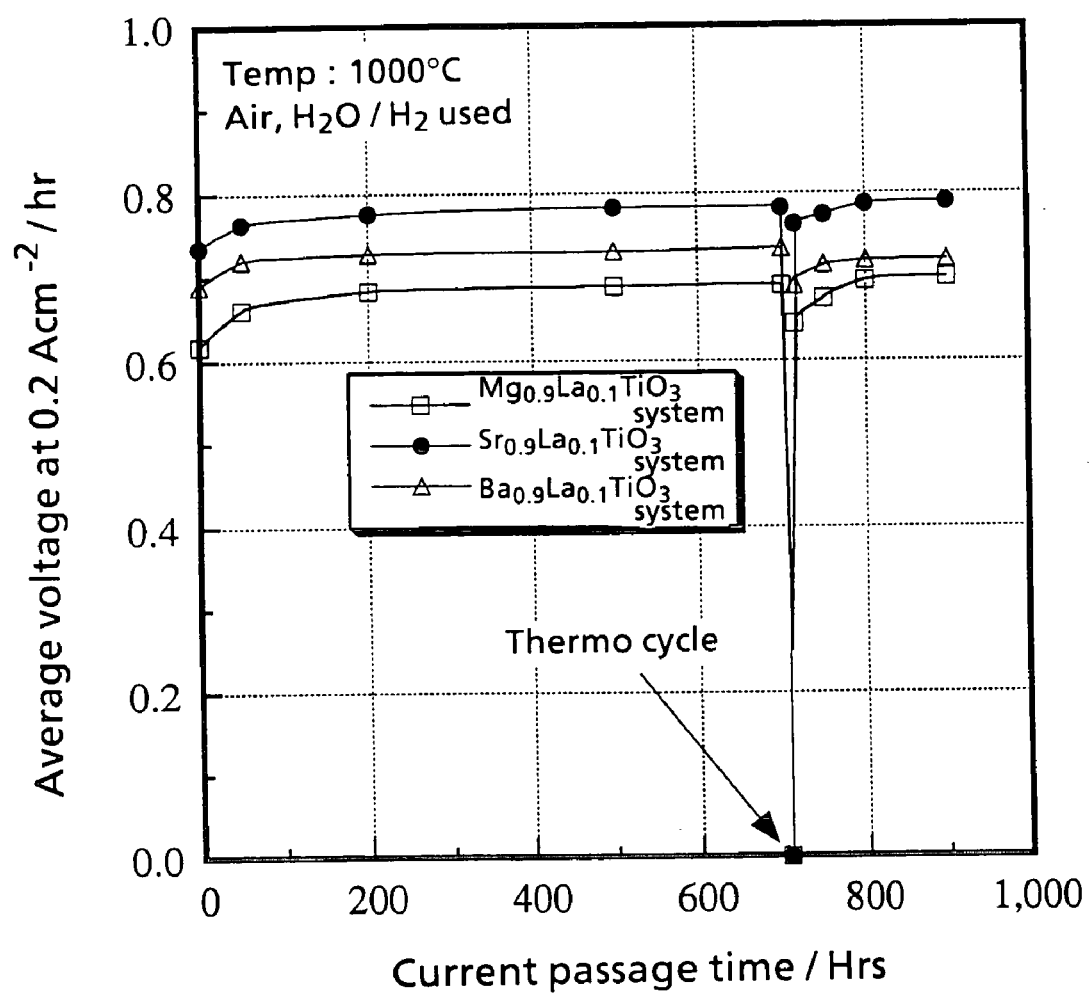
FIG. 50 is a graph showing the heat cycle characteristics of the batteries using $MTiO_3$ system interconnectors in Example 8 of the invention.

FIG. 50 shows changes in the output characteristics of batteries using $Mg_{0.9}La_{0.1}TiO_3$, $Sr_{0.9}La_{0.1}TiO_3$ and $Ba_{0.9}La_{0.1}TiO_3$ systems when subjected to thermo cycle test over 700 hours involving a single thermo cycle. FIG. 50 indicates that the tendency of output characteristics changes by the thermo cycle of the $MgTiO_3$, $SrTiO_3$ and $BaTiO_3$ system batteries is nearly the same as that of the $Ca_{0.9}La_{0.1}TiO_3$ system battery, and that these batteries are excellent in durability and thermo cycle characteristics like the $Ca_{0.9}La_{0.1}TiO_3$ system battery.

As described in detail above, $MgTiO_3$ system materials impart excellent output characteristics, durability and thermo cycle characteristics when used as interconnectors for solid electrolyte type fuel batteries.

As in the foregoing explanation, according to the solid electrolyte type fuel battery of the present invention, the interconnector for connecting the cells of the solid electrolyte type fuel battery comprises a matrix of the general formula $MTiO_3$ where M is an alkaline earth metal element, Mg, Ca, Sr or Ba. Thus, its burning can be performed at a lower temperature (1,300 to 1,400°) than in earlier technologies, thus reducing the production cost. The resulting fuel battery shows output performance comparable to or better than that of conventional devices. Furthermore, the fuel battery of the invention can exhibit better durability and thermo cycle resistance characteristics than the conventional devices.

In addition, according to the invention, current passage of the interconnector is performed by current collection in the vertical direction. Thus, differences in electric conductivity characteristics can be corrected.

While the invention has been described with reference to the preferred embodiments, it is to be understood that various changes and modifications may be made without departing from the spirit and scope of the invention. All such modifications as would be obvious to one skilled in the art are intended to be included within the scope of the following claims.

What is claimed is:

1. A solid electrolyte fuel battery, in which a co-sintered interconnector for connecting cells of the solid electrolyte fuel battery comprises a material having a matrix of the general formula $A_{1-x}B_xC_{1-y}D_yO_3$ where A is Ca, Sr or Ba, B is a rare earth element, aluminum or chromium, C is titanium, D is tantalum, $0<x\leq0.2$ and $0<y\leq0.2$.

2. The solid electrolyte fuel battery as claimed in claim 1, wherein the current passage of the interconnector is current collection in the vertical direction.

3. A solid electrolyte fuel battery, in which a co-sintered interconnector for connecting cells of the solid electrolyte fuel battery comprises a material having a matrix of the general formula $A_{1-x}B_xC_{1-y}D_yO_3$ where A is Mg, B is a rare earth element, aluminum or chromium, C is titanium, D is tantalum, $0<x\leq0.2$ and $0<y\leq0.2$.

4. The solid electrolyte fuel battery as claimed in claim 3, wherein the current passage of the interconnector is current collection in the vertical direction.

5. A method of making a solid electrolyte fuel battery, in which a co-sintered interconnector for connecting cells of the solid electrolyte fuel battery comprises a material having a matrix of the general formula $A_{1-x}B_xC_{1-y}D_yO_3$ where A is Ca, Sr or Ba, B is a rare earth element, aluminum or chromium, C is titanium, D is tantalum, $0<x\leq0.2$ and $0<y\leq0.2$, said method comprising:

integrally burning within said battery the interconnector for connecting cells of the solid electrolyte fuel battery.

6. The method of making the solid electrolyte fuel battery as claimed in claim 5, wherein said battery comprises a fuel electrode, an electrolyte, an interconnector and an air electrode laminated onto a substrate.

7. A method of making a solid electrolyte fuel battery, in which a co-sintered interconnector for connecting cells of the solid electrolyte fuel battery comprises a material having a matrix of the general formula $A_{1-x}B_xC_{1-y}D_yO_3$ where A is Mg, B is a rare earth element, aluminum or chromium, C is titanium, D is tantalum, $0<x\leq0.2$ and $0<y\leq0.2$, said method comprising:

integrally burning within said battery the interconnector for connecting cells of the solid electrolyte fuel battery.

8. The method of making the solid electrolyte fuel battery as claimed in claim 7, wherein said battery comprises a fuel electrode, an electrolyte, an interconnector and an air electrode laminated onto a substrate.

9. The method of claim 5, wherein the current passage of the interconnector is current collection in the vertical direction.

10. The method of claim 7, wherein the current passage of the interconnector is current collection in the vertical direction.

11. The method of claim 5, wherein the integrally burning is performed at a temperature of 1,300° C. to 1,400° C.

12. The method of claim 7, wherein the integrally burning is performed at a temperature of 1,300° C. to 1,400° C.

13. The solid electrolyte fuel battery as claimed in claim 1, wherein the interconnector is a hermetic interconnector having a relative density of greater or equal to 94%.

14. The solid electrolyte fuel battery as claimed in claim 3, wherein the interconnector is a hermetic interconnector having a relative density of greater or equal to 94%.

* * * * *